United States Patent [19]

Tai et al.

[11] Patent Number: 5,039,600
[45] Date of Patent: Aug. 13, 1991

[54] NAPHTHALOCYANINE DERIVATIVES, PRODUCTION THEREOF, OPTICAL RECORDING MEDIUM USING THE SAME, AND PRODUCTION THEREOF

[75] Inventors: Seiji Tai, Palo Alto, Calif.; Nobuyuki Hayashi; Koichi Kamijima, both of Hitachi, Japan; Takayuki Akimoto, Hitachi, Japan; Mitsuo Katayose, Hitachi, Japan; Hideo Hagiwara, Hitachi, Japan

[73] Assignee: Hitachi Chemical Company, Ltd., Tokyo, Japan

[21] Appl. No.: 460,984

[22] Filed: Jan. 4, 1990

[30] Foreign Application Priority Data

Jan. 11, 1989 [JP] Japan .................. 1-003984

[51] Int. Cl.$^5$ ............... C09B 47/18; C09B 67/00; G03C 1/00
[52] U.S. Cl. ................... 430/495; 430/270; 430/945; 540/128; 540/131; 540/140; 428/64; 346/135.1
[58] Field of Search ............ 430/270, 495, 945; 428/64; 346/135.1, 76 L; 540/128, 140, 131

[56] References Cited

U.S. PATENT DOCUMENTS 4,622,179 11/1986 Eda ..................... 540/139
4,766,054 8/1988 Hirose et al. ............ 430/270

FOREIGN PATENT DOCUMENTS 0212907 3/1987 European Pat. Off. .
296876 12/1988 European Pat. Off. ...... 540/128

Primary Examiner—Charles L. Bowers, Jr.
Assistant Examiner—Ashley I. Pezzner
Attorney, Agent, or Firm—Antonelli, Terry, Stout & Kraus

[57] ABSTRACT

A naphthalocyanine derivative having as substituents at least one group of a formula: $SR^1$ wherein $R^1$ is $-(CR^2R^3)_xSiR^4R^5R^6$, in which $R^2$ to $R^6$ are H, alkyl groups, etc. is excellent in solubility in saturated hydrocarbon solvents and in absorption of semiconductor laser lights and thus, is suitable for producing optical recording media.

35 Claims, 59 Drawing Sheets

NAPHTHALOCYANINE DERIVATIVES, PRODUCTION THEREOF, OPTICAL RECORDING MEDIUM USING THE SAME, AND PRODUCTION THEREOF

BACKGROUND OF THE INVENTION

This invention relates to a naphthalocyanine derivative, a process for producing the same, an optical recording medium using the same, and a process for producing said optical recording medium.

In recent years, it has been proposed to utilize semiconductor laser beams for writing and reading in compact discs, video discs, liquid crystal display devices, optical reading machines, etc. and as light source for electrophotography. For writing or reading by the use of semiconductor laser beams, a substance capable of absorbing semiconductor laser beams, i.e. near infrared rays, is indispensable.

As organic dyes which absorb near infrared rays, cyanine dyes have heretofore been well known, and metal complexes of oximes and thiols and aminated quinone derivatives are also known as dyes absorbing near infrared rays (Yuki Gosei Kagaku Kyokai Shi, vol. 43, page 334 (1985); Shikizai Kyokai Shi, vol. 53, page 197 (1980); Shikizai Kyokai Shi, vol. 58, page 220 (1985).

However, the cyanine dyes have a very low fastness to light, and hence their use has many restrictions. The metal complexes of oximes and thiols are disadvantageous in that the metals are released from the complexes in a certain medium, as the result of which their ability to absorb near infrared rays is lost. The aminated quinone derivatives are disadvantageous in that they are very poor in the ability to absorb near infrared rays.

On the other hand, as materials capable of overcoming these disadvantages, naphthalocyanine derivatives have been disclosed recently. However, conventional unsubstituted metal naphthalocyanines (Zhurnal Obshchei Khimii, vol. 39, p. 2554 (1969) and Mol. Cryst. Liq. Cryst. vol, 112, p. 345 (1984)) are insoluble in organic solvents and hence are very difficult to purify. Recently, synthesis of naphthalocyanine derivatives soluble in organic solvents has been reported (Japanese Patent Application Kokai (Laid-Open) Nos. 60-23451, 60-184565, 61-215662 and 61-215663). However, these naphthalocyanine derivatives have the following disadvantage. That is, although they are generally soluble in aromatic hydrocarbon solvents and halogen-containing solvents, their solubility in saturated hydrocarbon type solvents is quite low, and hence their organic film cannot directly be formed on polymethyl methacrylate and polycarbonate substrates by wet coating process unless a protecting layer is provided on these substrates. Thus, it has been desired to develop a naphthalocyanine compound having an excellent solubility in saturated hydrocarbon type solvents.

Further, they have a problem in that their absorption greatly varies depending on the kind of solvent, concentration, temperature, etc., and in a solution having a high concentration or in the form of a solid film, their ability to absorb semiconductor laser beams is greatly deteriorated, and moreover the reflectance which plays an important role when reflected light is used for reading out information recorded in optical disc is very low in the semiconductor laser region (780–830 nm).

In Japanese Patent Application Kokai (Laid-Open) No. 61-235188, only two compounds are disclosed as naphthalocyanine compounds having a high reflectance, and conception of their synthesis is mentioned in Japanese Patent Application Kokai (Laid-Open) Nos. 61-177287 and 61-177288. However, only a few working examples are presented in these patent gazettes, and only a few compounds can be synthesized in accordance with their descriptions.

Reaction Scheme II (line 3, right upper section, page 8) of Japanese Patent Application Kokai (Laid-Open) No. 61-177288 is a nucleophilic reaction of naphthalocyanine ring resembling Friedel-Crafts reaction and not suitable for introduction of alkoxyl group, alkylthio group and amino group. In reaction Scheme III (line 5, right upper section, page 8) of Japanese Patent Application Kokai (Laid-Open) No. 61-177288, the starting compound cannot be purified and the product is a very complicated mixture difficult to purify, so that this reaction is unsuitable for isolation of high purity product. Further, the reaction itself is disturbed by the influence of hydroxyl group attached to Si of starting compound, and the reaction cannot be advanced toward the intended direction. For the reasons mentioned above, it has been necessary to discover a new synthetic process in order to practically synthesize a new naphthalocyanine compound soluble in saturated hydrocarbon type organic solvent and exhibiting excellent characteristic properties as an optical recording medium, and particularly a naphthalocyanine compound having a sulfur-containing substituent on the naphthalocyanine ring.

SUMMARY OF THE INVENTION

With the aim of solving the above-mentioned problems, this invention has been devised.

This invention provides a naphthalocyanine derivative represented by the formula (I):

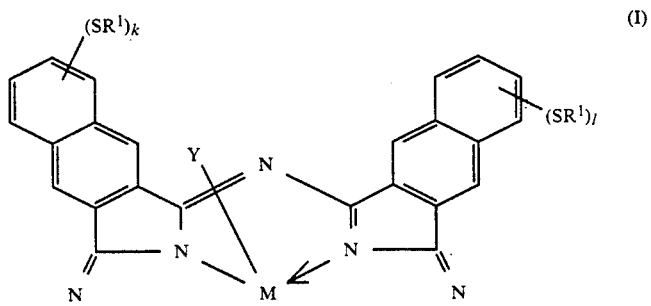

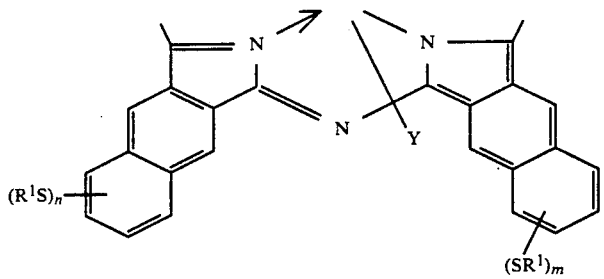

wherein $R^1$ in number of $(k+l+m+n)$ represents identical or different substituent represented by $-(CR^2R^3)_x-SiR^4R^5R^6$; $R^2$, $R^3$, $R^4$, $R^5$ and $R^6$, identical or different one another, represent hydrogen atom, halogen atom, alkyl group, alkoxyl group, aryl group or aryloxyl group; k, l, m and n, identical or different one another, represent an integer of 0 to 4, provided that $(k+l+m+n)$ is 1 or greater; x represents an integer of 1 to 30, provided that the $CR^2R^3$ groups, in number of x, may be identical or different; M represents Si, Ge or Sn; and Y represents aryloxyl group, alkoxyl group, trialkylsiloxyl group, triarylsiloxyl group, trialkoxysiloxyl group, triaryloxysiloxyl group, trityloxyl group or acyloxyl group, provided that the two Y's may be identical or different each other.

This invention further provides a process for producing naphthalocyanine derivatives represented by the formula (I), an optical recording medium using said naphthalocyanine derivative, and a process for producing said optical recording medium.

DESCRIPTION OF THE PREFERRED EMBODIMENTS

Figure 1:
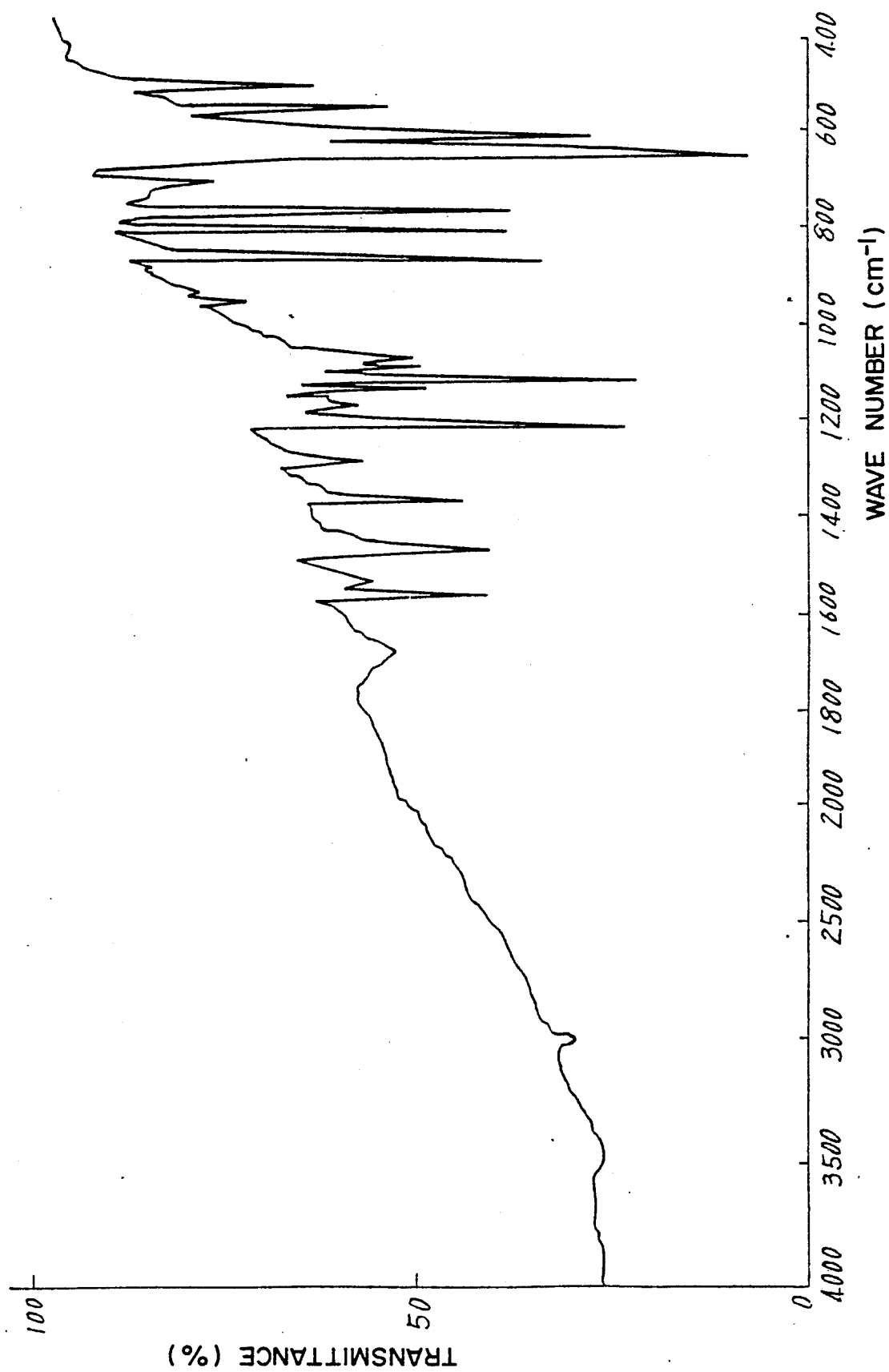
FIG. 1 is IR spectrum of 3,4-bis(dibromomethyl)-bromobenzene.

Since the naphthalocyanine derivatives represented by formula (I) are excellent in the solubility in saturated hydrocarbon type solvents and they are soluble in aromatic, halogen-containing, ether type and ketone type solvents, too, they can be purified and their purity can be improved easily. Further, their absorption does not change depending on kind of solvent and concentration, and they are quite excellent in the ability to absorb semiconductor laser beams. Further, there is a tendency that these naphthalocyanine compounds having a silicon atom-containing branched chain alkyl group are higher in melting point than the naphthalocyanine compounds having a straight chain alkyl group comparable in the number of carbon atoms, owing to which they are more improved in the stability to reproduce laser beams. Such a stability to reproducing laser beams is affected by melting point of compound, and a compound having a higher melting point is generally higher in the stability to reproducing laser beams. Further, an amorphous film prepared by spin-coating these naphthalocyanine derivatives having a relatively high melting point on an appropriate substrate shows no crystallization of film when allowed to stand under a high temperature-high humidity environmental test condition (80° C., 90% RH), and exhibits an excellent durability.

As said saturated hydrocarbon type solvent, hexane, heptane, octane, nonane, decane, undecane, dodecane and the like can be referred to. The naphthalocyanine derivatives represented by formula (I) exhibit a particularly high solubility in alicyclic solvents such as cyclopentane, cyclohexane, cycloheptane and the like.

Examples of said aromatic solvent include benzene, toluene, xylene, chlorobenzene, dichlorobenzene, trimethylbenzene, 1-chloronaphthalene, quinoline and the like. Examples of said halogen-containing solvent include methylene chloride, carbon tetrachloride, trichloroethane and the like. Examples of said ether type solvent include diethyl ether, dibutyl ether, tetrahydrofuran, ethylene glycol monomethyl ether, ethylene glycol dimethyl ether, diethylene glycol monomethyl ether, diethylene glycol dimethyl ether and the like. Examples of said ketone type solvent include acetone, methyl ethyl ketone, methyl propyl ketone, cyclopentanone, cyclohexanone, acetone alcohol and the like.

As $R^2$, $R^3$, $R^4$, $R^5$ and $R^6$ constituting substituent $R^1$ in formula (I), the followings can be referred to: straight and branched chain alkyl groups such as methyl, ethyl, n-propyl, sec-propyl, n-butyl, sec-butyl, t-butyl, n-amyl, t-amyl, 2-amyl, 3-amyl, hexyl, heptyl, octyl, decyl, dodecyl, tetradecyl, hexadecyl, octadecyl, eicosyl, docosyl and the like; alicyclic alkyl groups such as cyclohexyl, cyclopentyl, cyclopropyl and the like; alkoxyl groups such as methoxyl, ethoxyl, propoxyl, butoxyl, amyloxyl and the like; aryl groups such as phenyl, anisyl, tolyl and the like; aryloxyl groups such as phenoxyl, tolyloxyl, anisyloxyl and the like; halogen atoms such as fluorine, chlorine, bromine and the like; and hydrogen atom.

As M in formula (I), Si, Ge and Sn can be referred to. As examples of Y, the followings can be referred to: aryloxyl groups such as phenoxyl, tolyloxyl, anisyloxyl; alkoxyl groups such as amyloxyl, hexyloxyl, octyloxyl, decyloxyl, dodecyloxyl, tetradecyloxyl, hexadecyloxyl, octadecyloxyl, eicosyloxyl, docosyloxyl and the like; trialkylsiloxyl groups such as trimethylsiloxyl, triethylsiloxyl, tripropylsiloxyl, tributylsiloxyl and the like; triarylsiloxyl groups such as triphenylsiloxyl, trianisylsiloxyl, tritolylsiloxyl and the like; trialkoxysiloxyl groups such as trimethoxysiloxyl, triethoxysiloxyl, tripropoxysiloxyl, tributoxysiloxyl and the like; triaryloxysiloxyl groups such as triphenoxysiloxyl, trianisyloxysiloxyl, tritolyloxysiloxyl and the like; and acyloxyl groups such as acetoxyl, propionyloxyl, butyryloxyl, valeryloxyl, pivaloyloxyl, hexanoyloxyl, octanoyloxyl and the like.

The shape of these substituents exercises an important influence not only upon the solubility of the naphthalocyanine derivative of formula (I) in organic solvents but also upon melting point of the compound, and absorption, transmission and reflection spectra of the amorphous film prepared by spin-coating a solution of the compound in an appropriate organic solvent onto an appropriate substrate such as glass plate.

Particularly the length of alkyl group in the substituent Y linked to central metal M exercises a great influence on the spectra of spin-coated film. Accordingly, alkyl chain length of Y can be changed in accordance with the oscillating wavelength of the used laser.

On the other hand, the shape of the sulfur-containing substituent $R^1$ has a function of controlling solubility of the compound in organic solvent and its melting point, when alkyl chain length of Y is changed.

For example, when Y is a trialkylsiloxyl group, its alkyl chain length exercises a great influence on the spectra of spin-coated film, in such a manner that maximum absorption, minimum transmittance and maximum reflectance all shift greatly to the longer wavelength direction when alkyl chain length is shorter. Accordingly, a compound particularly desirable in the point of maximum reflectance with regard to the used semiconductor laser can be selected by changing the alkyl chain length of trialkylsiloxyl group, and $R^1$ can be selected appropriately so as to give optimum solubility and melting point to the naphthalocyanine derivative.

Naphthalocyanine derivatives of the formula (I) wherein M is Si or Ge are preferable in this invention.

Naphthalocyanine derivatives of formula (I) wherein k, l, m and n are all equal to 1 are preferable in this invention.

Naphthalocyanine derivatives of the formula (I) wherein the two symbols Y both represent a trialkylsiloxyl group are preferable in this invention.

Naphthalocyanine derivatives of the formula (I) wherein x in the definition of $R^1$ is 1 to 5, particularly 1 to 3, are preferable in this invention.

Naphthalocyanine derivatives of the formula (I) wherein $R^2$ and $R^3$ are hydrogen atoms are preferable in this invention.

Naphthalocyanine derivatives of the formula (I) wherein $R^4$, $R^5$ and $R^6$ are straight-chain alkyl groups, respectively, are preferable in this invention.

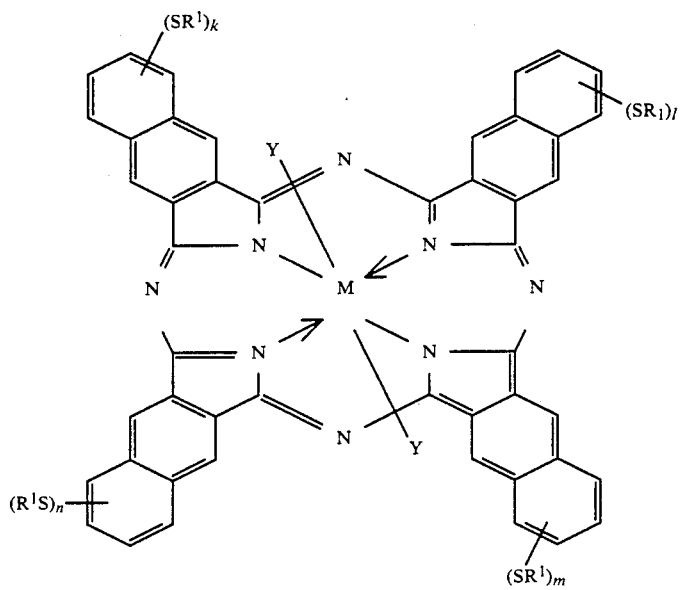

TABLE 1

| Compound No. | M | Y | $R_1$ | k | l | m | n |
|---|---|---|---|---|---|---|---|
| 1 | Si | OSiEt$_3$ | (CH$_2$)$_2$SiEt$_3$ | 1 | 1 | 1 | 1 |
| 2 | " | OSiPr$_3$ | " | " | " | " | " |
| 3 | " | OSiMe$_3$ | " | " | " | " | " |
| 4 | " | " | (CH$_2$)$_2$SiPr$_3$ | " | " | " | " |
| 5 | " | OSiEt$_3$ | " | " | " | " | " |
| 6 | " | " | (CH$_2$)$_2$SiBu$_3$ | " | " | " | " |
| 7 | " | OSiMe$_3$ | " | " | " | " | " |
| 8 | " | OSiBu$_3$ | CH$_2$SiMe$_3$ | " | " | " | " |
| 9 | " | OSiPr$_3$ | CH$_2$SiMe$_3$ | " | " | " | " |
| 10 | " | " | CH$_2$SiEt$_3$ | " | " | " | " |
| 11 | " | OSiEt$_3$ | CH$_2$SiEt$_3$ | " | " | " | " |
| 12 | " | OSi(C$_5$H$_{11}$)$_3$ | CH$_2$SiMe$_3$ | " | " | " | " |
| 13 | " | OSi(C$_6$H$_{13}$)$_3$ | CH$_2$SiMe$_3$ | " | " | " | " |
| 14 | " | OSiBu$_3$ | (CH$_2$)$_2$SiMe$_3$ | " | " | " | " |
| 15 | " | OSiPr$_3$ | (CH$_2$)$_2$SiMe$_3$ | " | " | " | " |
| 16 | " | OSiEt$_3$ | (CH$_2$)$_2$SiMe$_3$ | " | " | " | " |
| 17 | " | OSiMe$_3$ | (CH$_2$)$_2$SiMe$_3$ | " | " | " | " |
| 18 | " | OSiEt$_3$ | (CH$_2$)$_2$SiMe$_3$ | " | " | " | " |
| 19 | " | OSiMe$_3$ | CH$_2$Si(OMe)$_3$ | " | " | " | " |
| 20 | " | OSiEt$_3$ | CH$_2$Si(OMe)$_3$ | " | " | " | " |
| 21 | " | OSiMe$_3$ | CH$_2$Si(OEt)$_3$ | " | " | " | " |
| 22 | " | OSiEt$_3$ | CH$_2$Si(OEt)$_3$ | " | " | " | " |
| 23 | " | OSiPr$_3$ | (CH$_2$)$_3$Si(OMe)$_3$ | " | " | " | " |
| 24 | " | OSiEt$_3$ | (CH$_2$)$_3$Si(OMe)$_3$ | " | " | " | " |
| 25 | " | OSiMe$_3$ | (CH$_2$)$_3$Si(OMe)$_3$ | " | " | " | " |
| 26 | " | OSiEt$_3$ | CH$_2$Si(OPh)$_3$ | " | " | " | " |
| 27 | " | OSi(OMe)$_3$ | CH$_2$SiMe$_3$ | " | " | " | " |
| 28 | " | OSi(OEt)$_3$ | (CH$_2$)$_3$SiMe$_3$ | " | " | " | " |
| 29 | " | OC$_8$H$_{17}$ | CH$_2$SiMe$_3$ | " | " | " | " |
| 30 | " | OSi(OEt)$_3$ | CH$_2$SiMe$_3$ | " | " | " | " |
| 31 | " | OSiBu$_3$ | CH$_2$SiPh$_3$ | " | " | " | " |
| 32 | " | OSiPr$_3$ | CH$_2$SiPh$_3$ | " | " | " | " |
| 33 | Ge | OSiEt$_3$ | (CH$_2$)$_2$SiPr$_3$ | " | " | " | " |
| 34 | " | OSiBu$_3$ | CH$_2$SiMe$_3$ | " | " | " | " |
| 35 | " | OSiPr$_3$ | CH$_2$SiMe$_3$ | " | " | " | " |
| 36 | " | OSiEt$_3$ | (CH$_2$)$_3$Si(OMe)$_3$ | " | " | " | " |
| 37 | Sn | OSiPr$_3$ | CH$_2$SiMe$_3$ | " | " | " | " |
| 38 | " | OC$_{18}$H$_{37}$ | CH$_2$SiMe$_3$ | " | " | " | " |
| 39 | " | OSiPh$_3$ | (CH$_2$)SiMe$_3$ | " | " | " | " |
| 40 | " | OPh | (CH$_2$)$_3$Si(OMe)$_3$ | " | " | " | " |
| 41 | " | OSi(OEt)$_3$ | (CH$_2$)$_3$SiMe$_3$ | " | " | " | " |
| 42 | Si | OSiPh$_3$ | (CH$_2$)$_3$SiMe$_3$ | " | " | " | " |
| 43 | " | OSi(OPh)$_3$ | CH$_2$SiEt$_3$ | " | " | " | " |
| 44 | " | OCOCH$_3$ | (CH$_2$)$_3$SiEt$_3$ | " | " | " | " |
| 45 | " | OCPh$_3$ | (CH$_2$)$_3$SiEt$_3$ | " | " | " | " |
| 46 | " | OPh | (CH$_2$)Si(OMe)$_3$ | " | " | " | " |
| 47 | Ge | OCPh$_3$ | (CH$_2$)$_3$Si(OMe)$_3$ | " | " | " | " |
| 48 | " | OC$_{18}$H$_{37}$ | CH$_2$SiMe$_3$ | " | " | " | " |
| 49 | " | OSi(OPh)$_3$ | CH$_2$Si(OPh)$_3$ | " | " | " | " |
| 50 | " | OSi(OEt)$_3$ | (CH$_2$)$_3$SiMe$_3$ | " | " | " | " |
| 51 | Si | OSiMe$_3$ | CH$_2$SiMe$_3$ | 2 | 2 | 2 | 2 |
| 52 | " | OSiEt$_3$ | " | " | " | " | " |
| 53 | Ge | OSiPr$_3$ | " | " | " | " | " |
| 54 | " | OSiMe$_3$ | (CH$_2$)$_2$SiMe$_3$ | " | " | " | " |
| 55 | Sn | OSiEt$_3$ | " | " | " | " | " |
| 56 | Si | OSiEt$_3$ | CH$_2$CCl$_2$SiMe$_3$ | 1 | 1 | 1 | 1 |
| 57 | " | OSiBu$_3$ | CCl$_2$CH$_2$SiEt$_3$ | " | " | " | " |

In this table, Me, Et, Pr, Bu and Ph represent CH$_3$, C$_2$H$_5$, C$_3$H$_7$, C$_4$H$_9$ and C$_6$H$_5$, respectively.

The naphthalocyanine derivatives of formula (I) can be produced in the following manner. That is, they can be produced by reacting a naphthalocyanine derivative represented by the formula (II):

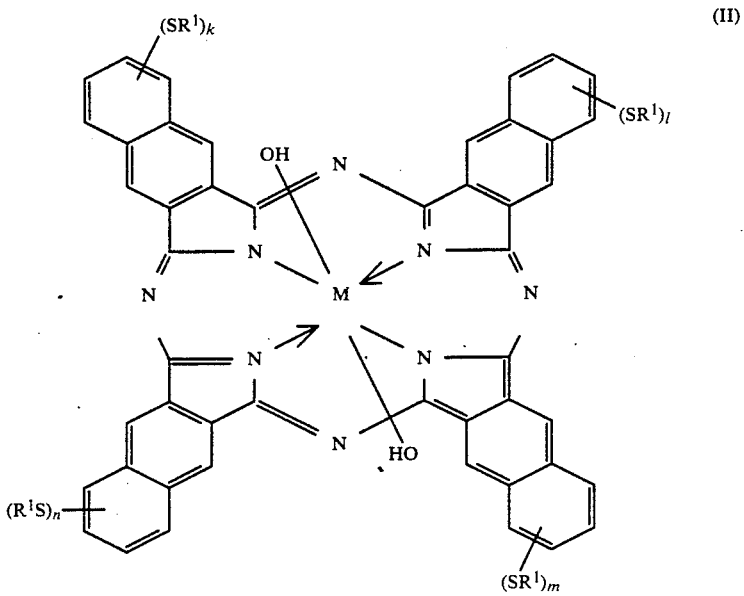

wherein k, l, m, n, $R^1$ and M are as defined in formula (I), with a chlorosilane represented by the formula (III):

$$(R^7)_3SiCl \quad (III)$$

or a silanol represented by the formula (IV):

$$(R^8)_3SiOH \quad (IV)$$

provided that, in the formulas (III) and (IV), $R^7$ and $R^8$ independently represent alkyl group, aryl group, alkoxyl group or aryloxyl group, or an alcohol represented by the formula (V):

$$R^9OH \quad (V)$$

wherein $R^9$ represents alkyl group or aryl group, or a compound represented by the formula (VI):

$$R^{10}CO\cdot X \quad (VI)$$

wherein $R^{10}$ represents alkyl group and X represents a halogen atom, hydroxyl group or acyloxyl group.

Thus, a naphthalocyanine derivative represented by the formula (I) can be produced by reacting, at an elevated temp., a compound represented by the formula (II) with an excessive quantity of a compound represented by the formula (III), (IV), (V) or (VI). The reaction temperature is preferably 80–250° C., and the reaction time is preferably 30 minutes to 10 hours. This reaction is preferably carried out in the absence of a solvent or in a solvent such as benzene, toluene, xylena, trimethylbenzene, chlorobenzene, dichlorobenzene, trichlorobenzene, 1-chloronaphthalene, tetralin, pyridine, β-picoline, quinoline or the like, and optionally in the presence of an aliphatic amine such as triethylamine, tripropylamine, tributylamine, tripentylamine, trihexylamine and the like.

The naphthalocyanine derivative of the formula (I) can be isolated from reaction mixture and purified by separating the reaction mixture by chromatography and recrystalllizing the product, for example.

The naphthalocyanine derivative represented by formula (II) can be obtained by hydrolyzing, at an elevated temperature, a naphthalocyanine derivative represented by the formula (IX):

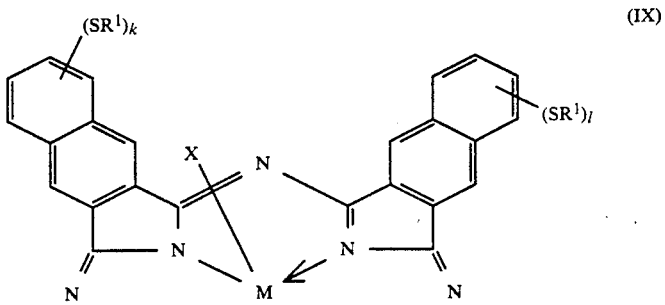

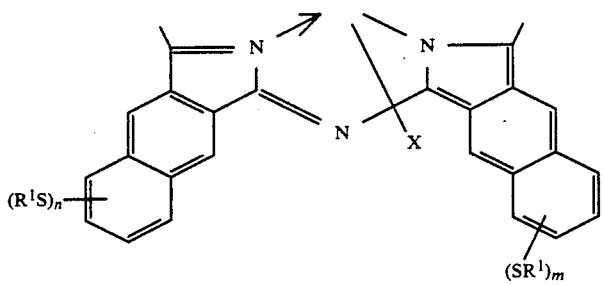

wherein k, l, m, n, M and $R^1$ are as defined in formula (I) and X represents halogen atom, provided that the two symbols X may be identical or different each other. The reaction temperature is preferably 50–150° C., and the reaction tim is preferably 30 minutes to 10 hours. For this reason, this reaction is preferably carried out in a solvent mixture such as pyridine/water, pyridine/aqueous ammonia, methanol/aqueous ammonia, ethanol/aqueous ammonia, propanol/aqueous ammonia, and the like.

The naphthalocyanine derivative represented by the formula (IX) can be obtained by reacting, at an elevated temperature, one mole of 1,3-diiminobenz(f)-isoindoline represented by the formula (X):

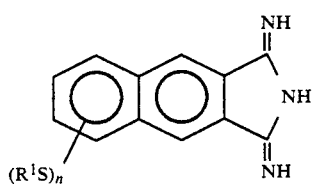
(X)

or one mole of 2,3-dicyanonaphthalene represented by the formula (XI):

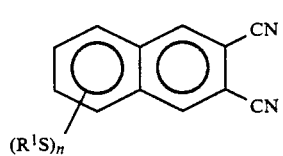
(XI)

provided that, in formulas (X) and (XI), $R^1$ is as defined in formula (I) and n represents an integer of 1–4, with 1 to 100 moles of a metal halide represented by formula (XII):

$$MX_p \qquad (XII)$$

wherein X represents halogen atom, p is a positive integer representing the number of X atoms linked to metal M, and M is Si, Ge or Sn. The reaction temperature of this reaction is preferably 150–300° C., and its reaction time is preferably 30 minutes to 10 hours. This reaction may be carried out either in the absence of solvent or in a solvent such as urea, tetralin, quinoline, 1-chloronaphthalene, 1-bromonaphthalene, trimethylbenzene, dichlorobenzene, trichlorobenzene or the like. This reaction is preferably carried out in the presence of an amine. The amines which can be used for this purpose include triethylamine, tripropylamine, tributylamine, tripentylamine, trihexylamine, and the like. As said metal halide, $SiCl_4$, $SiBr_4$, $SiI_4$, $GeCl_4$, $GeBr_4$, $SnCl_2$, $SnI_2$ and the like can be referred to.

The 1,3-diiminobenz(f)isoindoline represented by formula (X) can be obtained by heating, under reflux, a 2,3-dicyanonaphthalene derivative represented by formula (XI) for 1-10 hours in methanol in the presence of sodium methoxide catalyst while bubbling ammonia gas.

The 2,3-dicyanonaphthalene derivative represented by formula (XI) can be produced mainly by the following two methods.

Thus, according to the first method, an o-oxylene derivative represented by formula (XIII):

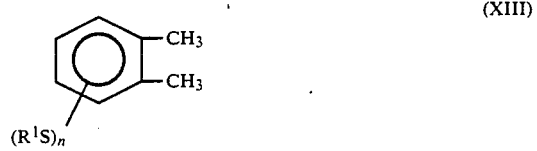
(XIII)

wherein $R^1$ is as defined in formula (I) and n represents an integer of 1–4, and N-bromosuccinimide represented by formula (XIV):

(XIV)

are irradiated with light at an elevated temperature to obtain a compound represented by formula (XV):

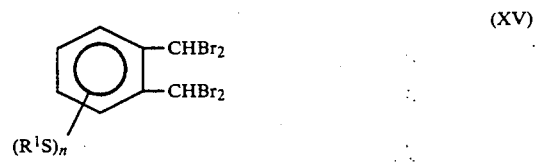
(XV)

wherein $R^1$ is as defined in formula (I) and n represents an integer of 1–4, and then the latter is reacted at an elevated temperature with fumaronitrile represented by formula (XVI):

(XVI)

to obtain a 2,3-dicyanonaphthalene derivative represented by formula (XI).

Generally speaking, the reaction between the o-xylene derivative of formula (XIII) and N-bromosuccinimide of formula (XIV) can be performed by heating, under reflux, 0.2 mole of o-xylene derivative and 0.8 mole of N-bromosuccinimide for 4–12 hours in a solvent inert to irradiation while irradiating the mixture with a high pressure mercury lamp. In carrying out this reaction, a peroxide which is a radical generator must be added as a photo reaction initiator. As said peroxide, benzoyl peroxide, octanoyl peroxide, cyclohexanone peroxide, isobutyryl peroxide, 2,4-dichlorobenzoyl peroxide, methyl ethyl ketone peroxide and the like can be referred to. Usually, said peroxide is used in an amount ranging from 500 mg to 2 g per 500 ml of solvent. Said solvent inert to irradiation is appropriately selected from halogen-containing solvents such as chloroform, carbon tetrachloride and the like or aromatic solvents such as benzene, chlorobenzene and the like.

The reaction between the compound represented by formula (XV) and fumaronitrile represented by formula (XVI) is carried out by reacting 1 mole of compound (XV) with 1–2 moles of fumaronitrile. The reaction temperature is preferably 70–100° C., and the reaction time is preferably 5–10 hours. As the solvent, polar organic solvents such as N,N-dimethylformamide, N,N-dimethylacetamide, dimethylsulfoxide, N,N-diethylformamide, N,N-diethylacetamide and the like are preferable.

According to the second method, bromo-2,3-dicyanonaphthalene represented by formula (XVII):

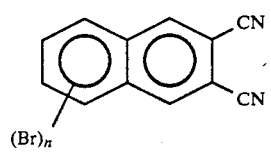

(XVII)

wherein n represents an integer of 1–4, is subjected to a substitution reaction with an excessive quantity of copper (I) thiolate represented by formula (VIII):

$$CuSR^1 \quad\quad (VIII)$$

wherein $R^1$ is as defined in formula (I), at an elevated temperature. The reaction temperature is preferably 80–250° C., and the reaction time is preferably 1–30 hours. As the solvent of this reaction, benzene, toluene, xylene, trimethylbenzene, chlorobenzene, dichlorobenzene, trichlorobenzene, 1-chloronaphthalene, tetralin, pyridine, β-picoline, quinoline and the like can be used either as a single solvent or as a solvent mixture.

The bromo-2,3-dicyanonaphthalene represented by formula (XVII) can be synthesized, for example, according to the following Scheme (A) with reference to the description of Zhurnal Organicheskoi Khimii, vol. 7, page 369 (1971):

(A)

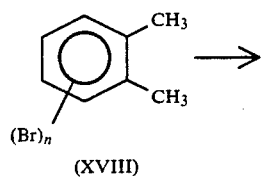

(XVIII)

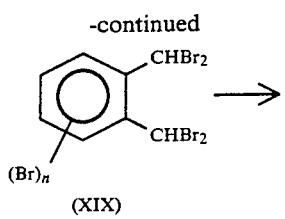

(XIX)

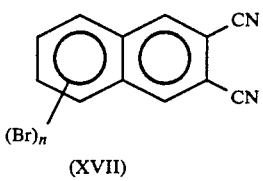

(XVII)

Thus, bromo-o-xylene (XVIII) and N-bromo-succinimide represented by formula (XIV):

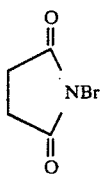

(XIV)

are irradiated with light at an elevated temperature to obtain bis(dibromomethyl)bromobenzene (XIX), and the latter is reacted at an elevated temperature with fumaronitrile represented by formula (XVI):

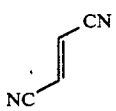

(XVI)

to obtain bromo-2,3-dicyanonaphthalene represented by formula (XVII).

Generally speaking, the reaction between bromo-o-xylene (XIII) and N-bromosuccinimide (XIV) can be performed by heating, under reflux, 0.2 mole of bromo-o-xylene and 0.8 mole of N-bromosuccinimide for 4–12 hours in a solvent inert to irradiation, while irradiating the mixture with a high pressure mercury lamp. In carrying out this reaction, a peroxide which is a radical generator must be added as a photo reaction initiator. As said peroxide, benzoyl peroxide, octanoyl peroxide, cyclohexanone peroxide, isobutyryl peroxide, 2,4-dichlorobenzoyl peroxide, methyl ethyl ketone peroxide and the like can be referred to. Usually, the peroxide is added in an amount ranging from 500 mg to 2 g per 500 ml of solvent. Said solvent inert to irradiation is appropriately selected from halogen-containing solvents such as chloroform, carbon tetrachloride and the like or aromatic solvents such as benzene, chlorobenzene and the like.

The reaction between compound (XIX) and fumaronitrile represented by formula (XVI) is performed by using 1 mole of compound (XIX) and 1–2 moles of fumaronitrile (XVI). The reaction temperature is preferably 70–100° C., and the reaction time is preferably 5–10 hours. As the solvent, polar solvents such as N,N-dimethylformamide, N,N-dimethylacetamide, dimethyl sulfoxide, N,N-diethylformamide, N,N-diethylacetamide and the like are preferable.

It is also possible to produce the naphthalocyanine derivative of formula (I) by reacting a naphthalocyanine derivative represented by formula (VII):

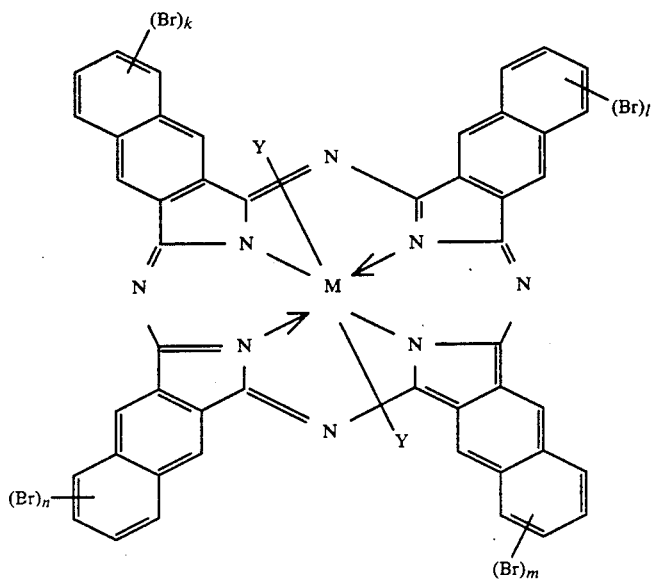

(VII)

wherein k, l, m, n, M and Y are as defined in formula (I), with copper (I) thiolate represented by formula (VIII):

$$CuSR^1 \qquad (VIII)$$

wherein $R^1$ is as defined in formula (I).

Thus, a naphthalocyanine derivative represented by formula (I) can be obtained by subjecting a compound represented by formula (VII) to a substitution reaction with an excessive quantity of copper (I) thiolate represented by formula (VIII) at an elevated temperature. The reaction temperature is preferably 80–250° C., and the reaction time is preferably 1–30 hours. As the solvent of this reaction, benzene, toluene, xylene, trimethylbenzene, chlorobenzene, dichlorobenzene, trichlorobenzene, 1-chloronaphthalene, tetralin, pyridine, β-picoline, quinoline and the like can be used either as a single solvent or as a mixed solvent.

For obtaining a naphthalocyanine derivative of formula (I) wherein $R^1$ represents plural substituents different from one another, compound (VII) must be reacted with plural kinds of copper (I) thiolates of which substituents $R^1$ correspond to the "substituents different from one another".

The naphthalocyanine derivative (I) can be isolated from reaction mixture and purified by, for example, separating the reaction mixture by column chromatography or thin layer chromatography and thereafter recrystallizing the product.

The naphthalocyanine derivative represented by formula (VII) can be obtained by reacting, at an elevated temperature, a naphthalocyanine derivative represented by formula (XX):

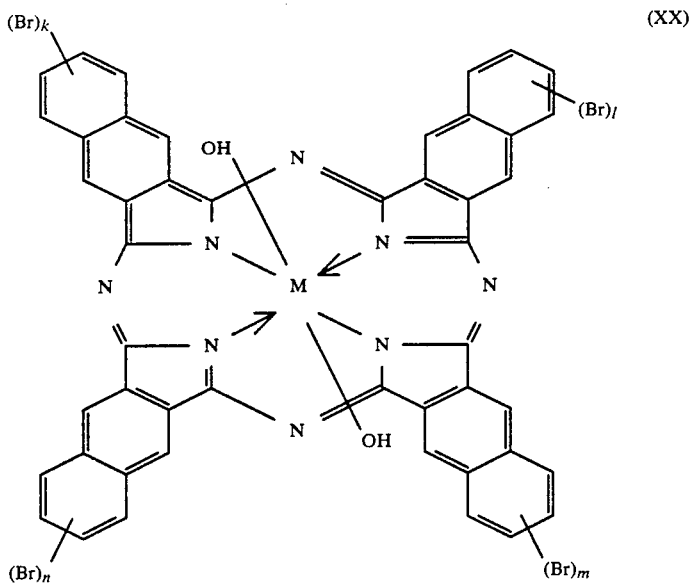

(XX)

wherein k, l, m and n, identical or different, independently represent an integer of 0–4, provided that (k+l+m+n) is an integer of 1 or greater, and M represents Si, Ge or Sn, with an excessive quantity of chlorosilane represented by formula (III):

  (III)

or silanol represented by formula (IV):

  (IV)

provided that, in formulas (III) and (IV), $R^7$ and $R^8$ independently represent alkyl group, aryl group, alkoxyl group or aryloxyl group, or an alcohol represented by formula (V):

$R^9OH$  (V)

wherein $R^9$ represents alkyl group or aryl group, or a compound represented by formula (VI):

  (VI)

wherein $R^{10}$ represents alkyl group and X represents a halogen atom, hydroxyl group or acyloxyl group. The reaction temperature is preferably 80–250° C., and the reaction time is preferably 30 minutes to 10 hours. This reaction is preferably carried out either in the absence of solvent or in a solvent such as benzene, toluene, xylene, trimethylbenzene, chlorobenzene, dichlorobenzene, trichlorobenzene, 1-chloronaphthalene, tetralin, pyridine, β-picoline, quinoline or the like, optionally in the presence of an aliphatic amine such as triethylamine, tripropylamine, tributylamine, tripentylamine, trihexylamine or the like.

The naphthalocyanine represented by formula (VII) can be isolated from the reaction mixture and purified by, for example, separating the reaction mixture by chromatography and thereafter recrystallizing the product.

The naphthalocyanine derivative represented by formula (XX) can be obtained by treating a naphthalocyanine derivative represented by formula (XXI):

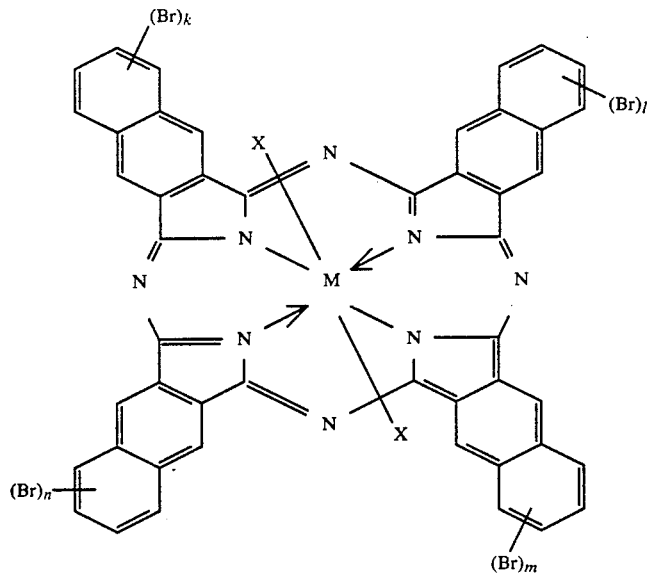

wherein k, l, m and n, identical or different, independently represent an integer of 0–4, provided that (k+l+m+n) is an integer of 1 or greater, M represents Si, Ge or Sn, and X represents halogen atom, provided that the two symbols X may be identical or different, in concentrated sulfuric acid at room temperature for 1–10 hours, and thereafter heating it under reflux in concentrated aqueous ammonia for 30 minutes to 10 hours or by heating it under reflux in pyridine/water, pyridine/aqueous ammonia, methanol/aqueous ammonia, ethanol aqueous ammonia or propanol/aqueous ammonia for a period of 30 minutes to 10 hours.

The naphthalocyanine derivative represented by formula (XXI) can be obtained by reacting, at an elevated temperature, one mole of bromo-1,3-diiminobenz(f)isoindoline represented by formula (XXII):

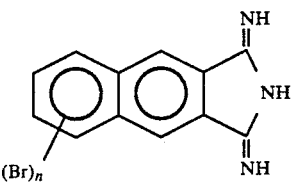

wherein n represents an integer of 1–4, with 1–100 moles of a metal halide represented by formula (XII):

$MX_p$  (XII)

wherein X represents halogen atom, p is a positive integer representing the number of X linked to metal M, and M represents Si, Ge or Sn. The reaction temperature is preferably 150–300° C., and the reaction time is preferably 30 minutes to 10 hours. The reaction may be carried out either in the absence of solvent or in a solvent such as urea, tetralin, quinoline, 1-chloronaphthalene, 1-bromonaphthalene, trimethylbenzene, dichlorobenzene, trichlorobenzene or the like. This reaction is preferably carried out in the presence of an amine. The amines usable for this purpose include triethylamine, tripropylamine, tributylamine, tripentylamine, trihexylamine and the like. As said metal halide, $SiCl_4$, $SiBr_4$, $SiI_4$, $GeCl_4$, $GeBr_4$, $SnCl_2$, $SnI_2$ and the like can be referred to.

The bromo-1,3-diiminobenz(f)isoindoline represented by formula (XII) can be obtained by heating, under reflux, bromo-2,3-dicyanonaphthalene represented by formula (XVII):

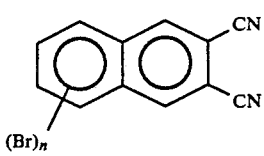

wherein n represents an integer of 1-4, in methanol in the presence of sodium methoxide catalyst for 1-10 hours, while bubbling ammonia gas.

In the above-mentioned second and third aspects of this invention, processes for producing naphthalocyanine derivatives of formulas (II), (I), (IX), (XII), (VII), (XX) and (XXI) wherein M is Si or Ge are preferable.

In the above-mentioned two aspects of this invention, processes for producing naphthalocyanine derivatives of formulas (II), (I), (IX), (X), (XI), (XIII), (XV), (XVII), (XVIII), (XIX), (VII), (XX), (XXI) and (XXII) wherein k, l, m and n all represent a number of 1 are preferable.

In the above-mentioned two aspects of this invention, processes for producing naphthalocyanine derivatives of formulas (III) and (IV) wherein $R^7$ and $R^8$ both represent an alkyl group and formulas (I) and (VII) wherein the two Y's both represent a trialkylsiloxyl group are preferable.

In the above-mentioned two aspects of this invention, processes for producing naphthalocyanine derivatives of formulas (I), (II), (IX), (X), (XI), (XIII), (XV) and (VIII) wherein x in the definition of $R^1$ is 1-5 are preferable.

In the above-mentioned two aspects of this invention, processes for producing naphthalocyanine derivatives of formulas (I), (II), (IX), (X), (XI), (XIII), (XV) and (VIII) wherein $R^2$ and $R^3$ represent H are preferable.

In the above-mentioned two aspects of this invention, processes for producing naphthalocyanine derivatives of formulas (I), (II), (IX), (X), (XI), (XIII), (XV) and (VIII) wherein $R^4$, $R^5$ and $R^6$ represent straight-chain alkyl groups are preferable.

Next, an optical recording medium can be obtained by forming a recording film layer composed mainly of a naphthalocyanine derivative represented by formula (I) on a substrate surface.

In the optical recording medium of this invention, a recording layer composed mainly of naphthalocyanine derivative of formula (I) is provided on a substrate. If desired, other layers such as under layer, protecting layer and the like can also be provided.

The substrate material used in this invention is that known to specialists in the art, and it may be transparent or opaque to the used laser beams. When reading and writing is to be carried out with laser beams from the side of substrate, however, the substrate must be transparent to the laser beams. When writing or reading is carried out from the other side, i.e. from the side of recording layer, it is unnecessary to use a substrate transparent to the laser beams. The materials used as the substrate include inorganic materials such as glass, quartz, mica, ceramics, plate or foil of metal and the like and plate of organic polymeric materials such as paper, polycarbonate, polyester, cellulose acetate, nitrocellulose, polyethylene, polypropylene, polyvinyl chloride, vinylidene chloride copolymers, polyamide, polystyrene, polymethyl methacrylate, methyl methacrylate copolymers and the like, though these materials are not limitative. A support made of an organic polymer having a low heat conductivity is preferable because of small heat loss and high sensitivity at the time of recording. A guide channel constituted of concavity and convexity may be provided on the substrate, if desired.

If desired, an underlayer film may also be provided on the substrate.

An optical recording medium wherein there is formed a recording film layer composed mainly of a naphthalocyanine derivative of formula (I) wherein M is Si or Ge is preferable in this invention.

An optical recording medium wherein there is formed a recording film layer composed mainly of a naphthalocyanine derivative of formula (I) wherein k, l, m and n all represent a number of 1 is preferable in this invention.

An optical recording medium wherein there is formed a recording film layer composed mainly of a naphthalocyanine derivative of formula (I) wherein the two symbols Y both represent a trialkylsiloxyl group is preferable in this invention.

An optical recording medium wherein there is formed a recording film layer composed mainly of a naphthalocyanine derivative of formula (I) wherein, in the group $R^1$, x is a number of 1-5 is preferable in this invention.

An optical recording medium wherein there is formed a recording film layer composed mainly of a naphthalocyanine derivative of formula (I) wherein $R^2$ and $R^3$ represent H is preferable in this invention.

An optical recording medium wherein there is formed a recording film layer composed mainly of a naphthalocyanine derivative of formula (I) wherein $R^4$, $R^5$ and $R^6$ represent straight-chain alkyl groups is preferable in this invention.

Next, the above-mentioned optical recording medium can be produced by forming a recording film layer on a substrate surface by the use of a solution prepared by dissolving a naphthalocyanine derivative of formula (I) as a main component into an organic solvent.

Said organic solvent is selected from the above-mentioned aromatic, halogen-containing, ether type, ketone type and saturated hydrocarbon type solvents capable of dissolving the naphthalocyanine derivative of formula (I), and it may be any of single solvent and solvent mixture. Preferably, however, a solvent not attacking the used substrate should be used.

As the method for forming a recording film layer by the use of a solution prepared by dissolving a naphthalocyanine derivative of formula (I) into an organic solvent, coating method, printing method and dipping method can be referred to. Concretely speaking, a dye is dissolved into the solvent, and the resulting solution is formed into a film by spraying, roller coating, spin coating or dipping. At the time of forming the recording film layer, a binder such as polymer binder and the like, a stabilizer, etc. may be added if desired. Non-limitative examples of said binder include polyimide resin, polyamide resin, polystyrene resin, acrylic resin and the like.

The material for forming the recording layer is a single material or a combination of two or more materials. When two or more kinds of materials are used in combination, the structure may be any of laminated structure and single layer structure composed of a mixture of materials. The recording layer preferably has a film thickness of 50 to 10,000 angstroms, and particularly 100 to 5,000 angstroms.

In reproducing the formed record image optically, a reflected light is often used. When writing and reading is carried out from the side of substrate, a metallic layer exhibiting a high reflectance may be provided on the surface of the recording layer existing in the other side of substrate as a means for enhancing contrast. When writing and reading is carried out from the other side of substrate, i.e. from the recording layer side, a metallic layer exhibiting a high reflectance may be provided between the substrate and recording layer. As the metal exhibiting a high reflectance, Al, Cr, Au, Pt, Sn and the like can be used. These films can be formed by the well known film-forming techniques such as vacuum vapor deposition, sputtering, plasma vapor deposition, etc. Thickness of the film is in the range of 100 to 10,000 angstroms.

Since the naphthalocyanine has a high reflectance in itself, it is not particularly necessary to provide a metallic reflecting layer.

When surface smoothness of substrate itself has an important meaning, it is advisable to provide a uniform film of organic polymer on the substrate. As the polymer used for this purpose, commercially available polymers such as polyester, polyvinyl chloride and the like can be used.

Further as an outermost layer, a protecting layer may be provided in order to improve stability and protection. Further, a layer for decreasing surface reflectance and thereby increasing sensitivity may also be provided. As the material used for forming such protecting layers, polyvinylidene chloride, polyvinyl chloride, vinylidene chloride-acrylonitrile copolymer, polyvinyl acetate, polyimide, polymethyl methacrylate, polystyrene, polyisoprene, polybutadiene, polyurethane, polyvinyl butyral, fluorinated rubber, polyester, epoxy resin, silicone resin, cellulose acetate and the like can be referred to. These materials may be used either as single material or as a blended mixture. Incorporation of silicone oil, antistatic agent, crosslinking agent and the like is preferable from the viewpoint of improving the film performances. The protecting layer may be formed into a superposed double layer structure. The above-mentioned materials for forming protecting layer can be used either by dissolving them into an appropriate solvent and coating the solution or by forming them into a thin film and laminating the film. Thickness of such protecting layer is adjusted to 0.1 to 10 microns, and preferably 0.1 to 2 microns.

A process for producing an optical recording medium by the use of a naphthalocyanine derivative of formula (I) wherein M is Si or Ge is preferable in this invention.

A process for producing an optical recording medium by the use of a naphthalocyanine derivative of formula (I) wherein k, l, m and n all represent a number of 1 is preferable in this invention.

A process for producing an optical recording medium by the use of a naphthalocyanine derivative of formula (I) wherein the two symbols Y both represent a trialkylsiloxyl group is preferable in this invention.

A process for producing an optical recording medium by the use of a naphthalocyanine derivative of formula (I) wherein, in the group $R^1$, x is a number of 1-5 is preferable in this invention.

A process for producing an optical recording medium by the use of a naphthalocyanine derivative of formula (I) wherein $R^2$ and $R^3$ represent H is preferable in this invention.

A process for producing an optical recording medium by the use of a naphthalocyanine derivative of formula (I) wherein $R^4$, $R^5$ and $R^6$ represent straight-chain alkyl groups is preferable in this invention.

Next, this invention will be explained by way of the following examples. This invention is by no means limited by these examples.

SYNTHETIC EXAMPLE 1

Synthesis of 3,4-bis(dibromomethyl)bromobenzene

One gram of benzoyl peroxide was added to a solution of 37 g (0.2 mol) of 4-bromo-o-xylene (purity 75%, manufactured by Aldrich Co.) and 142.4 g (0.8 mol) of N-bromosuccinimide in 500 ml of carbon tetrachloride. While refluxing the mixture in an internal irradiation tube (manufactured by Ushio Denki Kogyo K.K.), it was irradiated with light for 8-12 hours by means of 100W high pressure mercury lamp. Then, the mixture was allowed cool, the deposited white crystalline material was filtered off with suction, and the filtrate (a solution in carbon tetrachloride) was concentrated under reduced pressure. The solid product thus obtained was recrystallized from hexane/methylene chloride to obtain 64 g of 3,4-bis(dibromomethyl)bromobenzene as a colorless crystalline product. Its characteristics were as follows:

(1) Melting point: 108.5–110.5° C.
(2) Elementary analyses:

|  | C | H | Br |
| --- | --- | --- | --- |
| Calculated (%) | 19.19 | 1.01 | 79.80 |
| Found (%) | 19.12 | 0.88 | 79.84 |

(3) NMR spectrum: CDCl$_3$ solvent
δ: 7.81 (1H-br-s)
7.57 (1H, d, J=8.54Hz)
7.50 (1H, dd, J=8.54, 1.83Hz)
7.06 (1H, s)
7.02 (1H, s) (4) IR spectrum (KBr method): FIG. 1

SYNTHETIC EXAMPLE 2

Synthesis of 6-bromo-2,3-dicyanonaphthalene

To a solution of 100.2 g (0.2 mol) of 3,4-bis(dibromomethyl)bromobenzene and 27 g (0.346 mol) of fumaronitrile in 800 ml of anhydrous N,N-dimethylformamide was added 200 g (0.67 mol) of sodium iodide with sufficient stirring, and the resulting mixture was stirred under nitrogen at about 75° C. for about 7 hours. After completion of the reaction, the reaction mixture was poured onto about 4 kg of ice. Sodium hydrogensulfite was slowly added until the reddish-brown aqueous solution thus obtained turned light-yellow. Sodium hydrogensulfite was added in a slight excess and stirred for a while. The resulting mixture was allowed to stand overnight at room temperature. The light-yellow solid precipitated was filtered by suction and sufficiently washed with water and then methanol. The light-yellow solid was recrystallized from acetone/ethanol to obtain 33 g of colorless needles. The crystals were confirmed to be 6-bromo-2,3-dicyanonaphthalene from the following analysis results:

(1) Melting point: 254.5° –255.5° C.
(2) Elementary analysis values:

|  | C | H | N | Br |
| --- | --- | --- | --- | --- |
| Calculated (%) | 56.06 | 1.96 | 10.90 | 31.08 |
| Found (%) | 55.99 | 1.67 | 10.87 | 30.74 |

Figure 2:
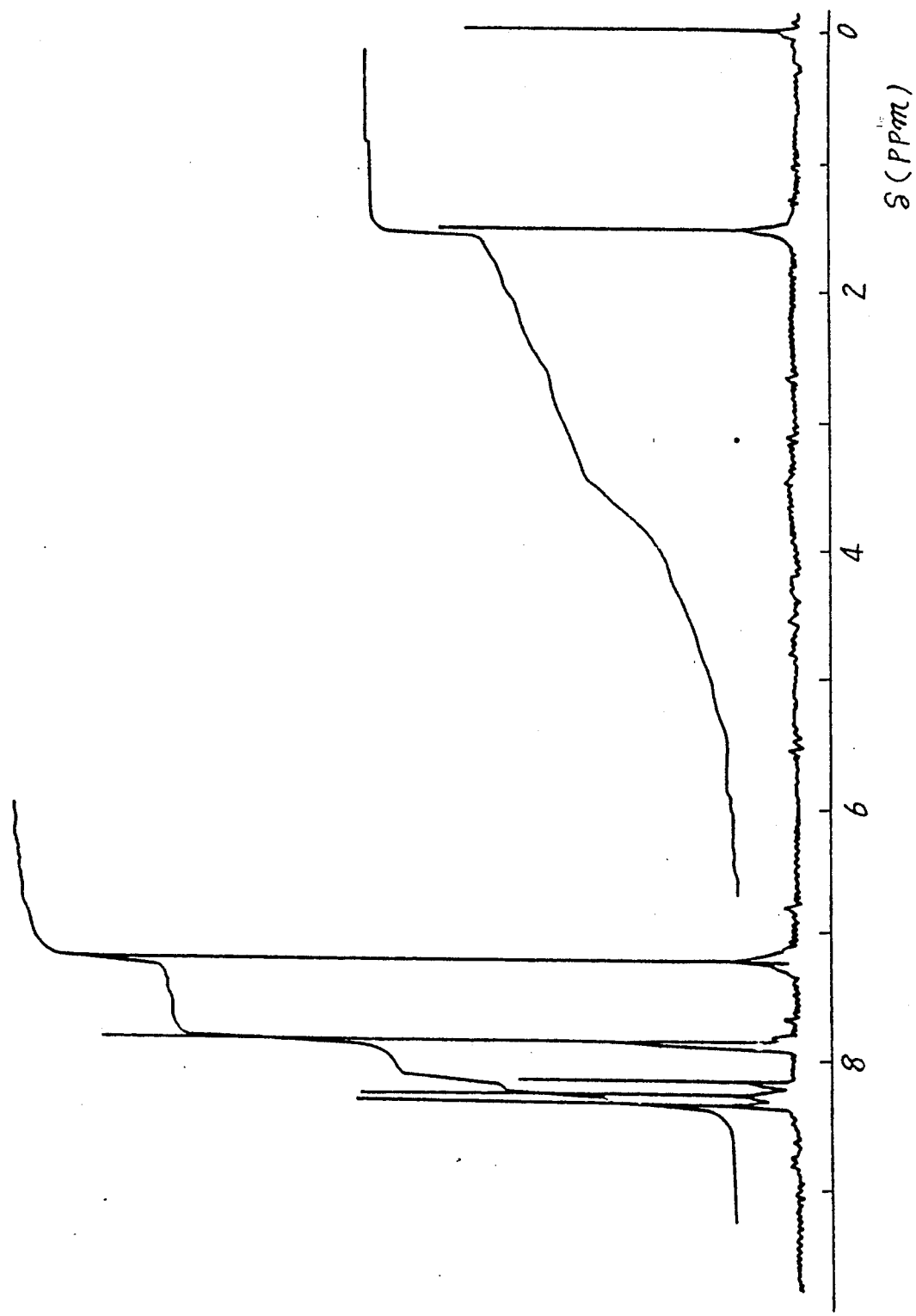
FIG. 2 is NMR spectrum of 6-bromo-2,3-dicyanonaphthalene.

(3) NMR spectrum values: CDCl$_3$ (the NMR spectrum is shown in FIG. 2).

δ values 8.34 (1H, s)
8.27 (1H, s)
8.17 (1H, br-s)
7.88 (2H, m)

Figure 3:
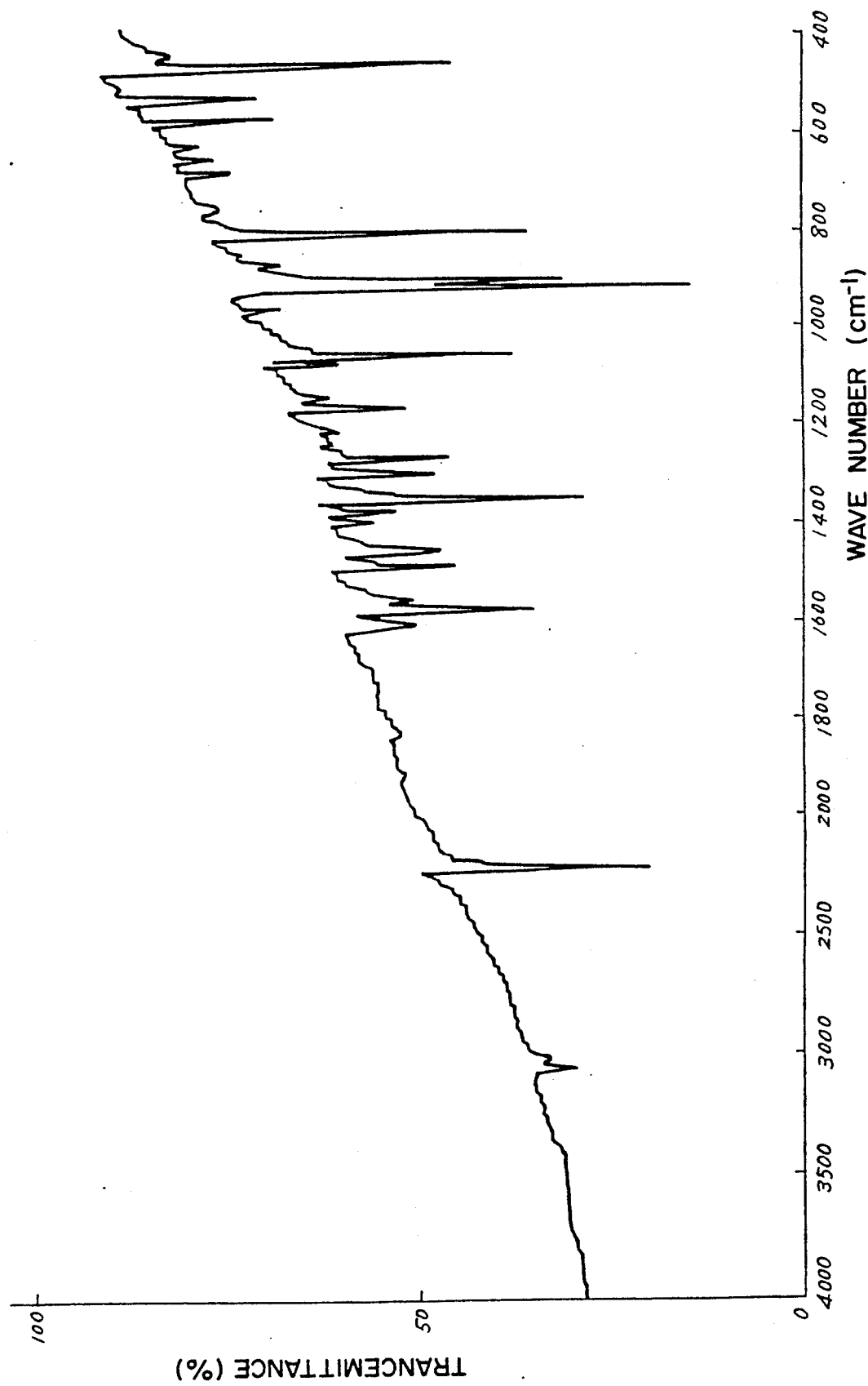
FIG. 3 is IR spectrum of 6-bromo-2,3-dicyanonaphthalene.

(4) IR spectrum (KBr) is shown in FIG. 3.

SYNTHETIC EXAMPLE 3

Synthesis of 6-bromo-1,3-diiminobenz[f]isoindoline

Figure 4:
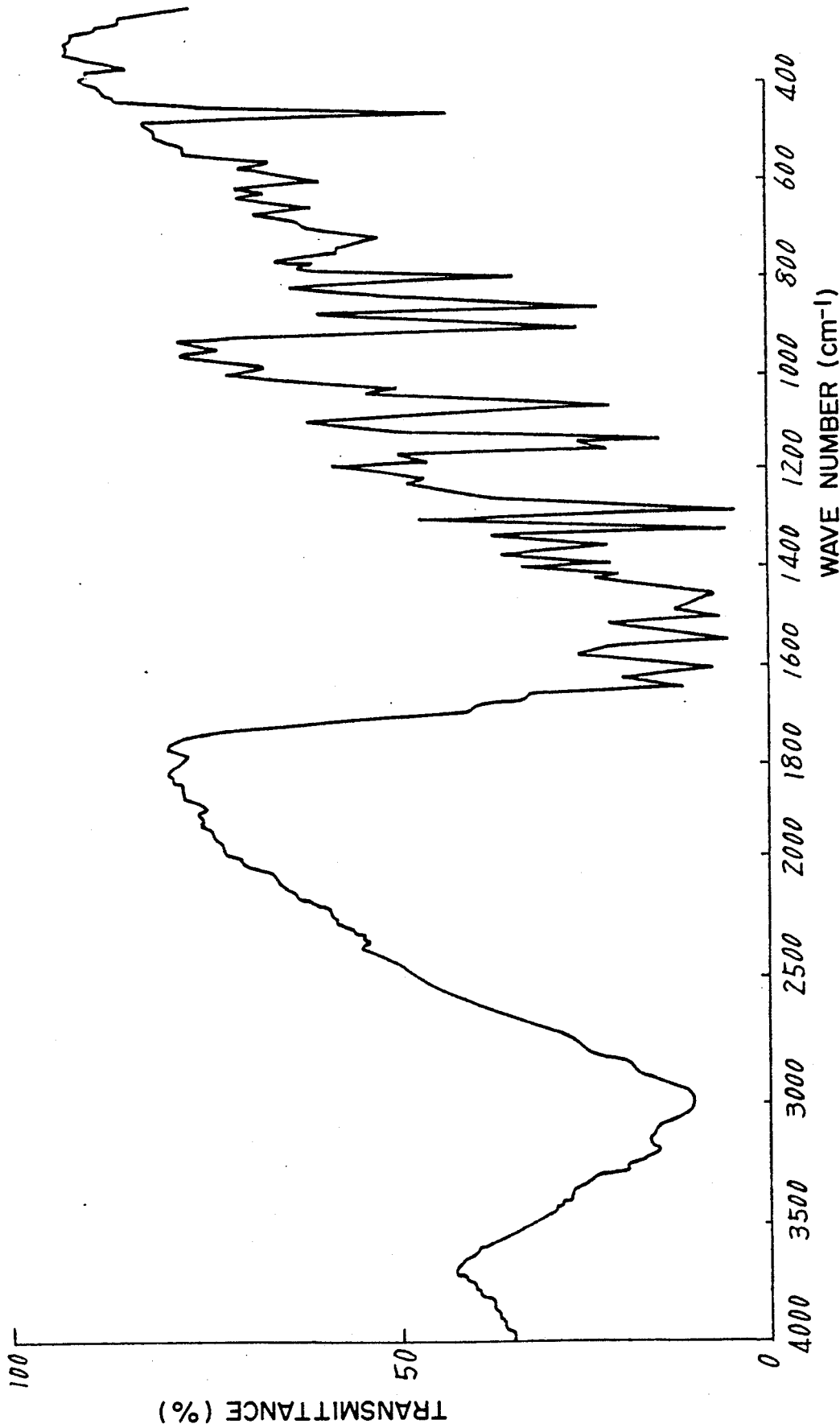
FIG. 4 is IR spectrum of 6-bromo-1,3-diiminobenz(f)isoindoline (KBr method)

Under nitrogen, 44.1 g (0.17 mol) of 6-bromo-2,3-dicyanonaphthalene was added to a solution of sodium methoxide in methanol prepared by adding 1.92 g (84 mmols) of metallic sodium in 5 times to 270 ml of absolute methanol, and anhydrous ammonia gas was slowly bubbled into the resulting mixture with sufficient mixing at room temperature for about 1 hour. The mixture was refluxed for about 3 hours, while bubbling therethrough anhydrous ammonia gas. After cooling, the yellow solid precipitated was collected by filtration, sufficiently washed with methanol and dried under reduced pressure to obtain 45 g of 6-bromo-1,3-diiminobenz[f]isoindoline as a yellow solid. IR spectrum of this 6-bromo-1,3-diiminobenz[f]isoindoline is shown in FIG. 4. The 6-bromo-1,3-diiminobenz[f]isoindoline was used in the subsequent reaction without further purification.

SYNTHETIC EXAMPLE 4

Synthesis of dichlorosilicon-tetrabromonaphthalocyanine (the formula (XXI): M is Si; X is a chlorine atom; and k, l, m and n are 1, respectively)

Figure 5:
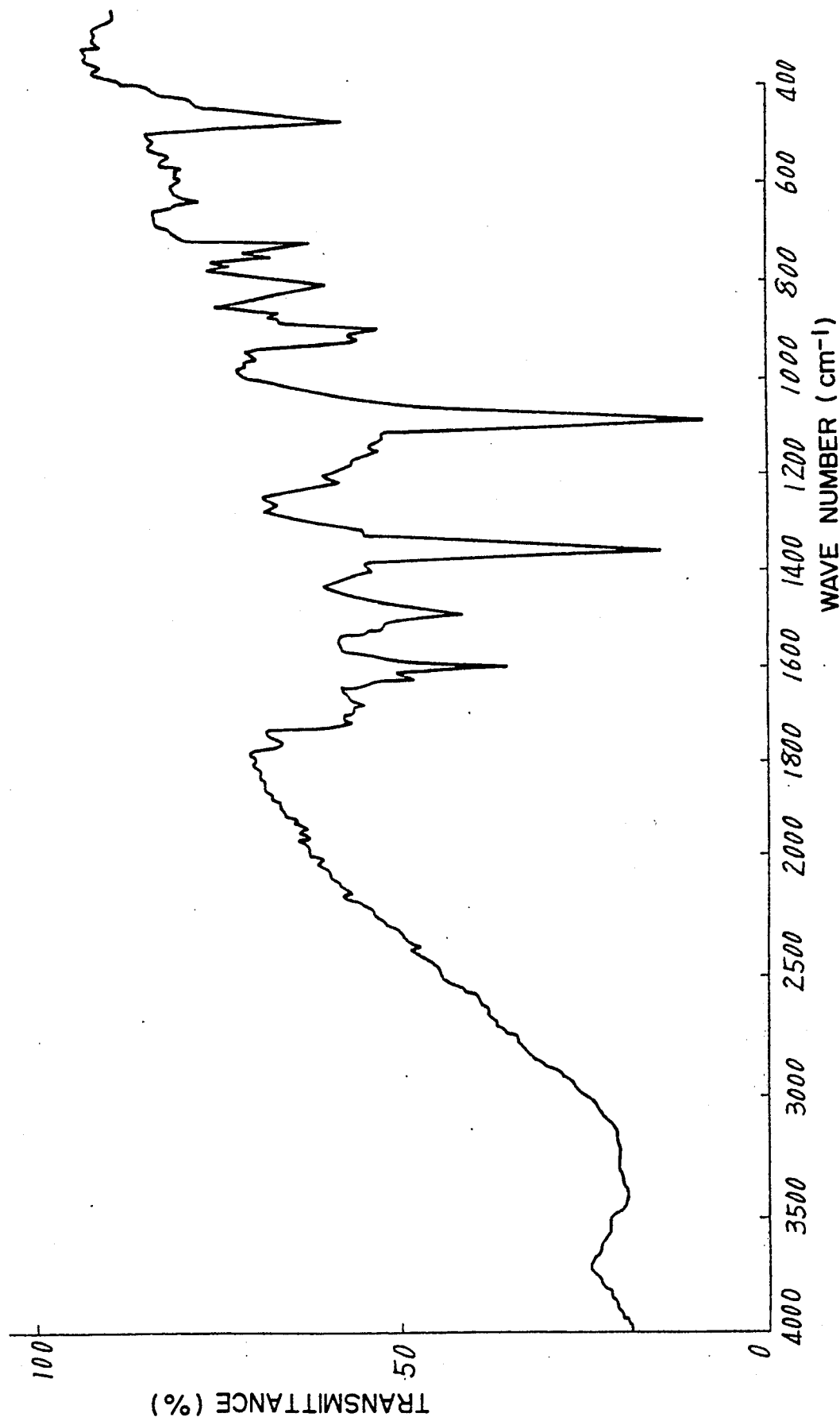
FIG. 5 is IR spectrum of dichlorosilicontetrabromonaphthalocyanine (KBr method)
Figure 6:
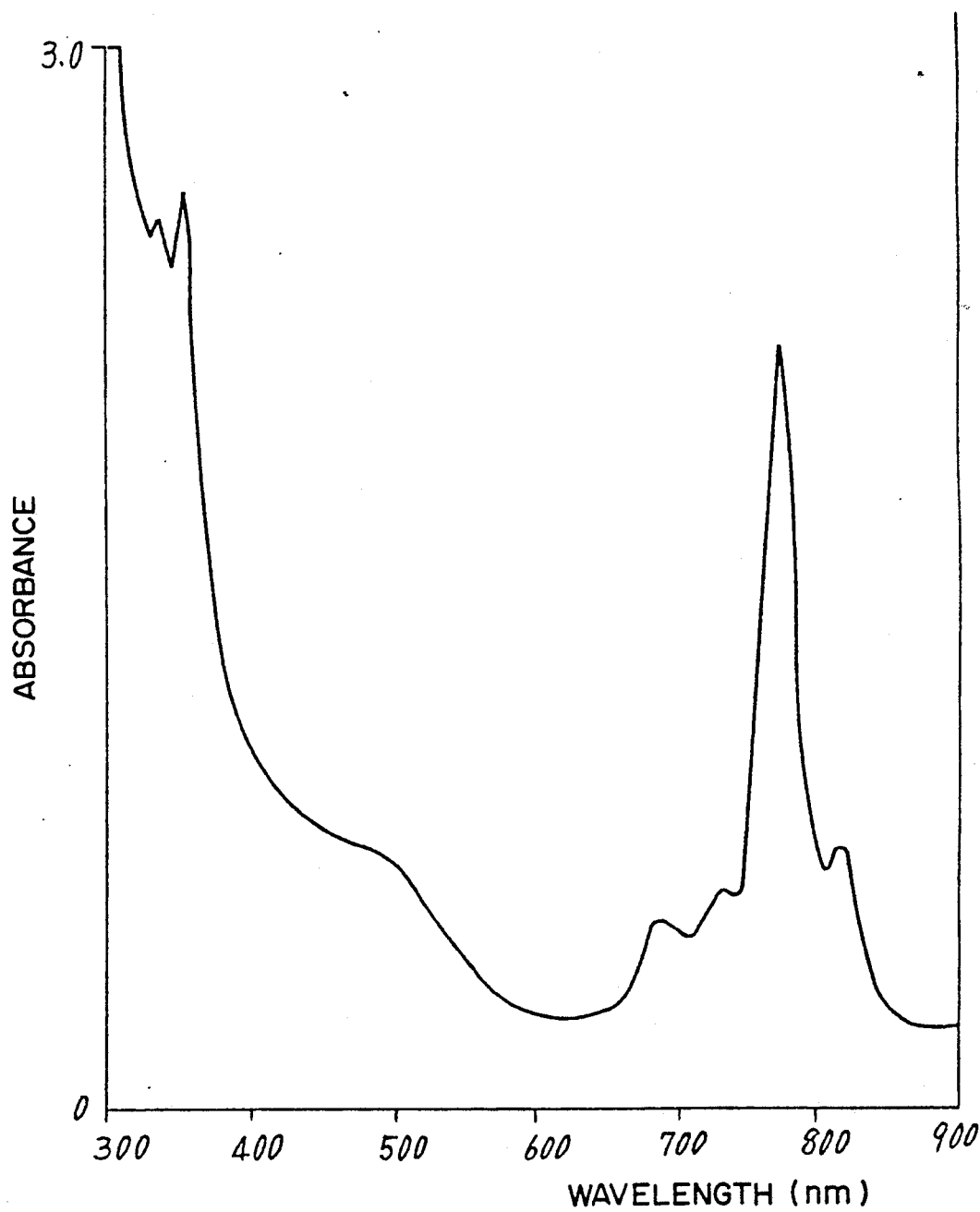
FIG. 6 is electronic spectrum of dichlorosilicon-tetrabromonaphthalocyanine (tetrahydrofuran solution)

Under nitrogen, 54 ml of anhydrous tri-n-butylamine was added to a suspension of 22.5 g (81.8 mmols) of 6-bromo-1,3-diiminobenz[f]isoindoline in 110 ml of anhydrous tetralin, after which 14.4 ml (0.126 mol) of silicon tetrachloride was added, and the resulting mixture was refluxed for about 3 hours. After cooling, 700 ml of methanol was added and the resulting mixture was allowed to stand overnight. The reddish-brown reaction mixture was filtered, and the residue was sufficiently washed with methanol and then dried under reduced pressure to obtain about 20 g of dichlorosilicon-tetrabromonaphthalocyanine (the formula (XXI): M is Si; X is a chlorine atom; and k, l, m, and n are 1, respectively) as a dark-green solid. This dichlorosilicon-tetrabromonaphthalocyanine was used in the subsequent reaction without further purification. IR spectrum of dichlorosilicon-tetrabromonaphthalocyanine is shown in FIG. 5. Its electronic spectrum is shown in FIG. 6.

SYNTHETIC EXAMPLE 5

Synthesis of dihydroxysilicon-tetrabromonaphthalocyanine (the formula (XX): M is Si; and k, l, m and n are 1)

Figure 7:
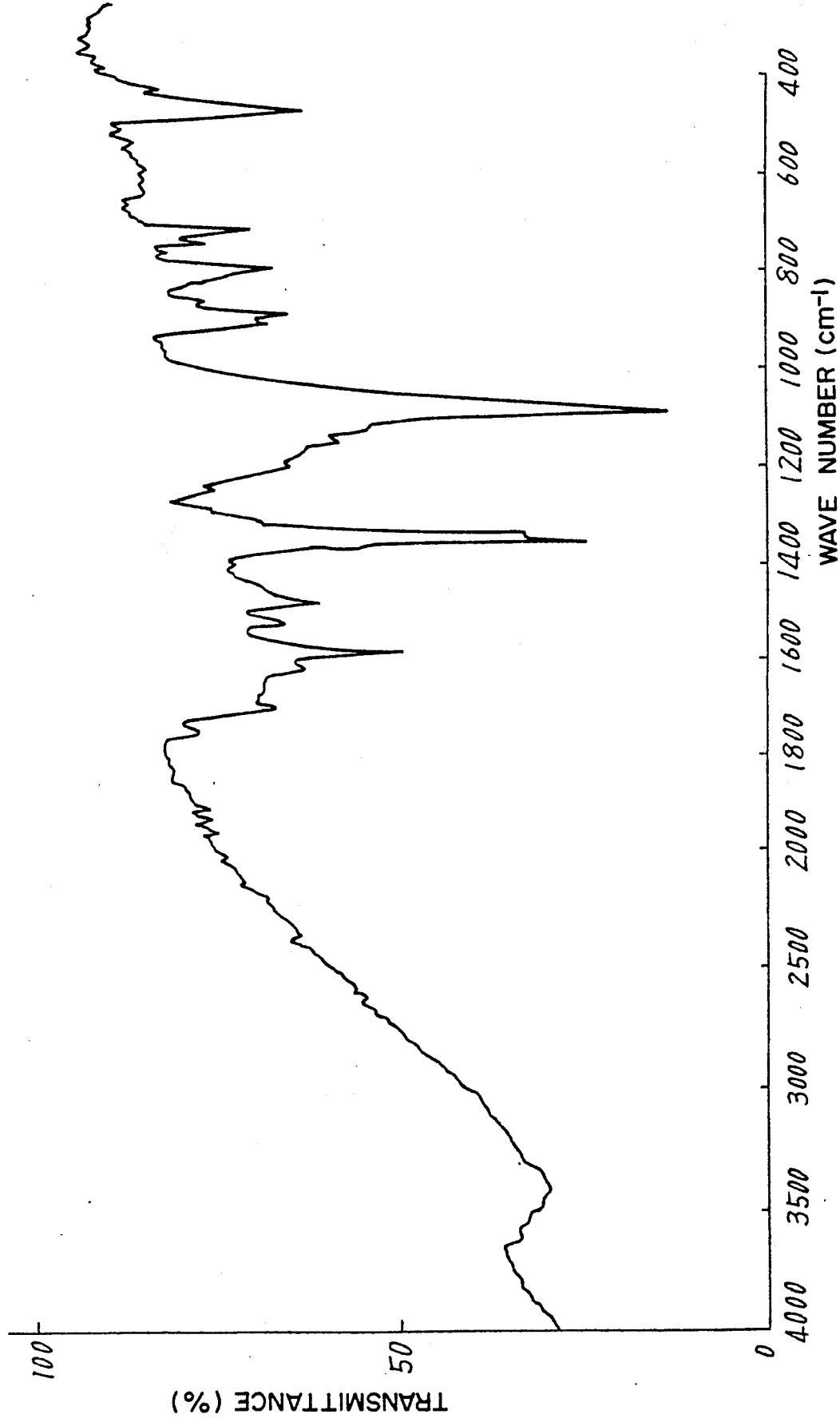
FIG. 7 is IR spectrum of dihydroxysilicon-tetrabromonaphthalocyanine (KBr method)
Figure 8:
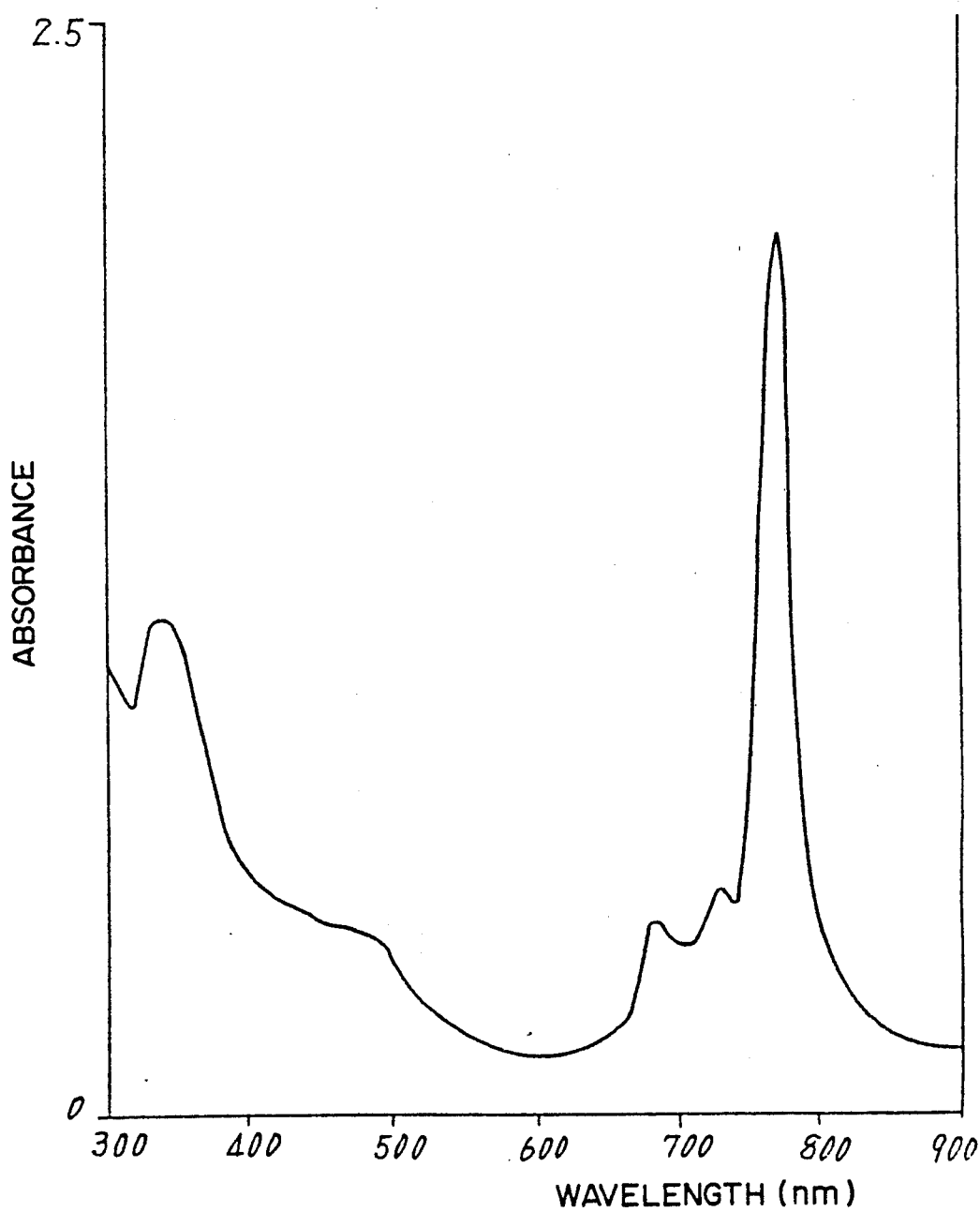
FIG. 8 is electronic spectrum of dihydroxysilicontetrabromonaphthalocyanine (tetrahydrofuran solution)

To 250 ml of concentrated sulfuric acid was added 9.7 g (8.6 mmols) of dichlorosilicon-tetrabromonaphthalocyanine, and the mixture was stirred for about 2 hours. The reaction mixture was poured onto about 800 g of ice and the resulting mixture was allowed to stand overnight. The precipitate formed was filtered, and after sufficient washing with water and then methanol, the precipitate was refluxed in 180 ml of concentrated aqueous ammonia for about 1 hour. After cooling followed by suction filtration, the residue was sufficiently washed successively with water, methanol and acetone, and dried under reduced pressure to obtain 8.7 g of dihydroxysilicon-tetrabromonaphthalocyanine (the formula (XX): M is Si and k, l, m, and n are 1, respectively) as a dark-green solid. This dihydroxysilicon-tetrabromonaphthalocyanine was used in the subsequent reaction without further purification. IR spectrum of dihydroxysilicon-tetrabromonaphthalocyanine is shown in FIG. 7. Its electronic spectrum is shown in FIG. 8.

SYNTHETIC EXAMPLE 6

Synthesis of bis(tri-n-propylsiloxy)silicon-tetrabromonaphthalocyanine (the formula (VII): M is Si; k, l, m, and n are 1; and each Y is a tri-n-propylsiloxyl group)

Under nitrogen, 8 ml (33.6 mmols) of anhydrous tri-n-butylamine was added to a suspension of 2.82 g (2.6 mmols) of dihydroxysilicon-tetrabromonaphthalocyanine in 280 ml of anhydrous β-picoline, followed by adding thereto 7.2 ml (32.8 mmols) of tri-n-propylchlorosilane, and the resulting mixture was refluxed for about 2 hours. After cooling, the mixture was poured into 600 ml of ethanol/water (1/1) and sufficiently stirred, and the resulting mixture was allowed to stand overnight. The precipitate formed was filtered and washed with water. With hot chloroform, only a soluble material in the precipitate was extracted, and the chloroform solution was dried over anhydrous sodium sulfate, purified by a silica gel column chromatography, and then recrystallized from chloroform to obtain 0.82 g of dark-green crystals. The dark-green crystals were confirmed to be bis(tri-n-propylsiloxy)silicon-tetrabromonaphthalocyanine (the formula (VII): M is Si; k, l, m and n are1, respectively; and each Y is a tri-n-propylsiloxyl group) from the following analysis results:

(1) Melting point: above 300° C.

(2) Elementary analysis values:

|  | C | H | N | Br |
| --- | --- | --- | --- | --- |
| Calculated (%) | 56.50 | 4.45 | 7.99 | 22.78 |
| Found (%) | 56.28 | 4.39 | 8.04 | 22.45 |

Figure 9:
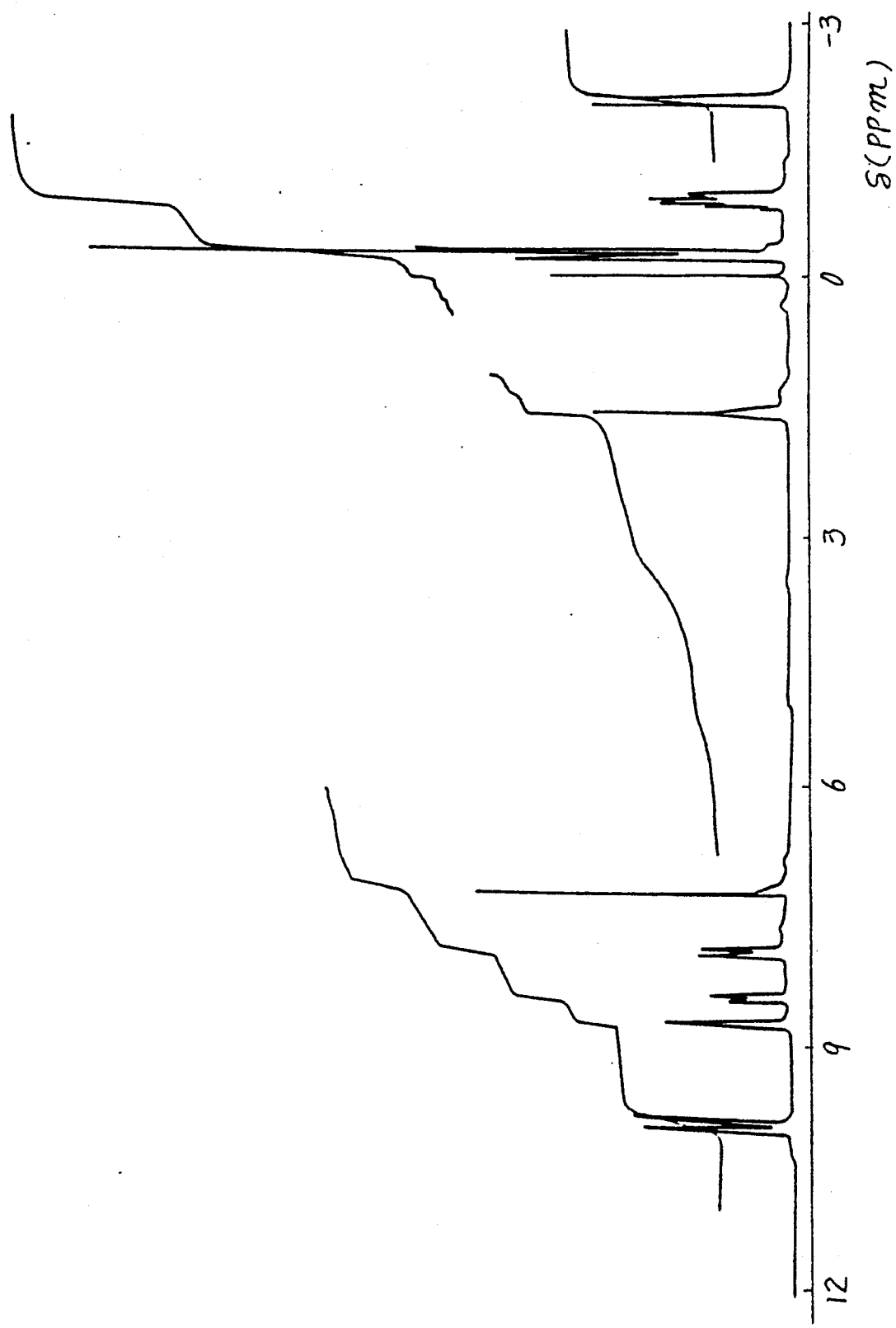
FIG. 9 is NMR spectrum of bis(tri-n-propylsiloxy)-silicon-tetrabromonaphthalocyanine.

(3) NMR spectrum values (the NMR spectrum is shown in FIG. 9): CDCl$_3$

δ values 10.08 (4H, br-s)
10.01 (4H, br-s)
8.82 (4H, br-s)
8.54 (4H, dd, J=8.85, 3.05 Hz)
8.00 (4H, d, J=8.85 Hz)
−0.29 (18H, t, J=7.17 Hz)
−0.90 (12H, sextet-like m)
−2.08 (12H, t-like m)

Figure 10:
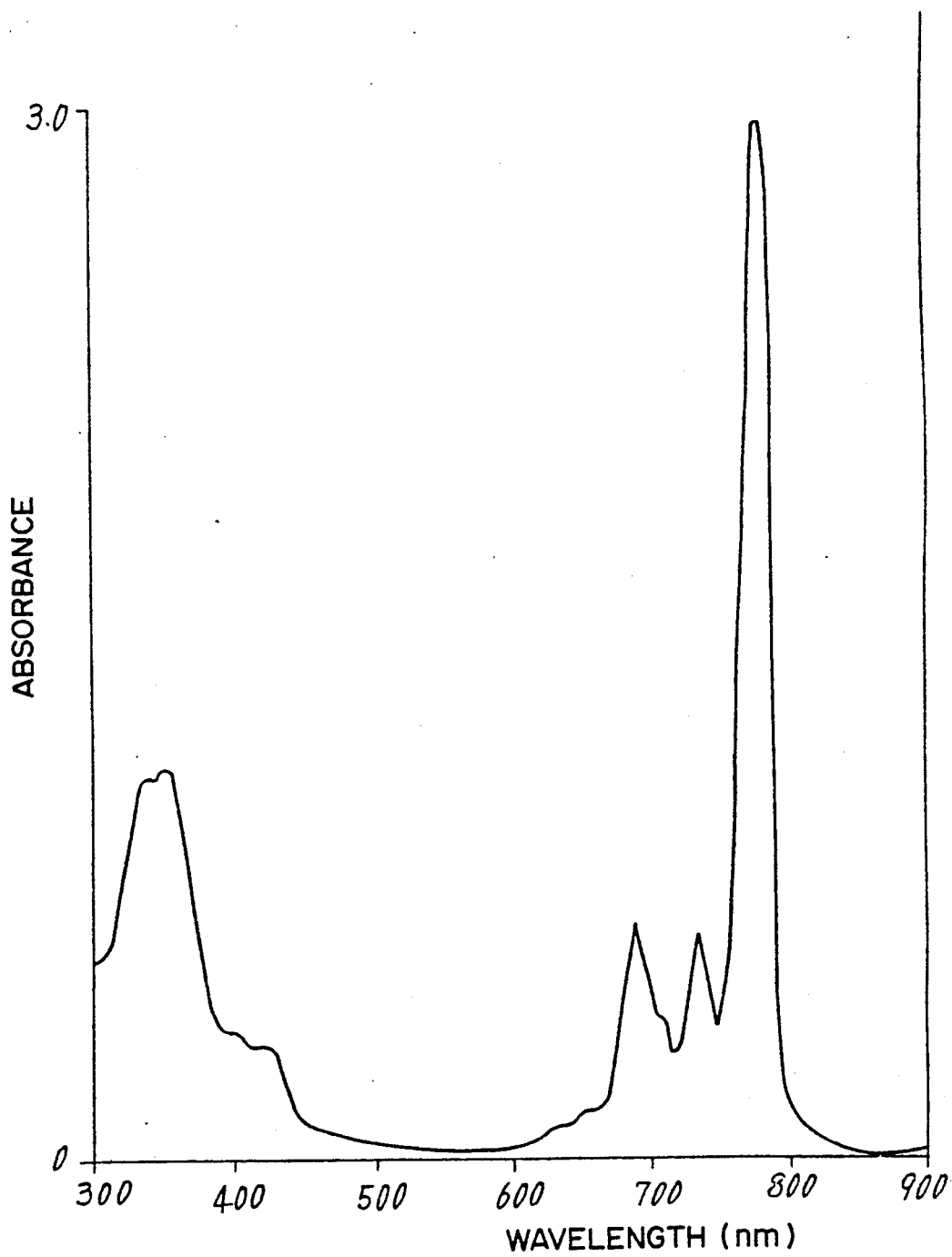
FIG. 10 is electronic spectrum of bis(tri-n-propylsiloxy)silicon-tetrabromonaphthalocyanine.

(4) Electronic spectrum (CHCl$_3$ solution) is shown in FIG. 10.

Figure 11:
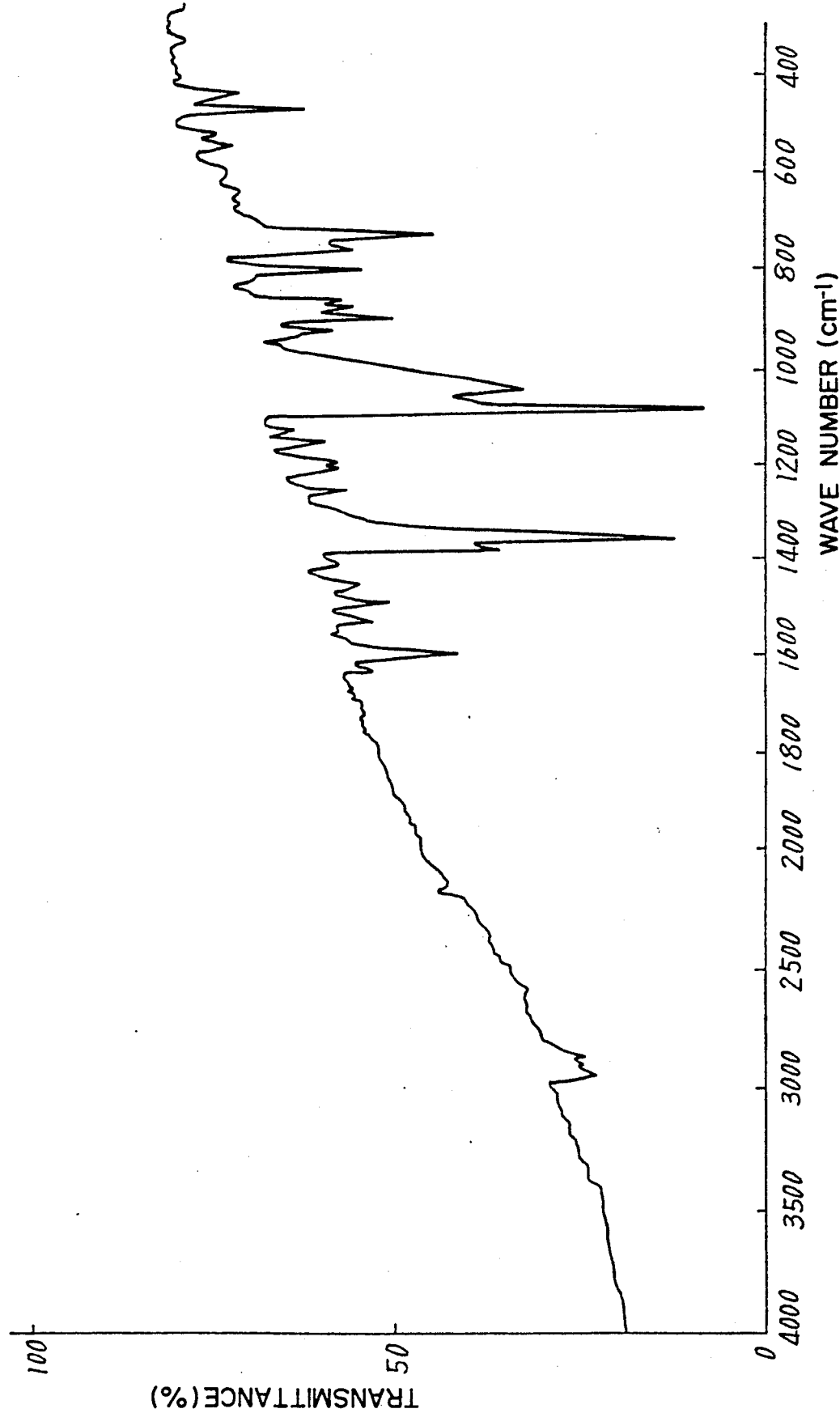
FIG. 11 is IR spectrum of bis(tri-n-propylsiloxy)silicon-tetrabromonaphthalocyanine.

(5) IR spectrum (KBr) is shown in FIG. 11.

SYNTHETIC EXAMPLE 7

Synthesis of bis(tri-n-butylsiloxy)silicon-tetrabromonaphthalocyanine (the formula (VII)): M is Si; k, l, m and n are 1; and each Y is a tri-n-butylsiloxyl group)

To a suspension of 2.82 g (2.6 mmols) of dihydroxysilicon-tetrabromonaphthalocyanine in 280 ml of anhydrous β-picoline were added 8 ml (33.6 mmols) of anhydrous tri-n-butylamine and then 8.8 ml (32.8 mmols) of tri-n-butylchlorosilane, and the resulting mixture was refluxed for about 2 hours. After cooling, the reaction mixture was treated in the same manner as in Synthetic Example 6, and recrystallization from chloroform gage 0.75 g of dark-green crystals. The dark-green crystals were confirmed to be bis(tri-n-butylsiloxy)silicon-tetrabromonaphthalocyanine (the formula (VII): M is Si; k, l, m and n are 1, respectively; and each Y is a tri-n-butylsiloxyl group) from the following analysis results:

(1) Melting point: above 300° C.
(2) Elementary analysis values:

|  | C | H | N | Br |
| --- | --- | --- | --- | --- |
| Calculated (%) | 58.14 | 5.02 | 7.53 | 21.49 |
| Found (%) | 58.36 | 5.11 | 7.51 | 21.03 |

Figure 12:
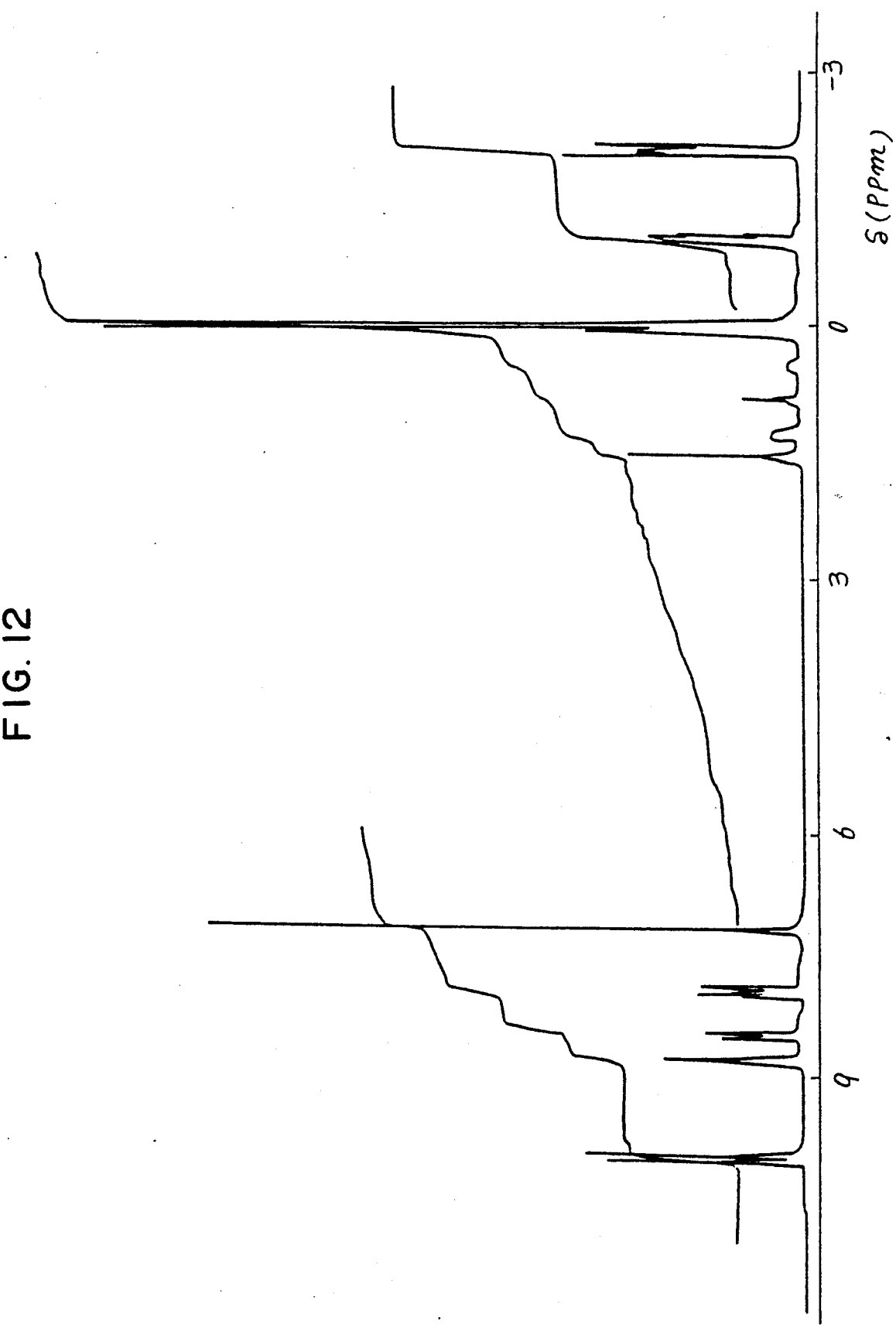
FIG. 12 is NMR spectrum of bis(tri-n-propylsiloxy)-silicon-tetrabromonaphthalocyanine.

(3) NMR spectrum values (the NMR spectrum is shown in FIG. 12): $CDCl_3$
δ values 10.09 (4H, br-s)
10.02 (4H, br-s)
8.85 (4H, br-s)
8.55 (4H, dd, J=8.85, 3.05 Hz)
8.01 (4H, d, J=8.85 Hz)
0.02 (30 H, m)
−0.99 (12H, sextet-like m)
−2.07 (12H, t-like m)

Figure 13:
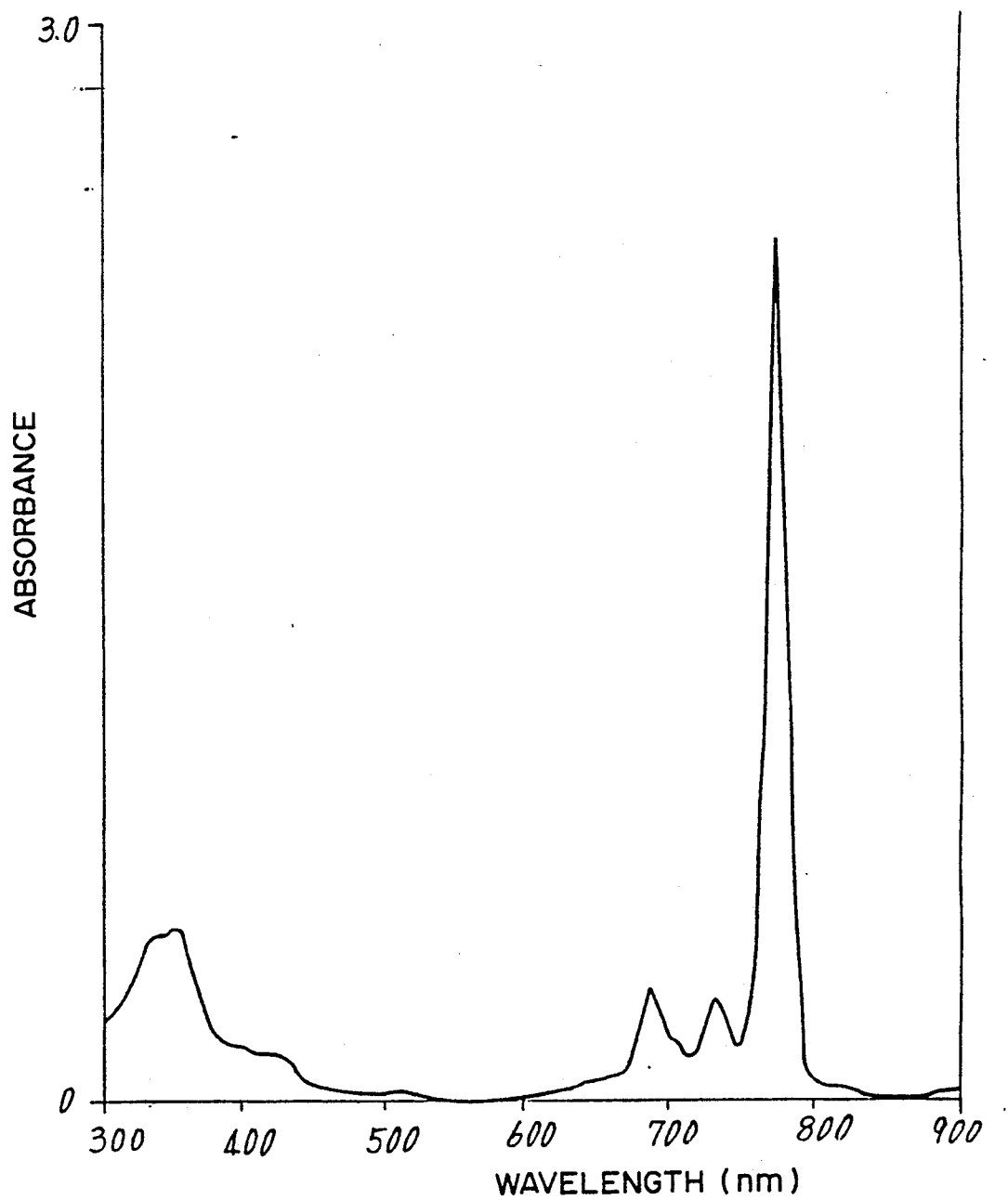
FIG. 13 is electronic spectrum of bis(tri-n-propylsiloxy)silicon-tetrabromonaphthalocyanine.
Figure 14:
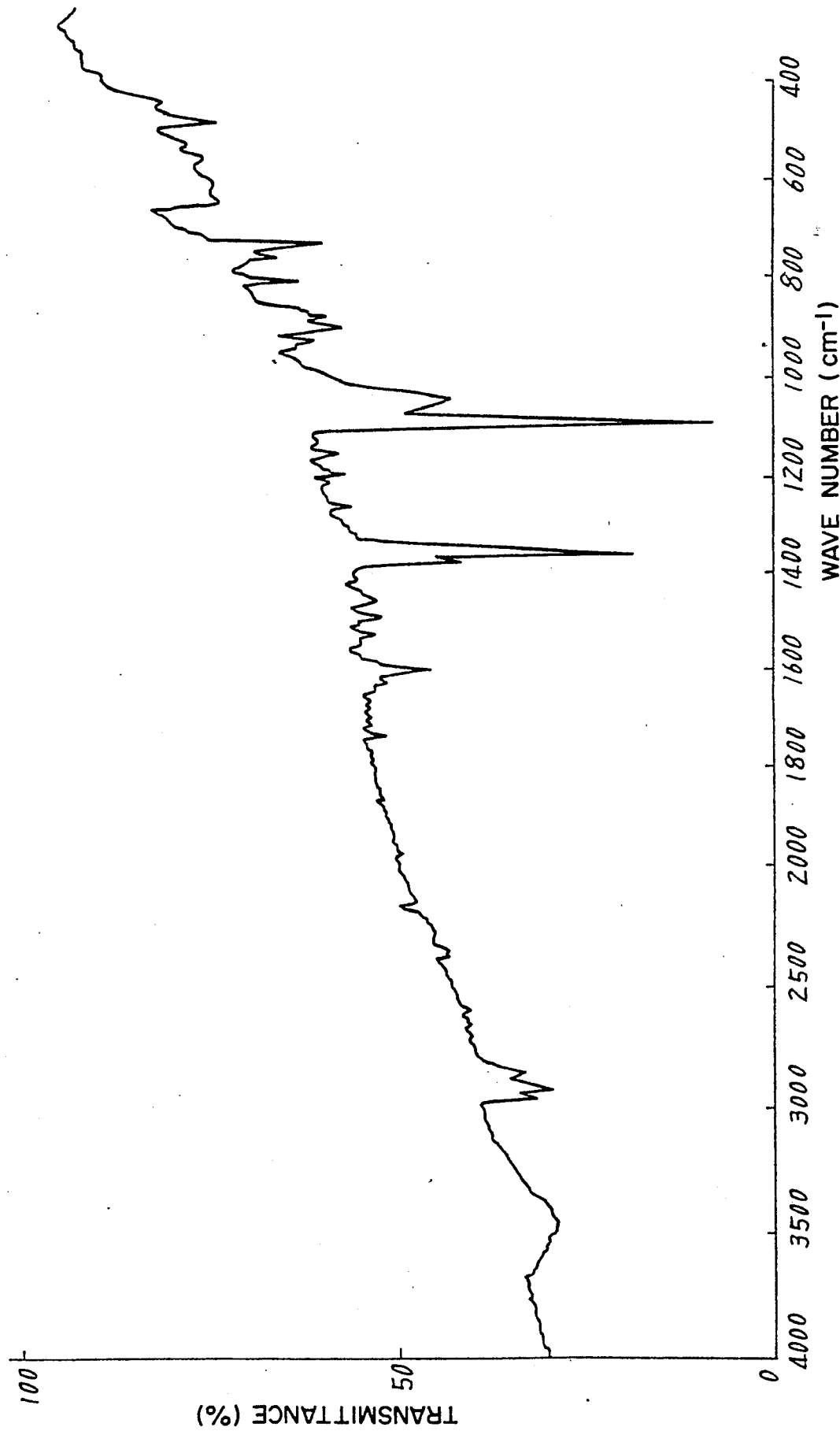
FIG. 14 is IR spectrum of bis(tri-n-butylsiloxy)-silicon-tetrabromonaphthalocyanine.

(4) Electronic spectrum ($CHCl_3$ solution) is shown in FIG. 13.
IR spectrum (KBr) is shown in FIG. 14.

SYNTHETIC EXAMPLE 8

Synthesis of bis(tri-n-hexylsiloxy)silicon-tetrabromonaphthalocyanine (the formula (VII): M is Si; k, l, m and n are 1; and each Y is a tri-n-hexylsiloxyl group)

To a suspension of 2.82 g (2.6 mmols) of dihydroxysilicon-tetrabromonaphthalocyanine in 280 ml of anhydrous β-picoline were added 8 ml (33.6 mmols) of anhydrous tri-n-butylamine and then 12 ml (32.8 mmols) of tri-n-hexylchlorosilane, and the resulting mixture was refluxed for about 2 hours. After cooling, the reaction mixture was treated in the same manner as in Synthetic Example 6, and recrystallization from hexane/chloroform gave 0.78 g of dark-green crystals. The dark-green crystals were confirmed to be bis(tri-n-hexylsiloxy)silicon-tetrabromonaphthalocyanine (the formula (VII): M is Si; k, l, m, and n are 1, respectively; and each Y is a tri-n-hexylsiloxyl group) from the following analysis results:

(1) Melting point: 298°–300° C.
(2) Elementary analysis values:

|  | C | H | N | Br |
| --- | --- | --- | --- | --- |
| Calculated (%) | 60.94 | 5.97 | 6.77 | 19.30 |
| Found (%) | 60.77 | 5.71 | 6.65 | 19.02 |

Figure 15:
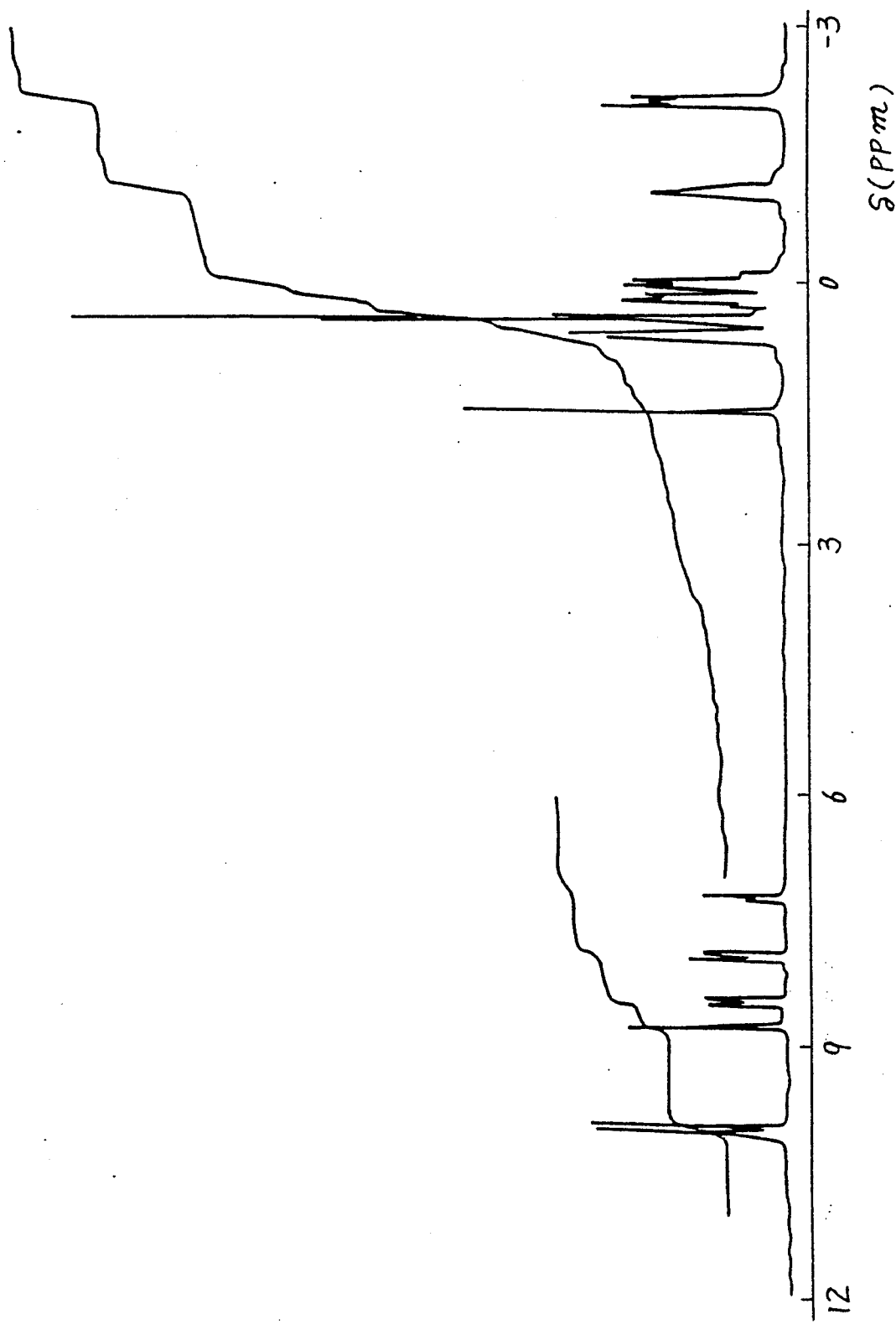
FIG. 15 is NMR spectrum of bis(tri-n-hexylsiloxy)-silicon-tetrabromonaphthalocyanine.

(3) NMR spectrum values (the NMR spectrum is shown in FIG. 15): $CDCl_3$
δ values 10.06 (4H, br-s)
10.00 (4H, br-s)
8.83 (4H, br-s)
8.53 (4H, dd, J=9.85, 2.44 Hz)
7.99 (4H, dd, J=8.85 Hz)
0.63 (12H, sextet, J=7.32 Hz)
0.45 (18H, t, J=7.32 Hz)
0.22 12H, quintet, J=7.32 Hz)
0.05 (12H, quintet, J=7.32 Hz)
−1.02 (12H, quintet-like m)
−2.10 (12H, t-like m)

Figure 16:
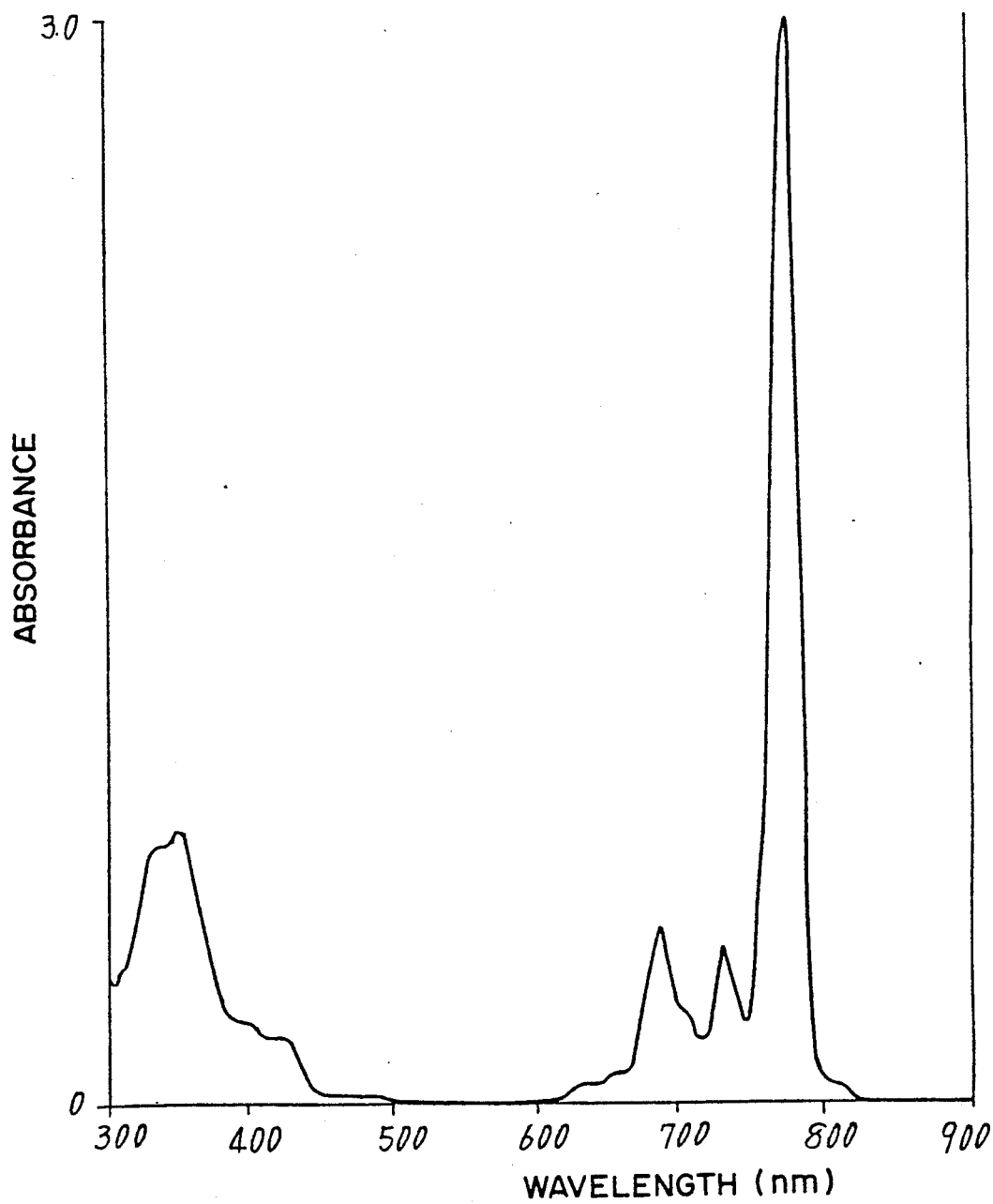
FIG. 16 is electronic spectrum of bis(tri-n-hexylsiloxy)silicon-tetrabromonaphthalocyanine.
Figure 17:
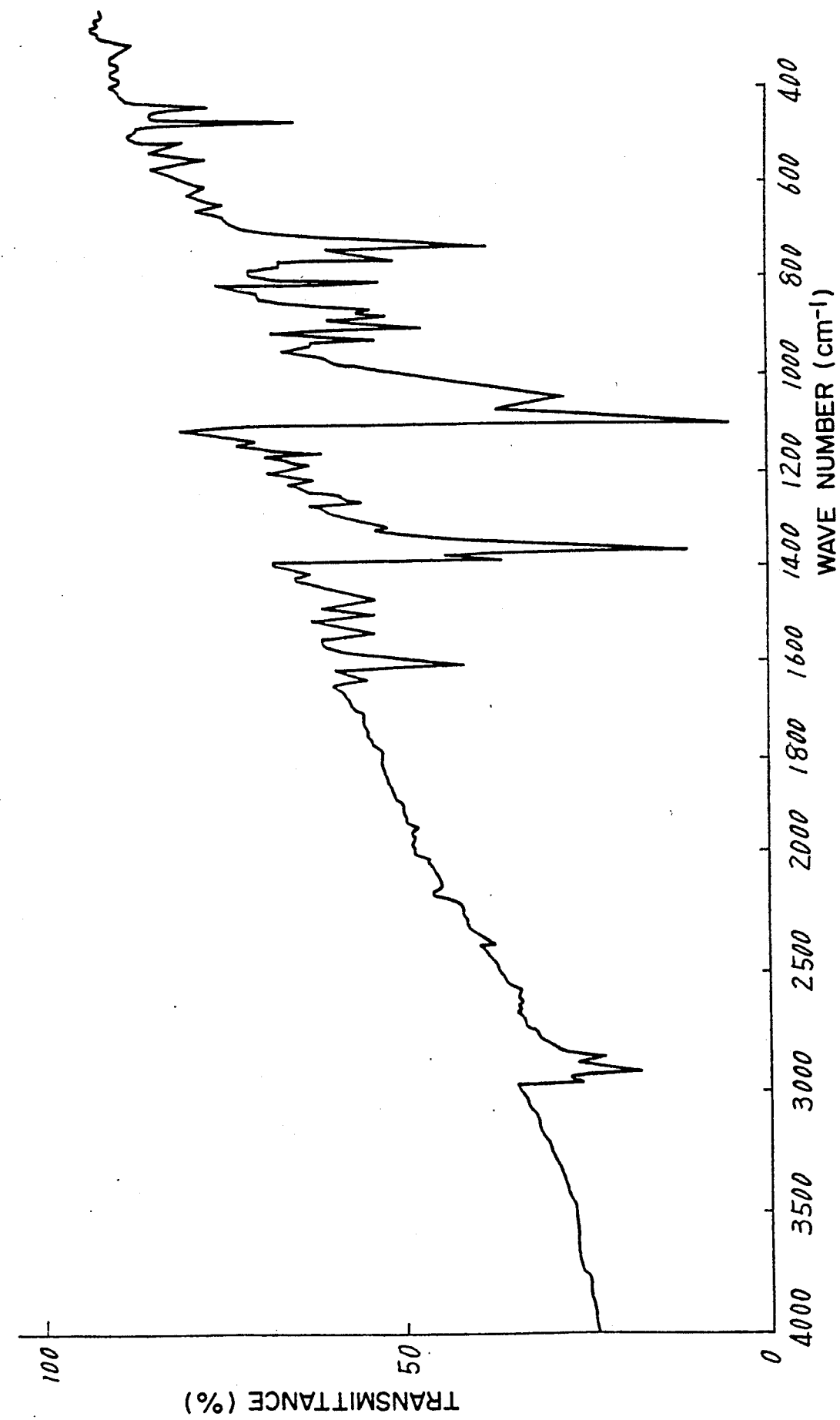
FIG. 17 is IR spectrum of bis(tri-n-hexylsiloxy)-silicon-tetrabromonaphthalocyanine.

(4) Electronic spectrum ($CHCl_3$ solution) is shown in FIG. 16.
(5) IR spectrum (KBr) is shown in FIG. 17.

SYNTHETIC EXAMPLE 9

Synthesis of bis(triethylsiloxy)silicon-tetrabromonaphthalocyanine (the formula (VII): M is Si; k, l, m, and n are 1; and each Y is a triethylsiloxyl group)

To a suspension of 2.82 g (2.6 mmols) of dihydroxysilicon-tetrabromonaphthalocyanine in 100 ml of quinoline was added 10 ml (65 mmols) of triethylsilanol, and the resulting mixture was refluxed for about 3 hours. After cooling, the reaction mixture was poured into 500 ml of ethanol/water (1/1) and sufficiently stirred, and the resulting mixture was allowed to stand overnight. The precipitate formed was filtered and sufficiently washed with methanol and then chloroform. The crystals thus obtained were washed with chloroform by the Soxhlet extraction method to obtain 2.1 g of dark-green crystals. The dark-green crystals were confirmed to be bis(triethylsiloxy)-silicon-tetrabromonaphthalocyanine (the formula (VII): M is Si; k, l, m and n are 1, respectively; and each Y is a triethylsiloxyl group) from the following analysis results:

(1) Melting point: above 300° C.
(2) Elementary analysis values:

|  | C | H | N | Br |
| --- | --- | --- | --- | --- |
| Calculated (%) | 54.65 | 3.82 | 8.50 | 24.23 |
| Found (%) | 54.18 | 3.62 | 8.81 | 23.94 |

(3) NMR spectrum values: $CDCl_3$
δ values 10.07 (4H, br-s)
10.00 (4H, br-s)
8.83 (4H, br-s)
8.54 (4H, dd, J=8.85, 3.05 Hz)
8.01 (4H, d, J=8.85 Hz)
−1.04 (18H, t, J=7.32 Hz)
−2.05 (12H, q, J=7.32 Hz)

Figure 18:
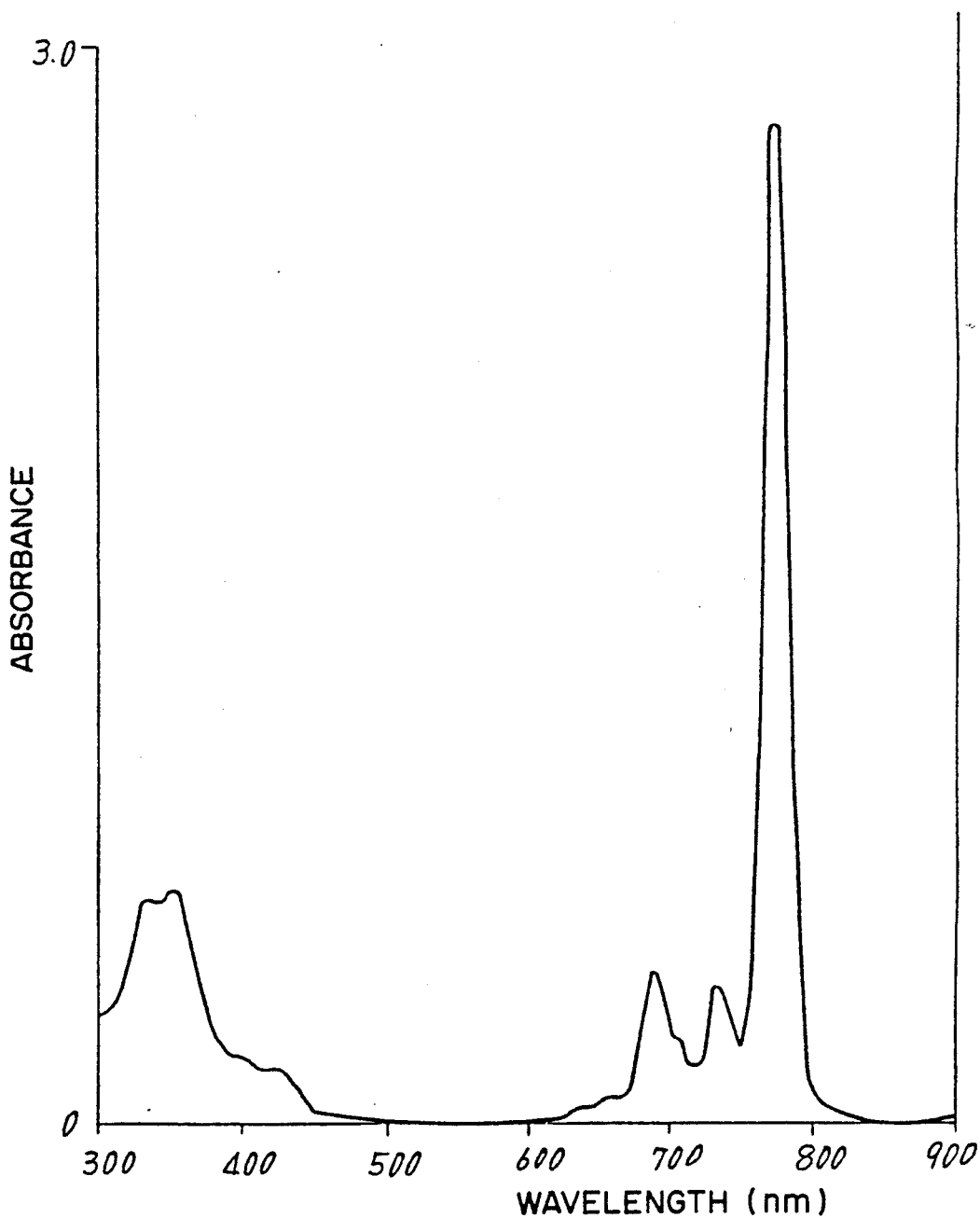
FIG. 18 is electronic spectrum of bis(triethylsiloxy)-silicon-tetrabromonaphthalocyanine.
Figure 19:
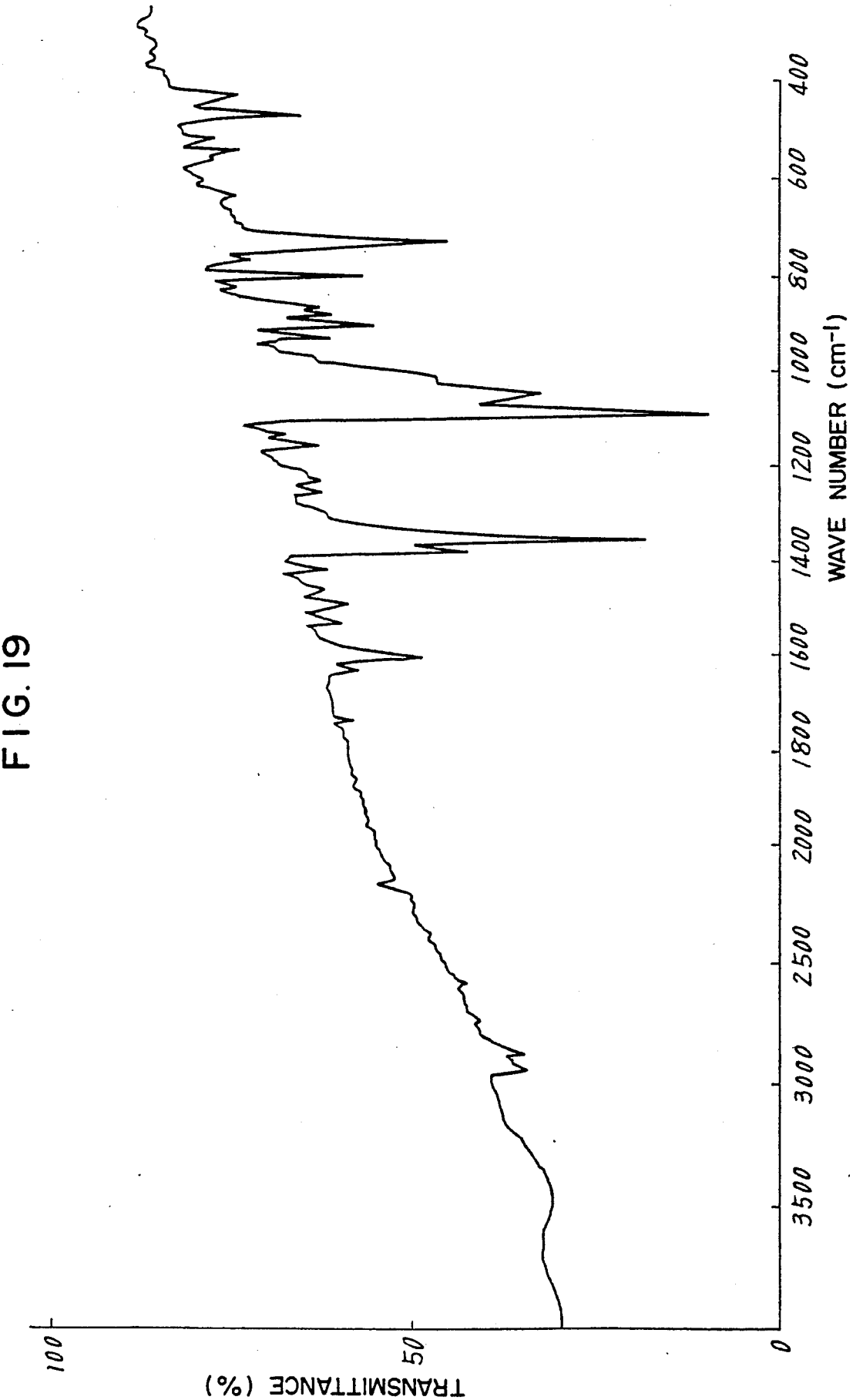
FIG. 19 is IR spectrum of bis(triethylsiloxy)silicon-tetrabromonaphthalocyanine.

(4) Electronic spectrum ($CHCl_3$ solution) is shown in FIG. 18.

SYNTHETIC EXAMPLE 10

Synthesis of 6-trimethylsilylmethylthio-2,3dicyanonaphthalene

To a solution of 10 g (38.9 mmols) of 6-bromo-2,3-dicyanonaphthalene in quinoline (200 ml)/pyridine (55 ml) mixture was added 35.7 g (195 mmols) of copper (I) trimethylsilylmethylthiolate synthesized according to the method mentioned in Organic Syntheses, vol. 42, page 22, and the resulting mixture was heated under reflux at 160–170° C. for 6 hours. After allowing the reaction mixture to cool, it was poured into water-methanol (1/1) mixture, and the deposited crystalline matter was collected by filtration. After separating decomposed products and by-products from the crystalline product thus obtained by a silica gel column chromatography, the main product was recrystallized from toluene/hexane to obtain 6.14 g (53%) of a light yellow crystalline product. It was confirmed to be 6-trimethylsilylmethylthio-2,3-dicyanonaphthalene with reference to the following analytical results.

(1) Elementary analyses:

|  | C | H | N | S |
|---|---|---|---|---|
| Calculated (%) | 64.82 | 5.44 | 9.45 | 10.82 |
| Found (%) | 64.93 | 5.45 | 9.46 | 11.14 |

Figure 20:
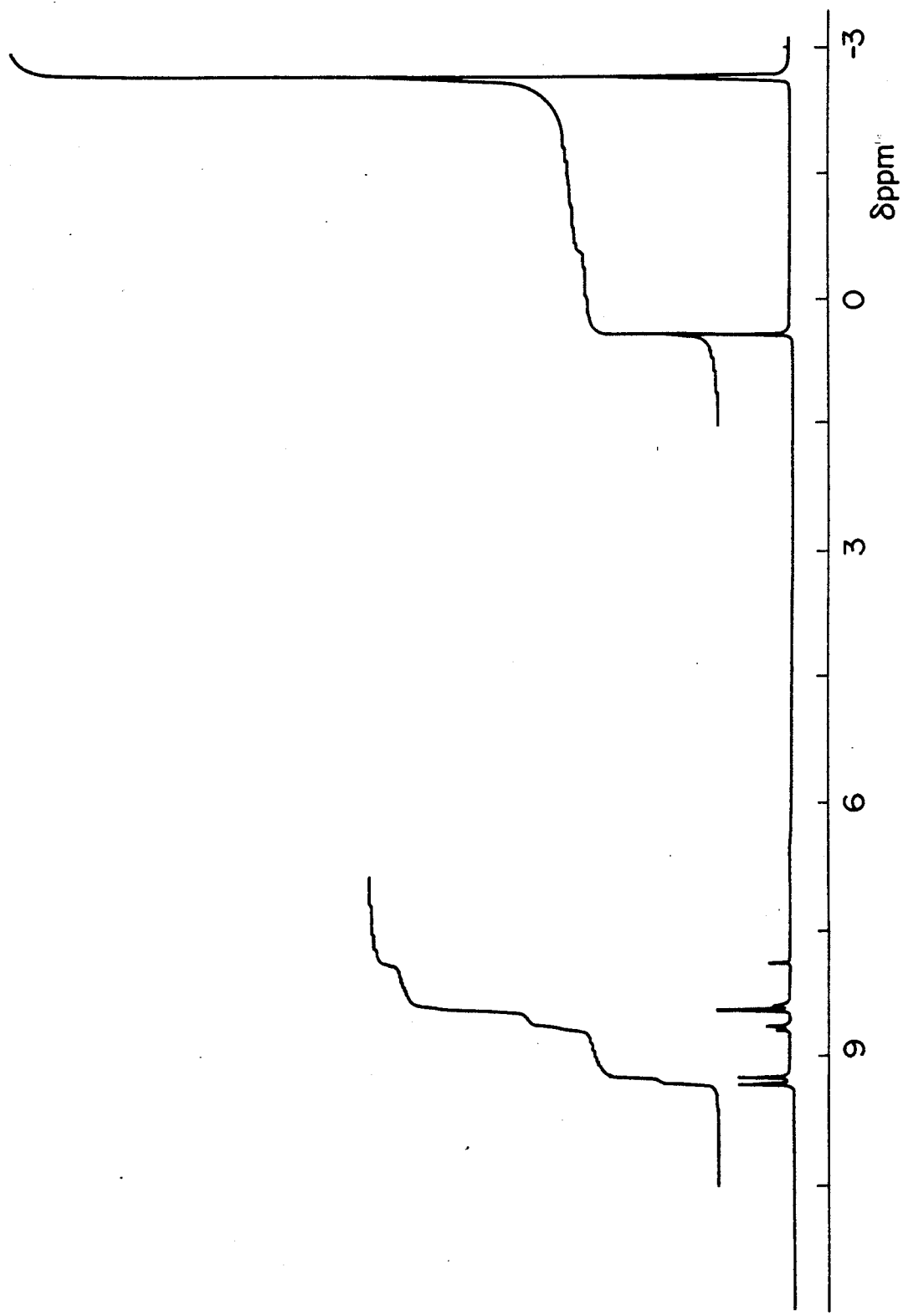
FIG. 20 is NMR spectrum of 6-trimethylsilylmethylthio-2,3-dicyanonaphthalene.

(2) NMR spectrum (FIG. 20): $CDCl_3$
$\delta$ 8.23 (1H, brs)
8.18 (1H, brs)
7.79 (1H, d, J=8.54Hz)
7.65 (1H, brs)
7.63 (1H, d, J=8.54Hz)
2.29 (2H, s)
0.24 (9H, s)

Figure 21:
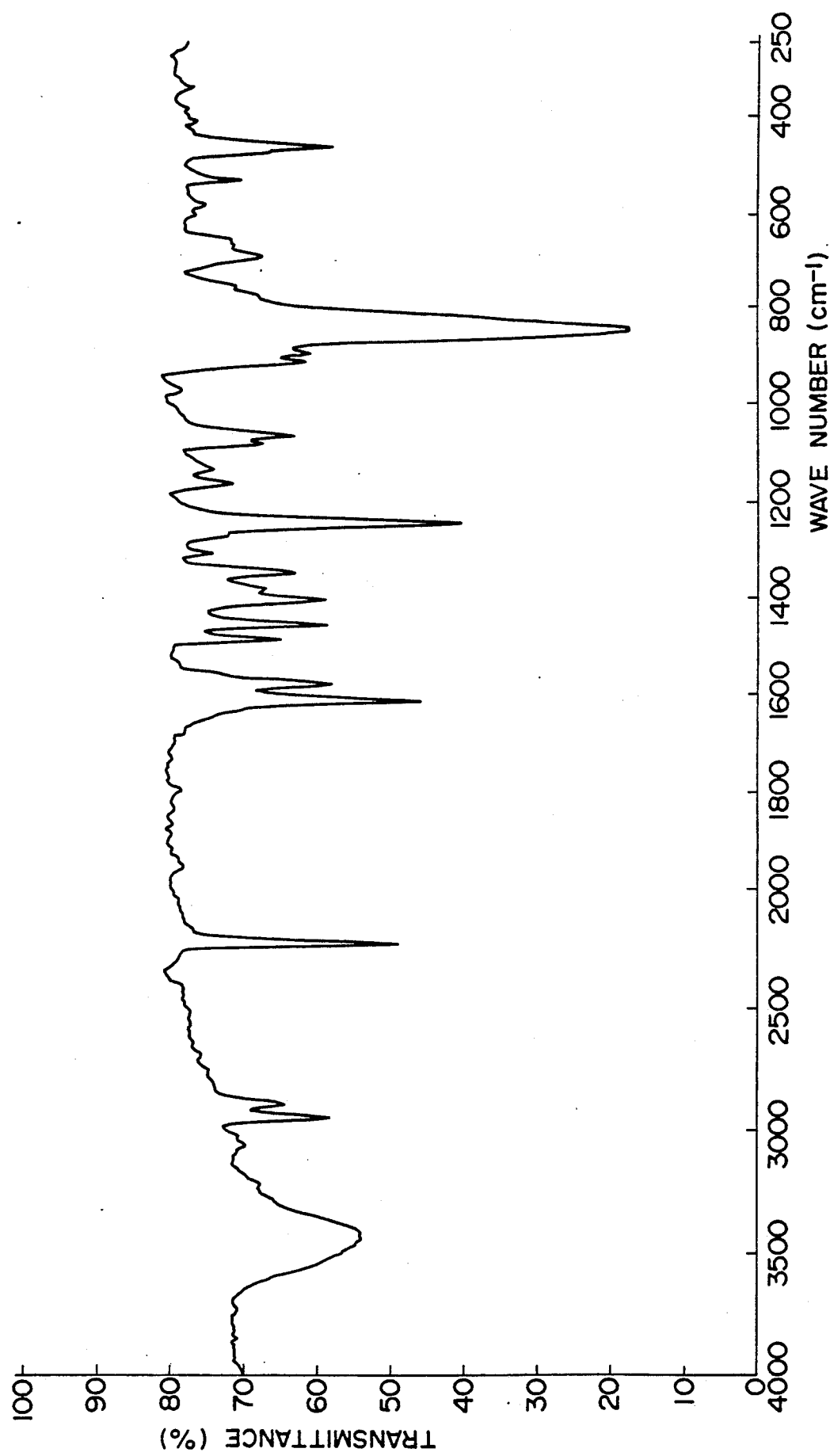
FIG. 21 is IR spectrum of 6-trimethylsilylmethylthio-2,3-dicyanonaphthalene.

(3) IR spectrum (KBr method): FIG. 21

SYNTHETIC EXAMPLE 11

Synthesis of 6-trimethylsilylmethylthio-1,3diiminobenz(f)isoindoline

Figure 22:
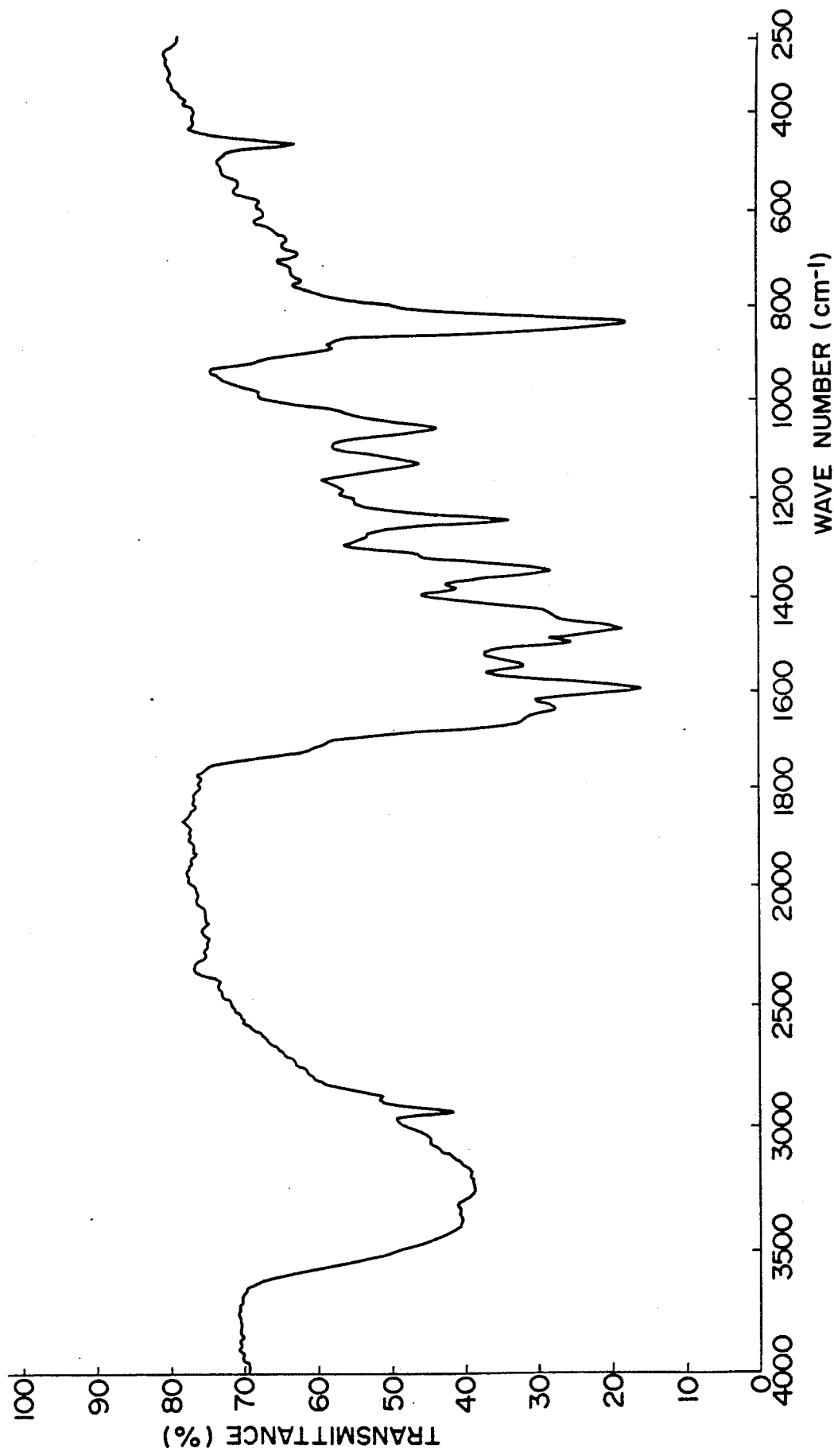
FIG. 22 is IR spectrum of 6-trimethylsilylmethylthio-1,3-diiminobenz(f)isoindoline.

In an atmosphere of nitrogen, 5.0 g (16.9 mmols) of 6-trimethylsilylmethylthio-2,3-dicyanonaphthalene was added to a methanolic solution of sodium methoxide prepared by adding 0.6 g (26.1 mmols) of metallic sodium to anhydrous methanol (60 ml), and the resulting mixture was refluxed for about 2 hours while bubbling anhydrous ammonia gas. After distilling off the methanol from the reaction mixture under reduced pressure, the remaining yellow oily product was cooled and treated with water to crystallize it. The crystalline product thus obtained was collected by filtration, washed with water and cold methanol and then dried under reduced pressure to obtain 5.4 g of 6-trimethylsilylmethylthio-1,3-diiminobenz(f)isoindoline as a yellow crystal. Its IR spectrum is shown in FIG. 22. This compound was used in the subsequent experiment without further purification.

SYNTHETIC EXAMPLE 12

Synthesis of dihydroxysilicon-tetra(trimethylsilylmethylthio)naphthalocyanine (formula (II) wherein M is Si, $R^1$ is $CH_2Si(CH_3)_3$ and k, l, m and n are 1)

Figure 23:
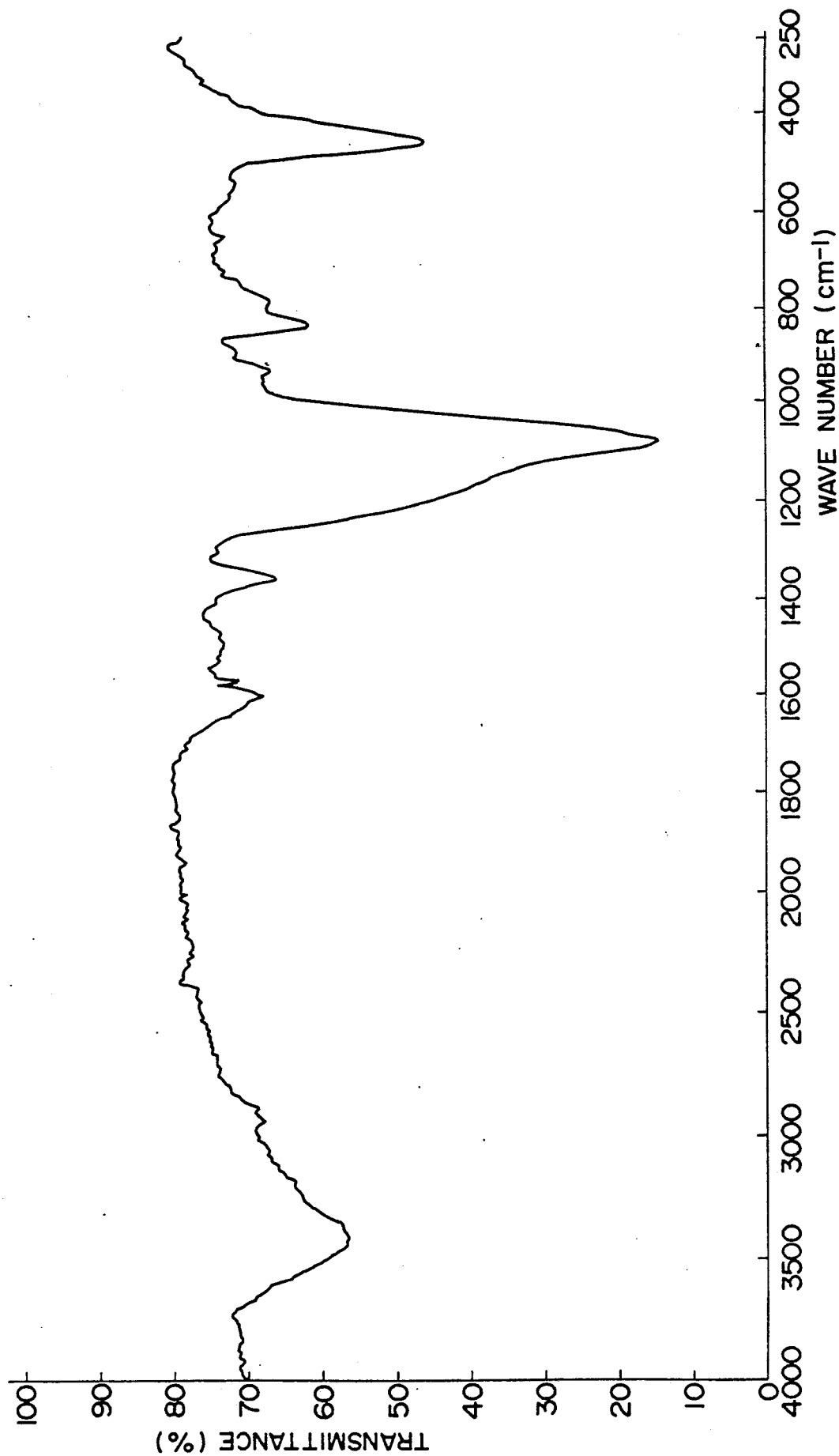
FIG. 23 is IR spectrum of dihydroxysilicontetra(-trimethylsilylmethylthio)naphthalocyanine.
Figure 24:
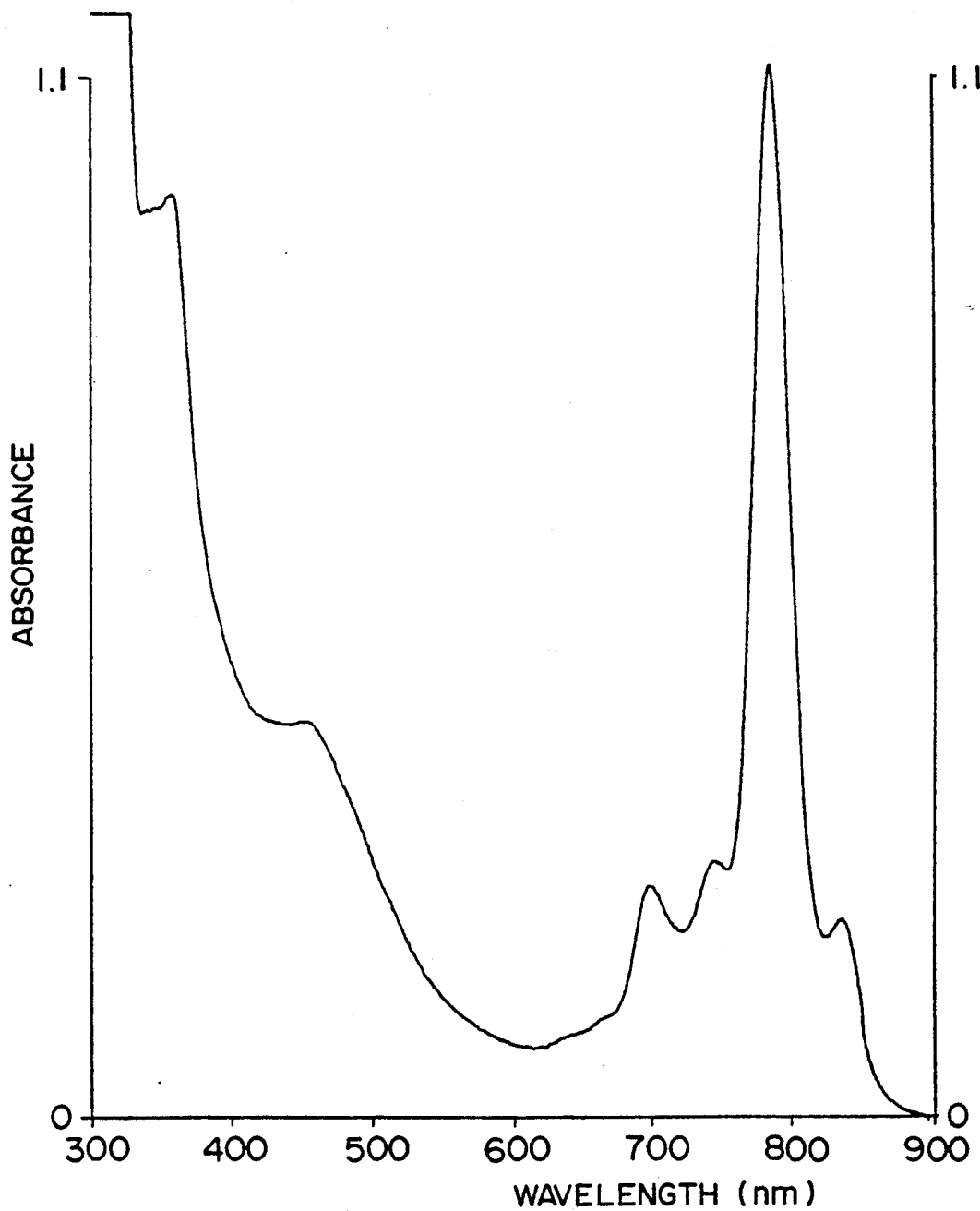
FIG. 24 is electronic spectrum of dihydroxysilicontetra(trimethylsilylmethylthio)naphthalocyanine.

In an atmosphere of nitrogen, 15 ml of silicon tetrachloride was added to a suspension of 5.4 g (17.2 mmols) of 6-trimethylsilylmethylthio-1,3-diiminobenz(f)-isoindoline in 50 ml of anhydrous quinoline, and the resulting mixture was reacted at 220° C. for about 3 hours. After allowing the reaction mixture to cool, it was poured into a mixture consisting of 200 ml of ethanol and 100 ml of concentrated aqueous ammonia and heated under reflux for 6 hours. After allowing the mixture to cool, the crystalline product was collected by filtration with suction, washed with methanol and ethanol, and dried under reduced pressure to obtain 5.9 g of dihydroxysilicon-tetra(trimethylsilylmethylthio)-naphthalocyanine (formula (II) wherein M is Si, $R^1$ is $CH_2Si(CH_3)_3$, and k, l, m and n are 1) as a deep green solid product. This compound was used in the subsequent experiment without further purification. Its IR spectrum and electronic spectrum are shown in FIG. 23 and FIG. 24, respectively.

EXAMPLE 1

Synthesis of [bis(tri-n-butylsiloxy)silicon-tetra(trimethylsilylmethylthio)naphthalocyanine] (Compound (8))

Method A

To a solution of 1.5 g (1.01 mmols) of bis-(tri-n-butylsiloxy)silicon-tetrabromonaphthalocyanine in quinoline (170 ml)/pyridine (40 ml) mixture was added 7.42 g (10.1 mmols) of copper (I) trimethylsilylmethylthiolate synthesized according to the method mentioned in Organic Syntheses, vol. 42, page 22, and the resulting mixture was heated under reflux at 160–170° C. for 9 hours. After allowing the reaction mixture to cool, it was poured into 500 ml of methanol/water mixture (2/1), and the deposited crystalline product was collected by filtration. After washing it with ethanol, only the component soluble in cyclohexane was extracted. After concentrating it, it was separated by alumina column chromatography and recrystallized from toluene/methanol. Thus, 152 mg (9%) of a green-colored crystalline product was obtained.

Method B

To a solution of 4.3 g (3.48 mmols) of dihydroxysilicon-tetra(trimethylsilylmethylthio)naphthalocyanine in 200 ml quinoline was added 7.5 ml (30 mmols) of tributylsilanol, and the resulting mixture was reacted at 200° C. for 3 hours. After allowing the reaction mixture to cool, it was poured into 500 ml of methanol, and the deposited crystalline product was collected by filtration, washed with methanol and ethanol and dried under reduced pressure to obtain a crystalline product. Impurities present in this product were removed by silica gel flush column chromatography (toluene/cyclohexane elution), and the crystal obtained was recrystallized from toluene/methanol mixture to obtain 620 mg of a green colored crystalline product.

The green crystal obtained by Method A and Method B was confirmed as bis(tri-n-butylsiloxy)silicon-tetra(-trimethylsilylmethylthio)naphthalocyanine (Compound (8)) with reference to the following analyses:

(1) Melting point: 267–269° C.
(2) Elementary analyses:

|  | C | H | N |
|---|---|---|---|
| Calculated (%) | 64.26 | 7.23 | 6.81 |
| Found (%) | 64.43 | 7.41 | 6.65 |

Figure 25:
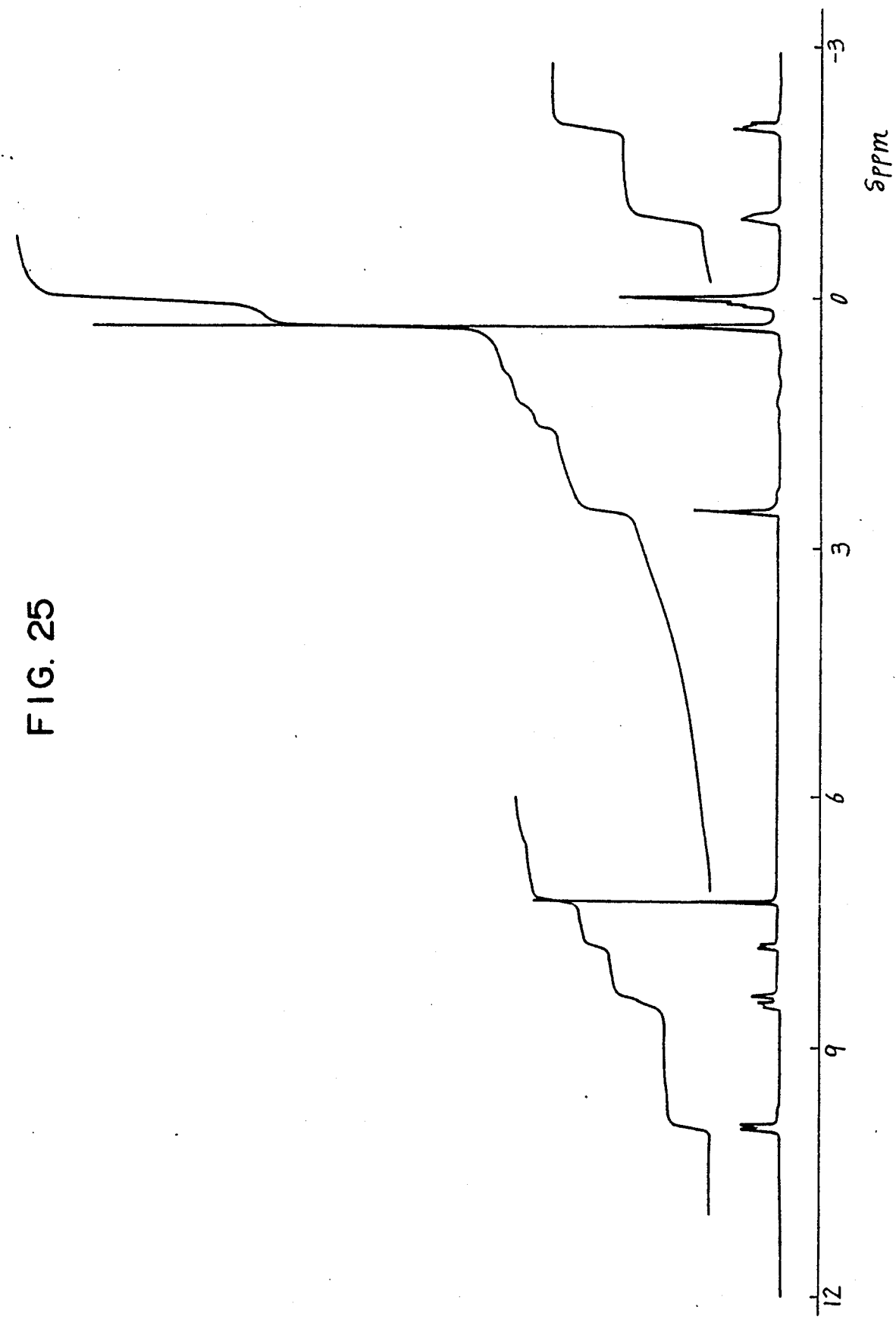
FIG. 25 is NMR spectrum of Compound (8)

(3) NMR spectrum (FIG. 25) $CDCl_3$
$\delta$: 9.98 (4H, br-s)
9.94 (4H, br-s)
8.49 (4H, dd, J=2.75, 8.85Hz)
8.39 (4H, br-s)
7.79 (4H, d, J=8.85Hz)
2.56 (8H, br-s)
0.35 (36H, s)
0.00 (30H, m)
−0.97 (12H, m)
−2.05 (12H, m)

Figure 26:
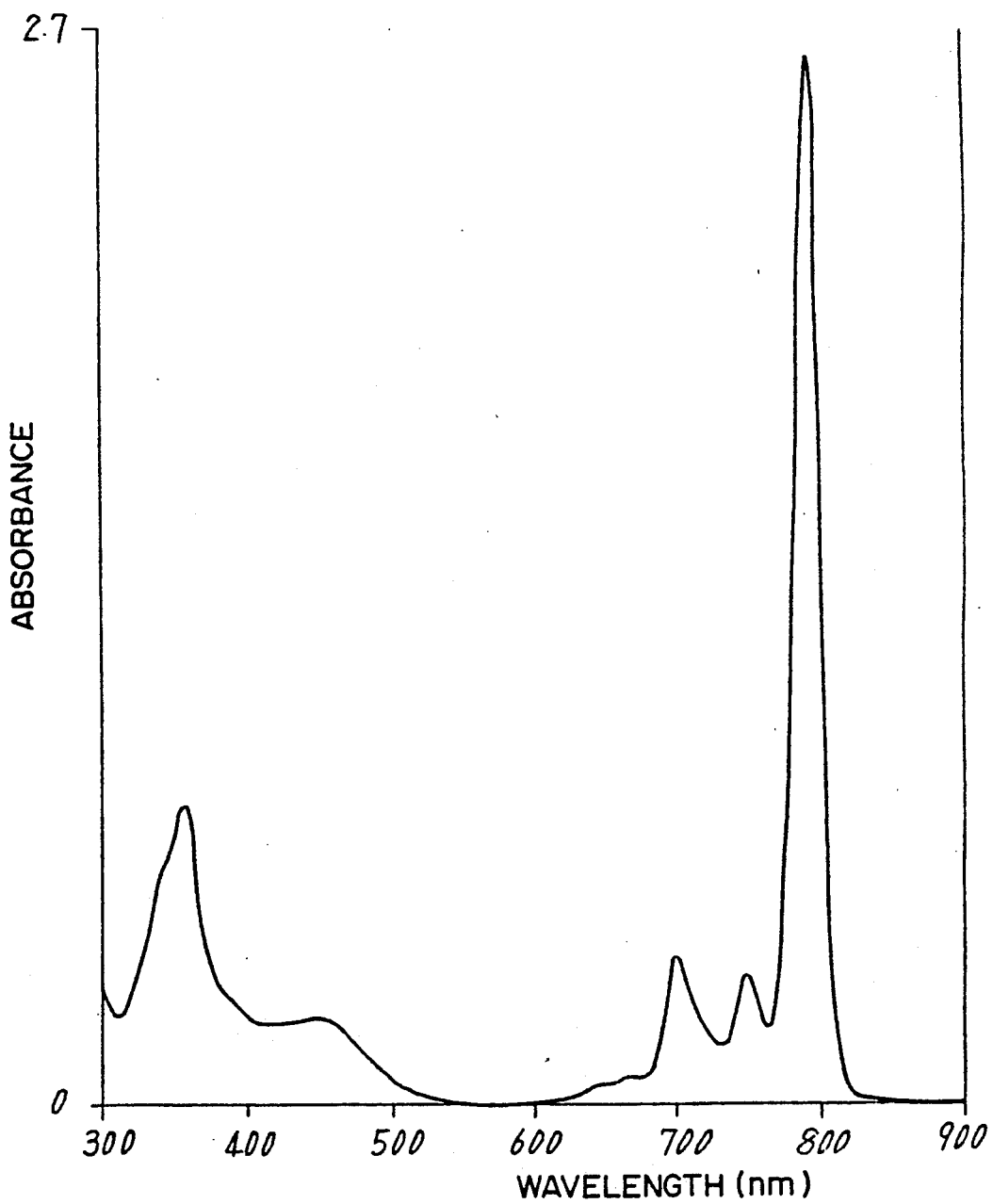
FIG. 26 is electronic spectrum of Compound (8)

(4) Electronic spectrum (tetrahydrofuran solution): FIG. 26

Figure 27:
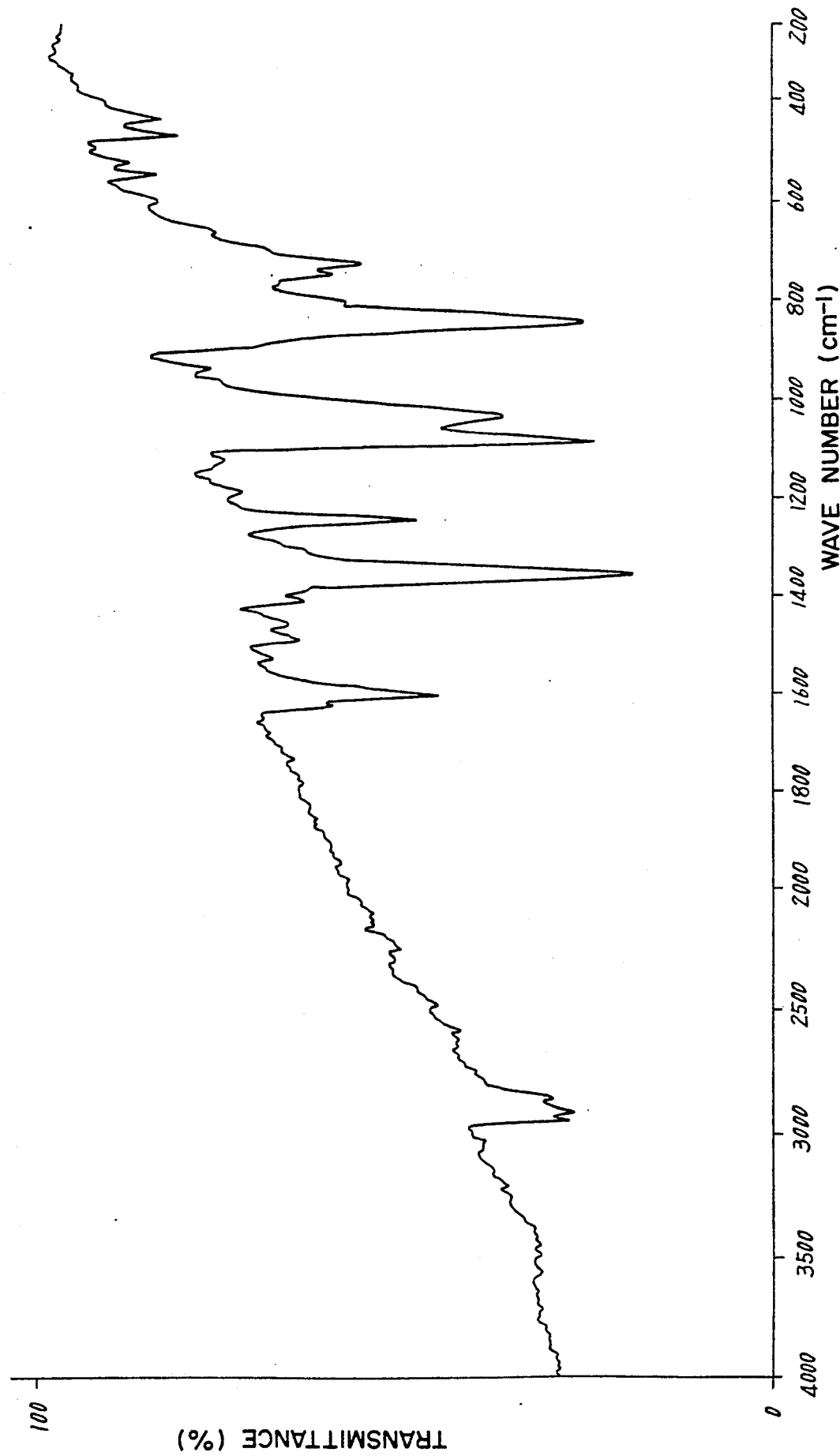
FIG. 27 is IR spectrum of Compound (8)

(5) IR spectrum (KBr method): FIG. 27

EXAMPLE 2

Synthesis of [bis(triethylsiloxy)silicon-tetra(trimethylsilylmethylthio)naphthalocyanine](Compound (16))

To a solution of 2.0 g (1.6 mmols) of dihydroxysilicon-tetra(trimethylsilylmethylthio)naphthalocyanine in 80 ml of quinoline was added 3.0 ml (19.7 mmols) of triethylsilanol, and the resulting mixture was reacted at 180° C. for 2 hours. After allowing the reaction mixture to cool, it was treated in the same manner as in Method B of Example 1. As a result, 425 mg of a green colored crystalline product was obtained. With reference to the following analyses, this compound was confirmed as bis(triethylsiloxy)-tetra(trimethylsilylmethylthio)naphthalocyanine (Compound (16)).

(1) Melting point: above 300° C.
(2) Elementary analyses:

|  | C | H | N |
|---|---|---|---|
| Calculated (%) | 61.83 | 6.42 | 7.59 |
| Found (%) | 61.65 | 6.53 | 7.55 |

Figure 28:
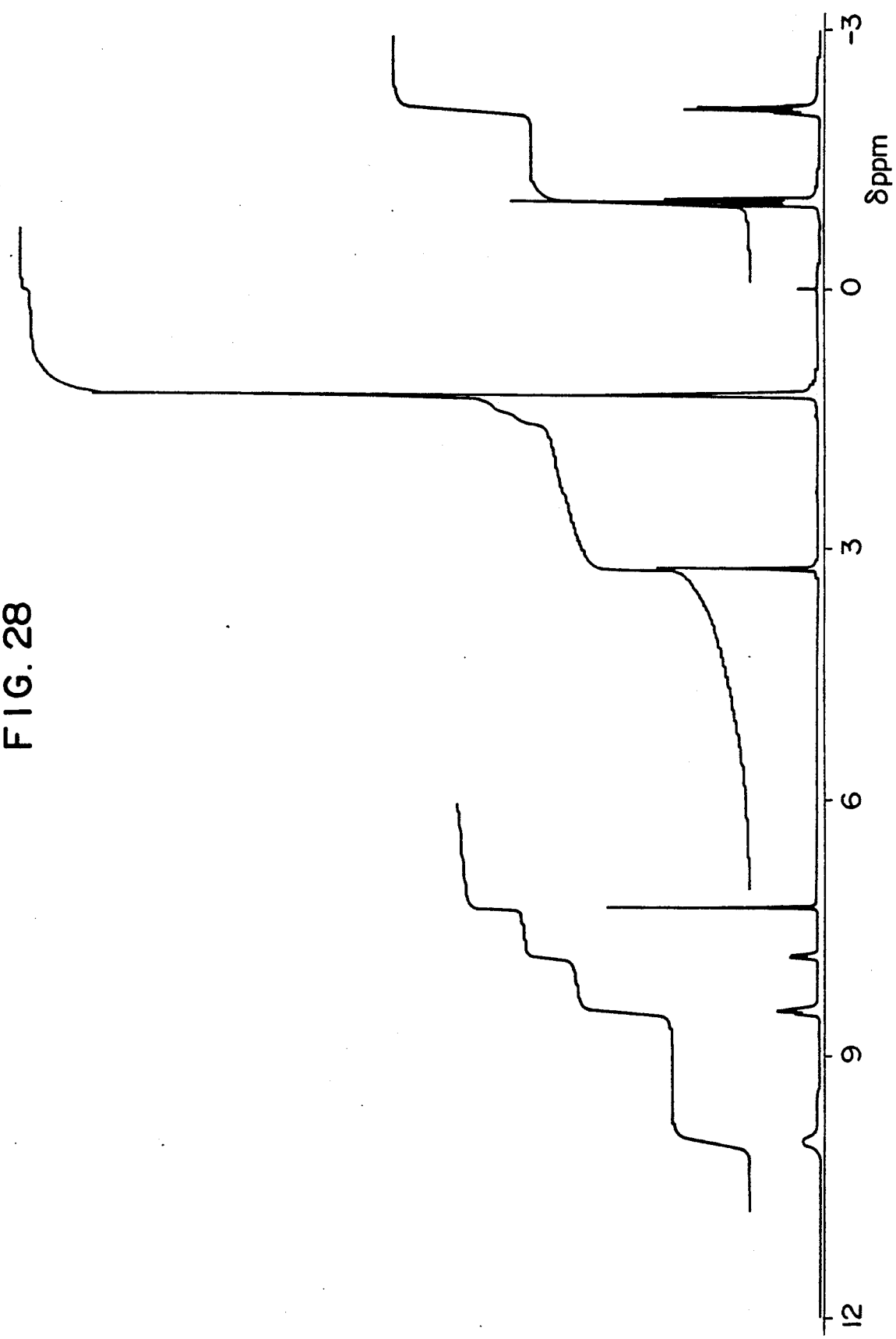
FIG. 28 is NMR spectrum of Compound (16)
Figure 29:
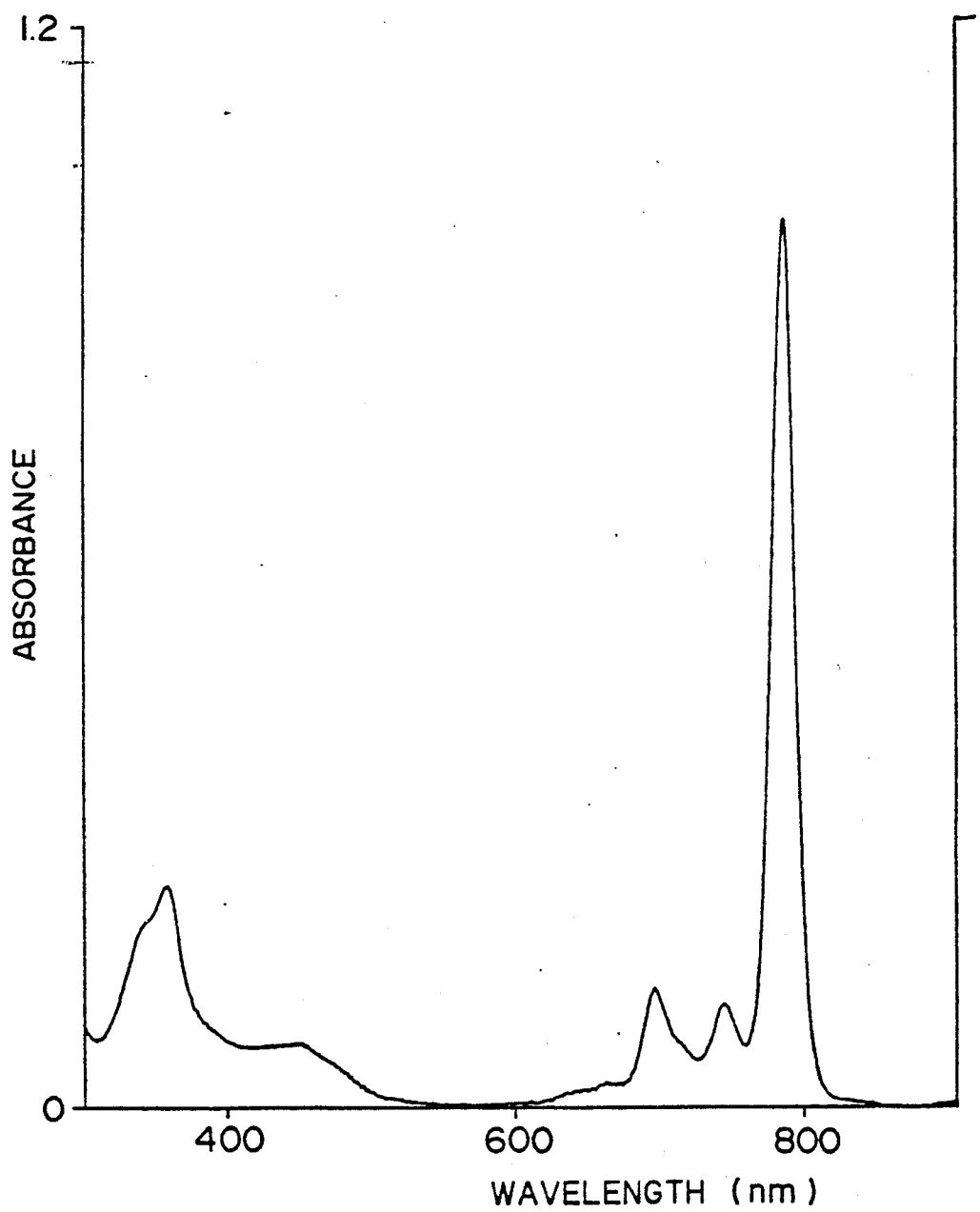
FIG. 29 is electronic spectrum of Compound (16)
Figure 30:
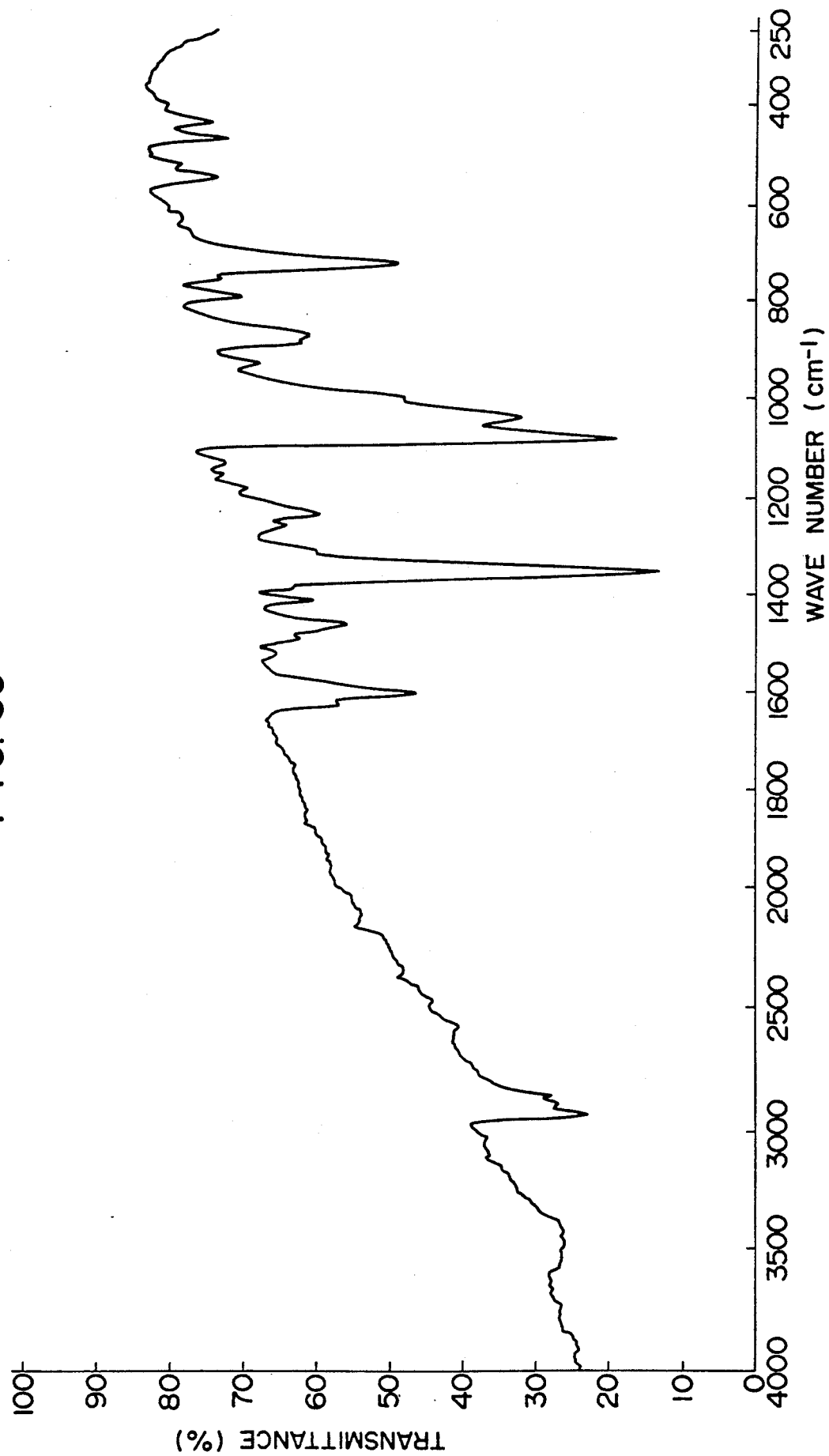
FIG. 30 is IR spectrum of Compound (16)

(3) NMR spectrum (FIG. 28)
δ: 10.00 8H, br-s)
8.51 (4H, d, J=8.85Hz)
8.47 (4H, br-s)
7.84 (4H, dd, J=8.85, 1.83Hz)
3.27 (8H, br-s)
1.25 (36H, s)
−1.02 (18H, t, J=7.94Hz)
−2.07 (12H, q, J=7.94Hz)
(4) Electronic spectrum (tetrahydrofuran solution): FIG. 29 (5) IR spectrum (KBr method): FIG. 30

EXAMPLE 3

Synthesis of [bis(tripropylsiloxy)silicon-tetra(trimethylsilylmethylthio)naphthalocyanine](Compound (9))

To a solution of 2.0 g (1.6 mmols) of dihydroxysilicon-tetra(trimethylsilylmethylthio)-naphthalocyanine in 75 ml quinoline were added 2.0 ml (9.14 mmols) of tripropylchlorosilane and 5 ml of tri-n-butylamine, and the resulting mixture was reacted at 150° C. for 30 minutes. After allowing the reaction mixture to cool, it was poured into a mixture consisting of 150 ml of methanol and 50 ml of water, and the deposited crystalline product was collected by filtration, washed with methanol and ethanol, and thereafter treated in the same manner as in Method B of Example 1. As a result, 800 mg of a green colored crystalline product was obtained. With reference to the following analyses, this product was confirmed as bis(tripropylsiloxy)silicon-tetra(trimethylsilylmethylthio)naphthalocyanine (Compound (9)).

(1) Melting point: above 300° C.
(2) Elementary analyses:

|  | C | H | N |
|---|---|---|---|
| Calculated (%) | 63.11 | 6.85 | 7.18 |
| Found (%) | 63.40 | 6.77 | 7.25 |

Figure 31:
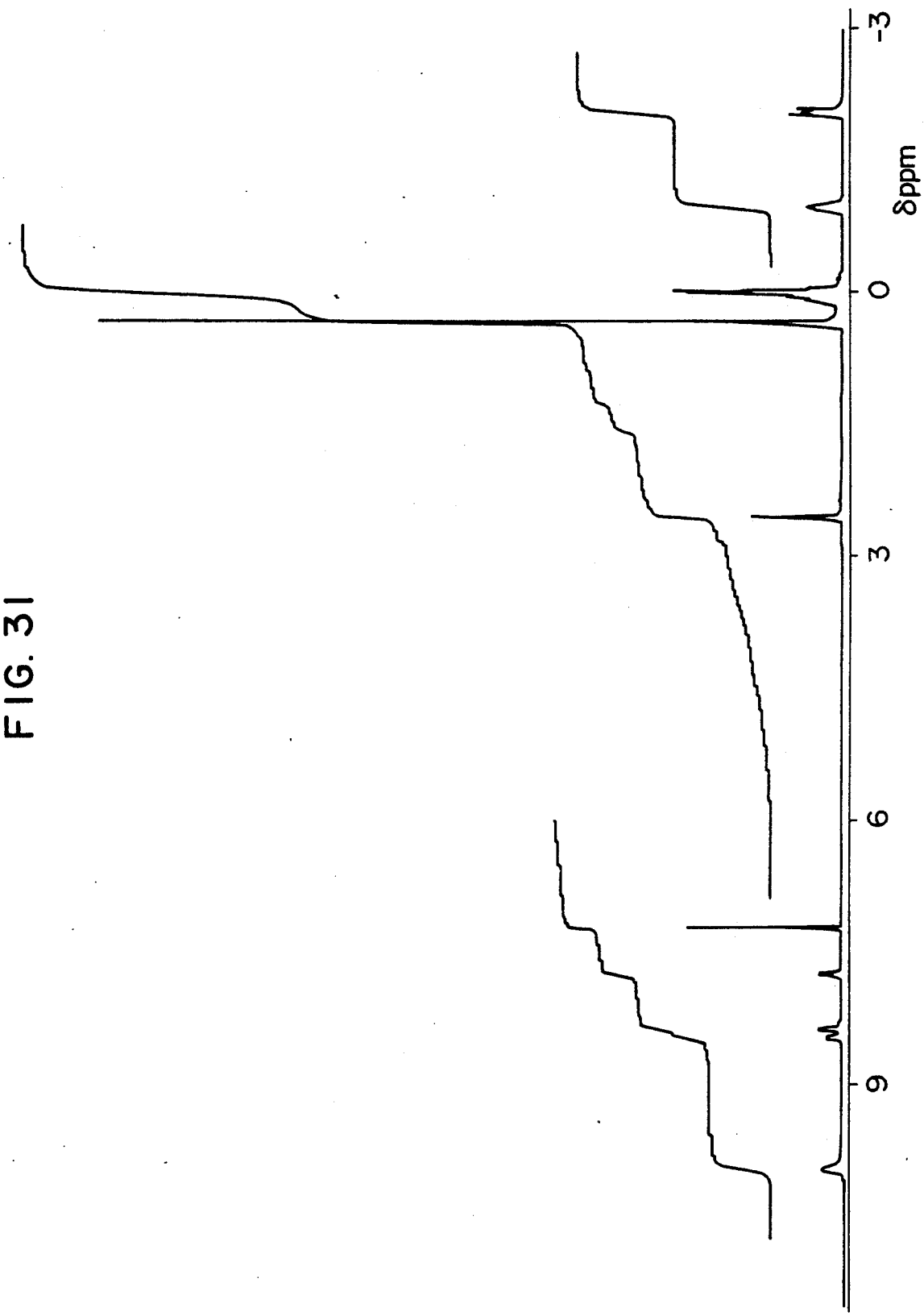
FIG. 31 is NMR spectrum of Compound (9)
Figure 32:
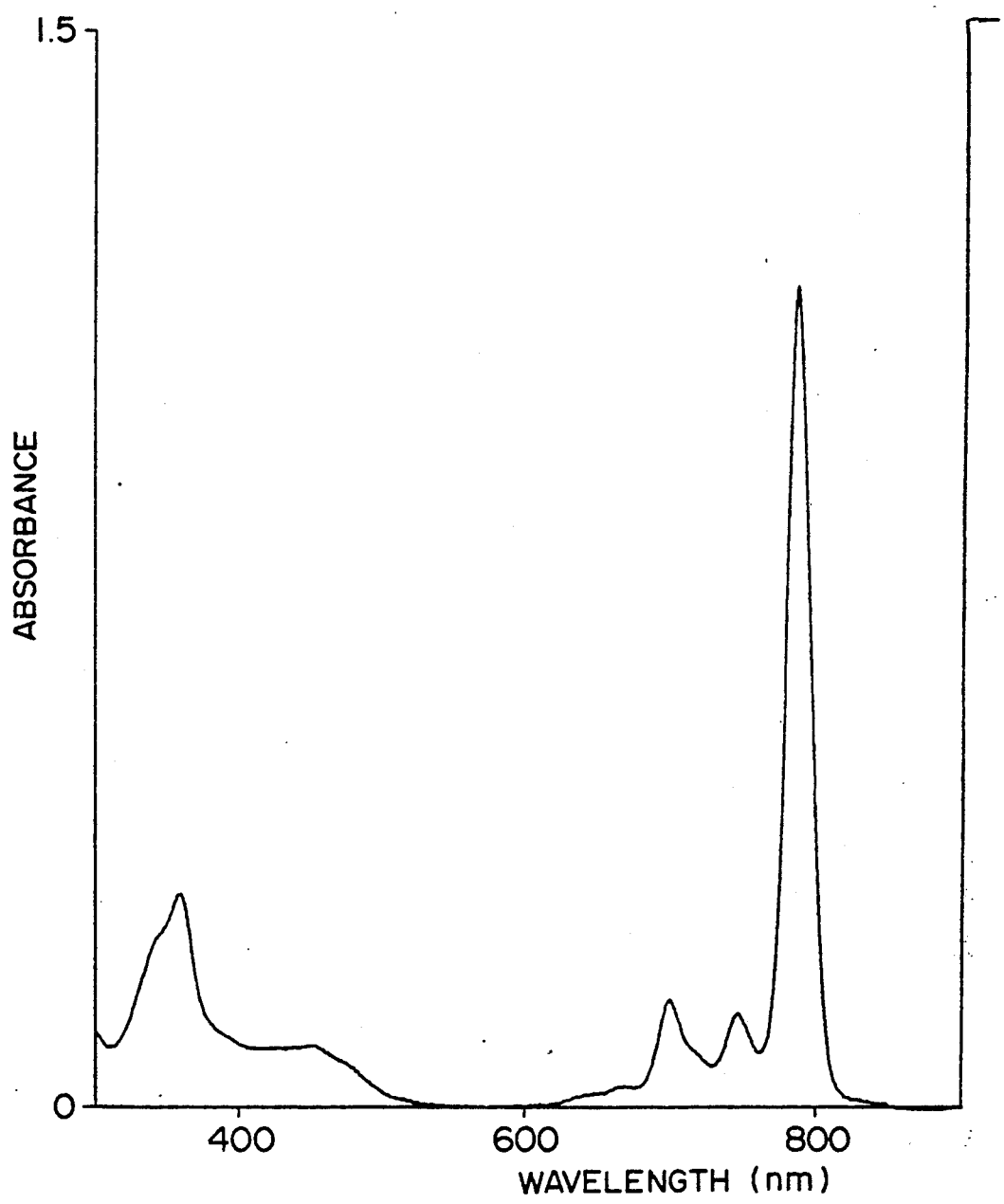
FIG. 32 is electronic spectrum of Compound (9)
Figure 33:
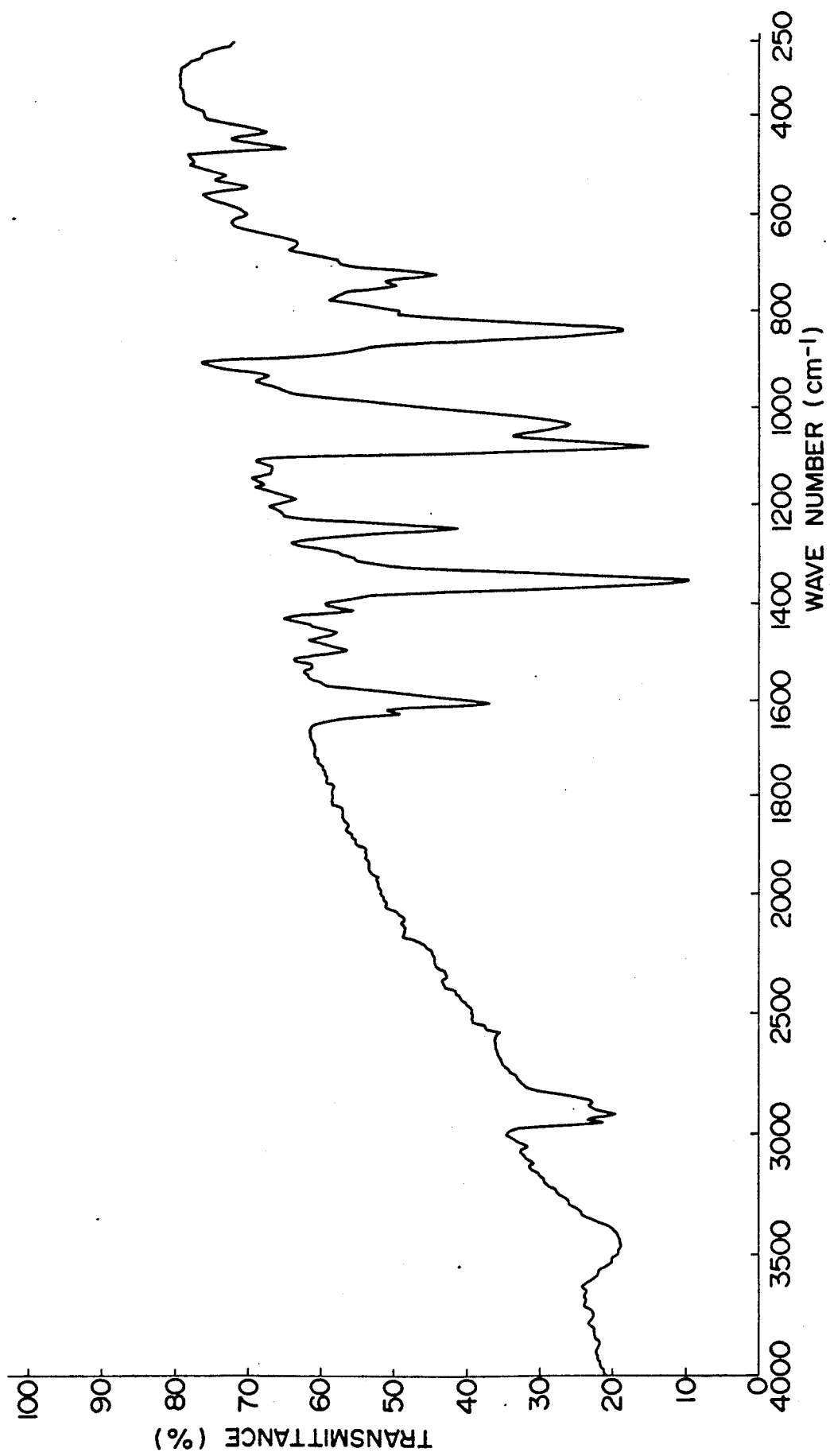
FIG. 33 is IR spectrum of Compound (9)

(3) NMR spectrum (FIG. 31): CDCl$_3$
δ: 9.96 (8H, br-s)
8.49 (4H, d, J=8.85Hz)
8.39 (4H, br-s)
7.78 4H, d, J=8.85Hz)
2.56 (8H, br-s)
0.35 (36H, s)
0.00 (18H, m)
−0.97 (12H, m)
−2.07 (12H, m)
(4) Electronic spectrum (tetrahydrofuran solution): FIG. 32 (5) IR spectrum (KBr method): FIG. 33

EXAMPLE 4

Synthesis of [bis(tri-n-hexylsiloxy)silicon-tetra(trimethylsilylmethylthio)naphthalocyanine](Compound (13))

To a solution of 2.0 g of (1.6 mmols) of dihydroxysilicon-tetra(trimethylsilylmethylthio)naphthalocyanine in 80 ml quinoline were added 2.0 ml (5.46 mmols) of tri-n-hexylchlorosilane and 5 ml of tri-n-butylamine, and the resulting mixture was reacted at 150° C. for 30 minutes. After allowing the reaction mixture to cool, it was poured into a mixture consisting of 150 ml of methanol and 50 ml of water. The deposited crystalline product was collected by filtration, washed with methanol and ethanol, and thereafter treated in the same manner as in Method B of Example 1. As the result, 841 mg of a green crystalline product was obtained. With reference to the following analyses, it was confirmed as bis(tri-n-hexylsiloxy)silicon-tetra(trimethylsilylmethylthio)naphthalocyanine (Compound (13)).

(1) Melting point: 190–191° C.
(2) Elementary analyses;

|  | C | H | N |
|---|---|---|---|
| Calculated (%) | 66.25 | 7.89 | 6.18 |
| Found (%) | 66.42 | 7.65 | 6.43 |

Figure 34:
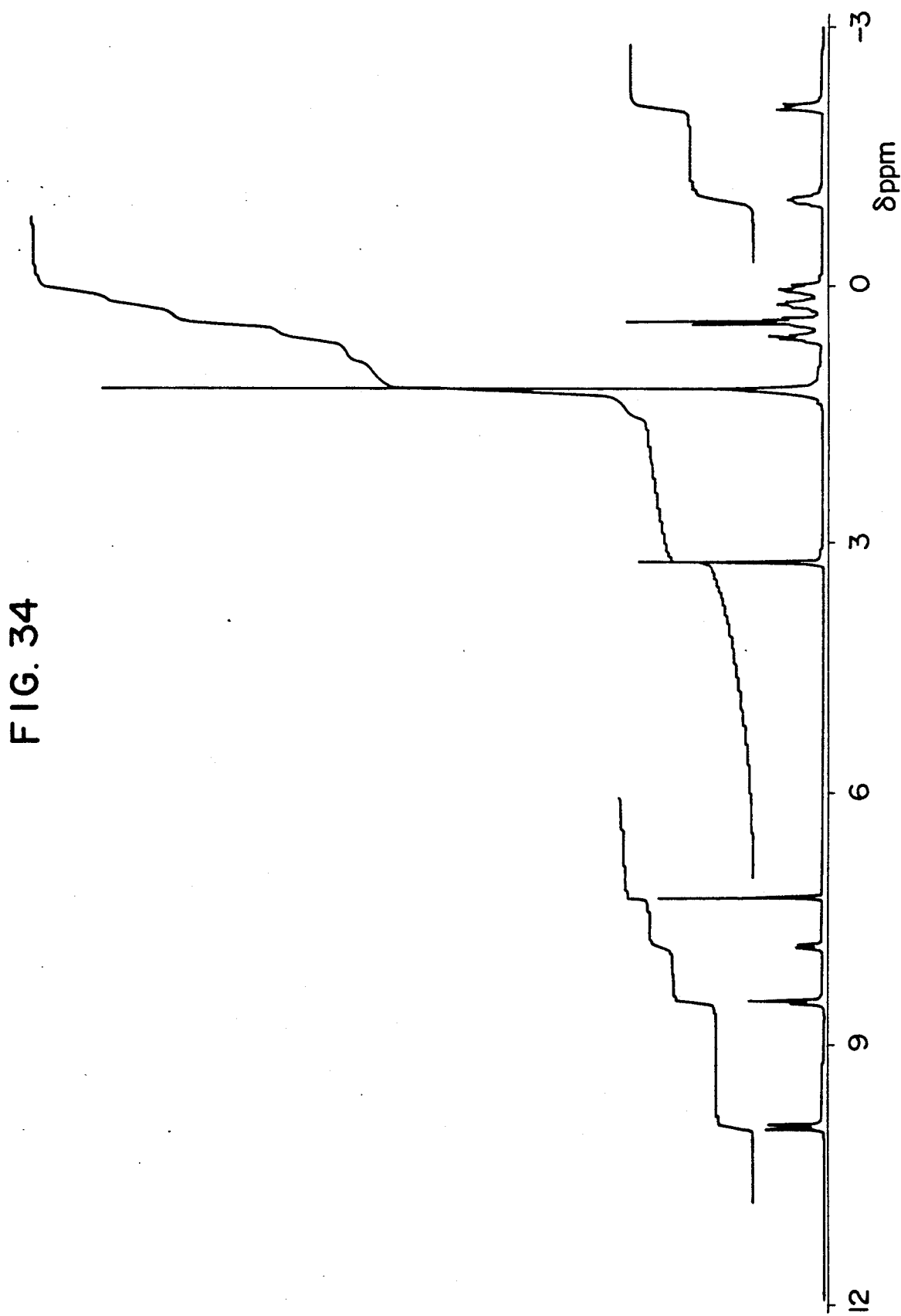
FIG. 34 is NMR spectrum of Compound (13)
Figure 35:
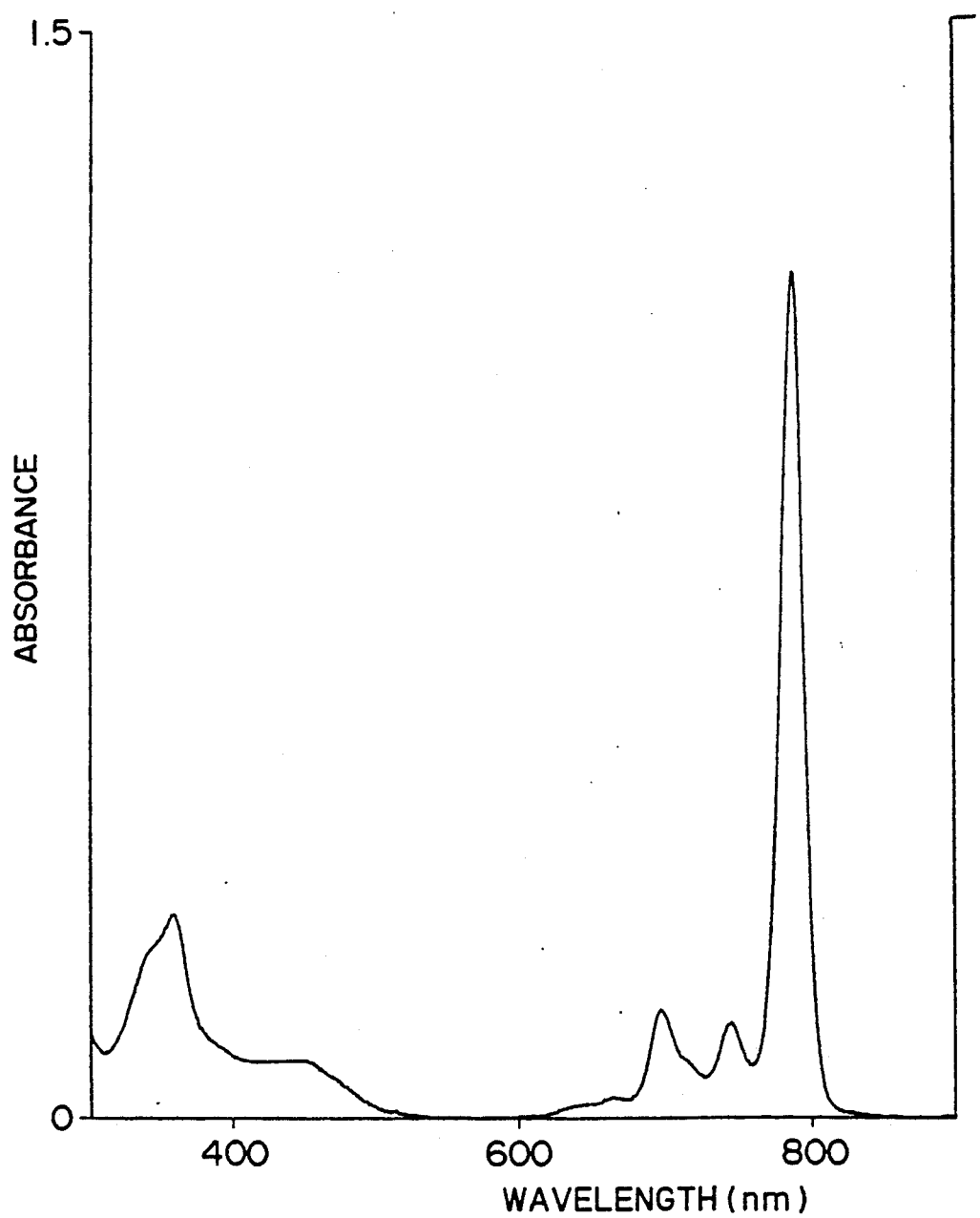
FIG. 35 is electronic spectrum of Compound (13)
Figure 36:
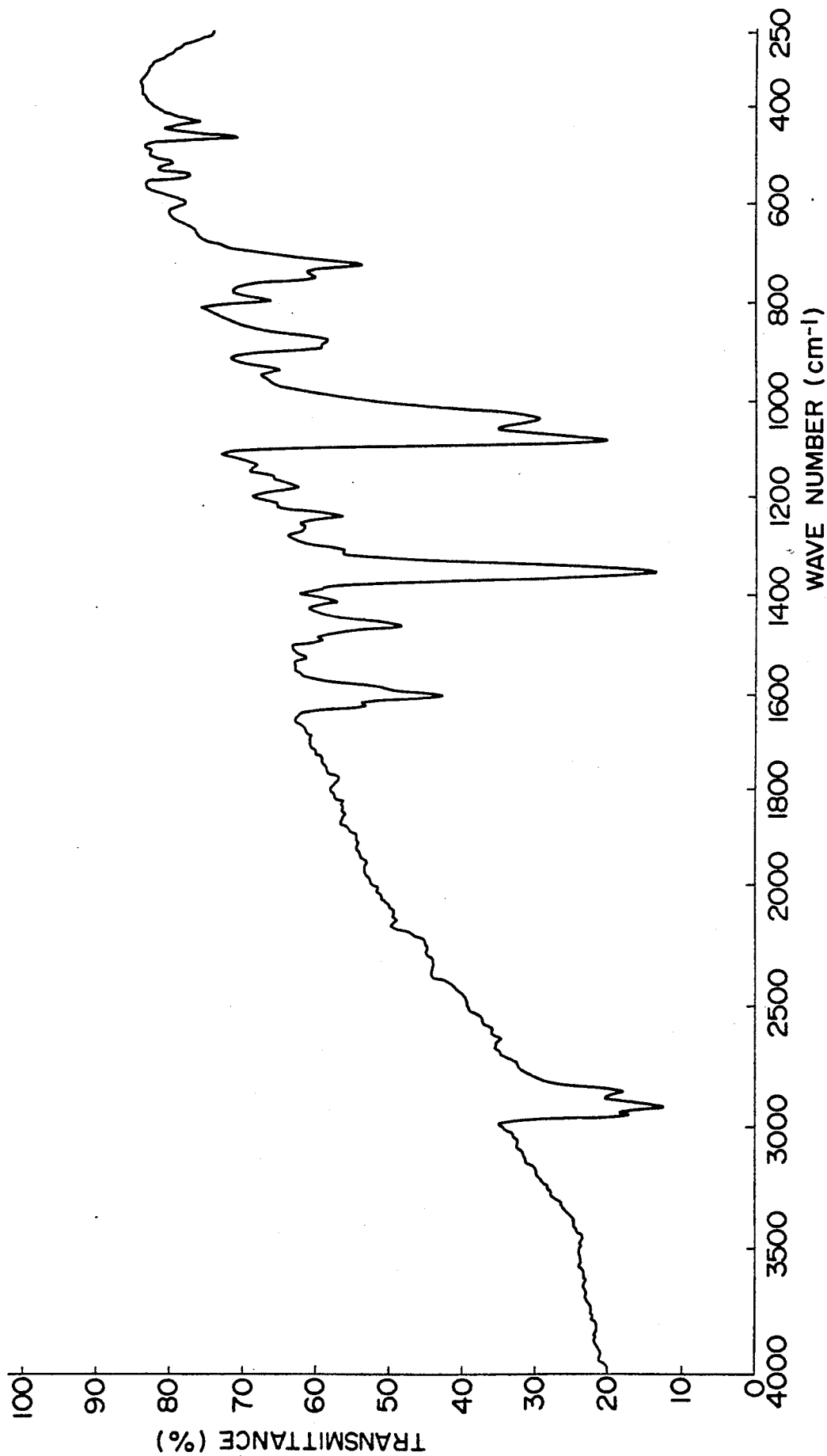
FIG. 36 is IR spectrum of Compound (13)

(3) NMR spectrum (FIG. 34): CDCl$_3$
δ: 9.99 (4H, br-s)
9.94 (4H, br-s)
8.50 (4H, d, J=8.85Hz)
8.49 (4H, br-s)
7.83 (4H, d, J=8.85Hz)
3.26 (8H, br-s)
1.24 (36H, s)
0.62 (12H, m)
0.44 (18H, t, J=7.17Hz)
0.23 (12H, m)
0.06 (12H, m)
−0.99 (12H, m)
−2.08 (12H, m)
(4) Electronic spectrum (tetrahydrofuran solution): FIG. 35
(5) IR spectrum (KBr method): FIG. 36

EXAMPLE 5

Figure 37:
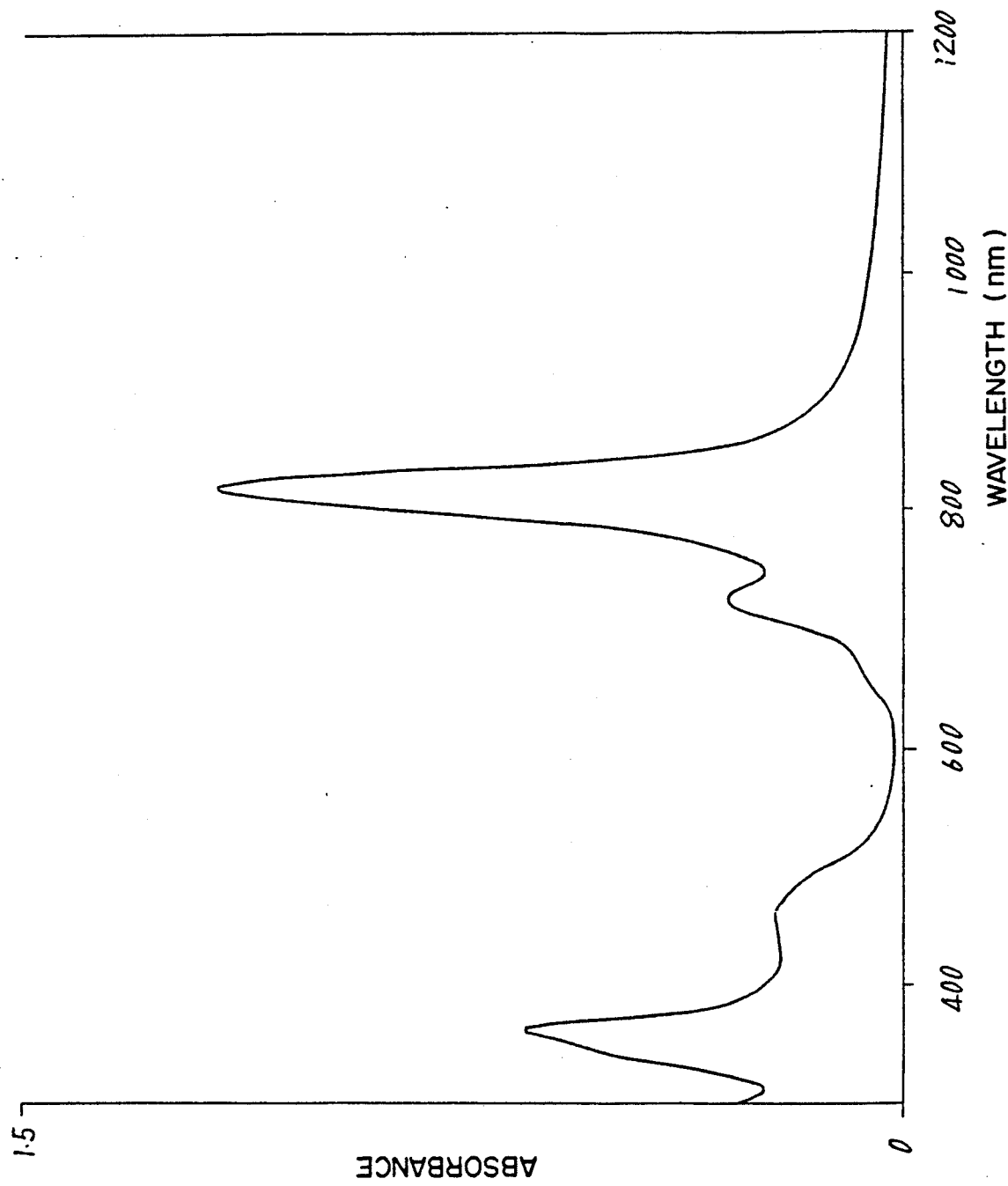
FIG. 37 is absorption spectrum of spin-coated film of Compound (8)
Figure 38:
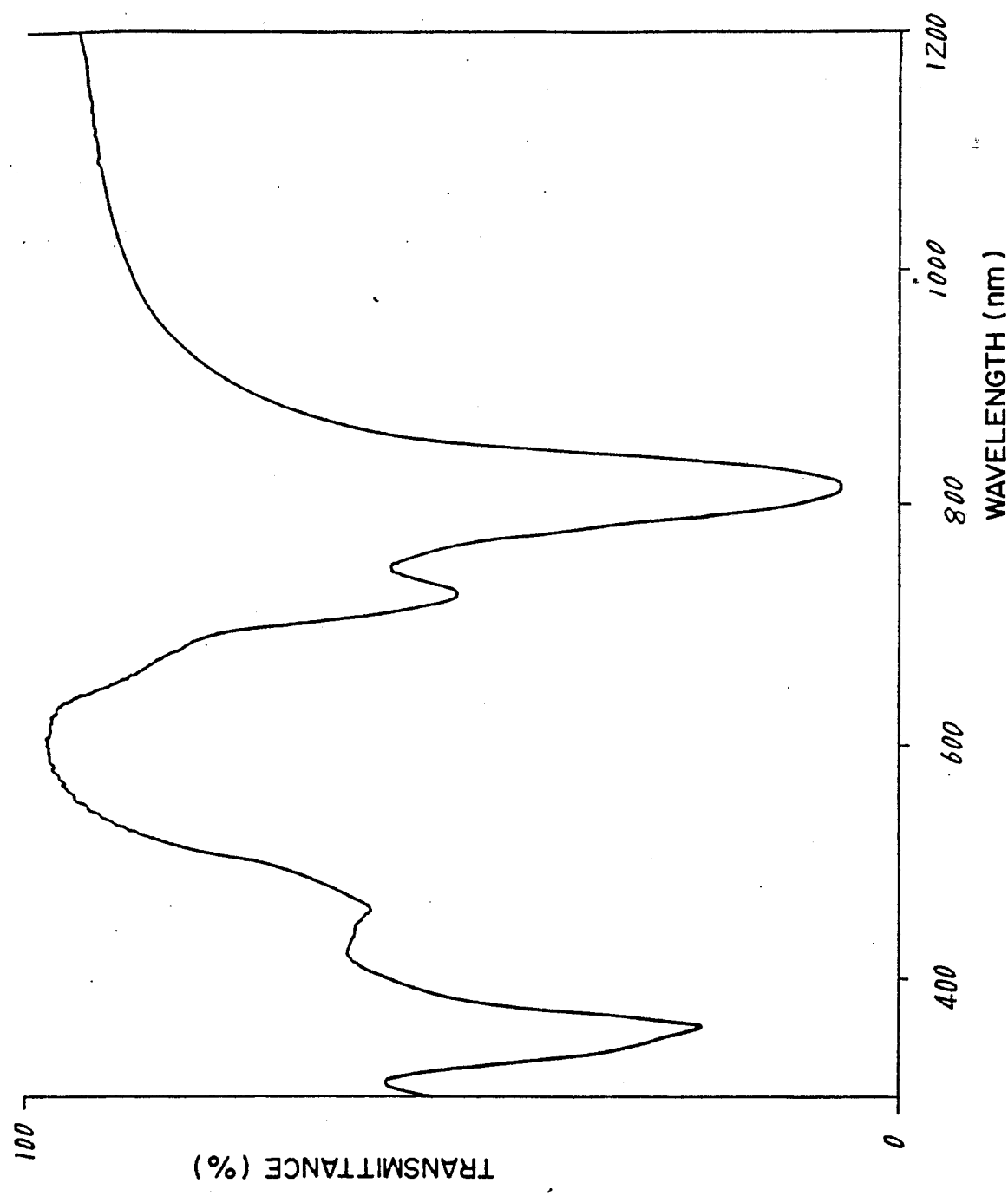
FIG. 38 is transmission spectrum of spin-coated film of Compound (8)
Figure 39:
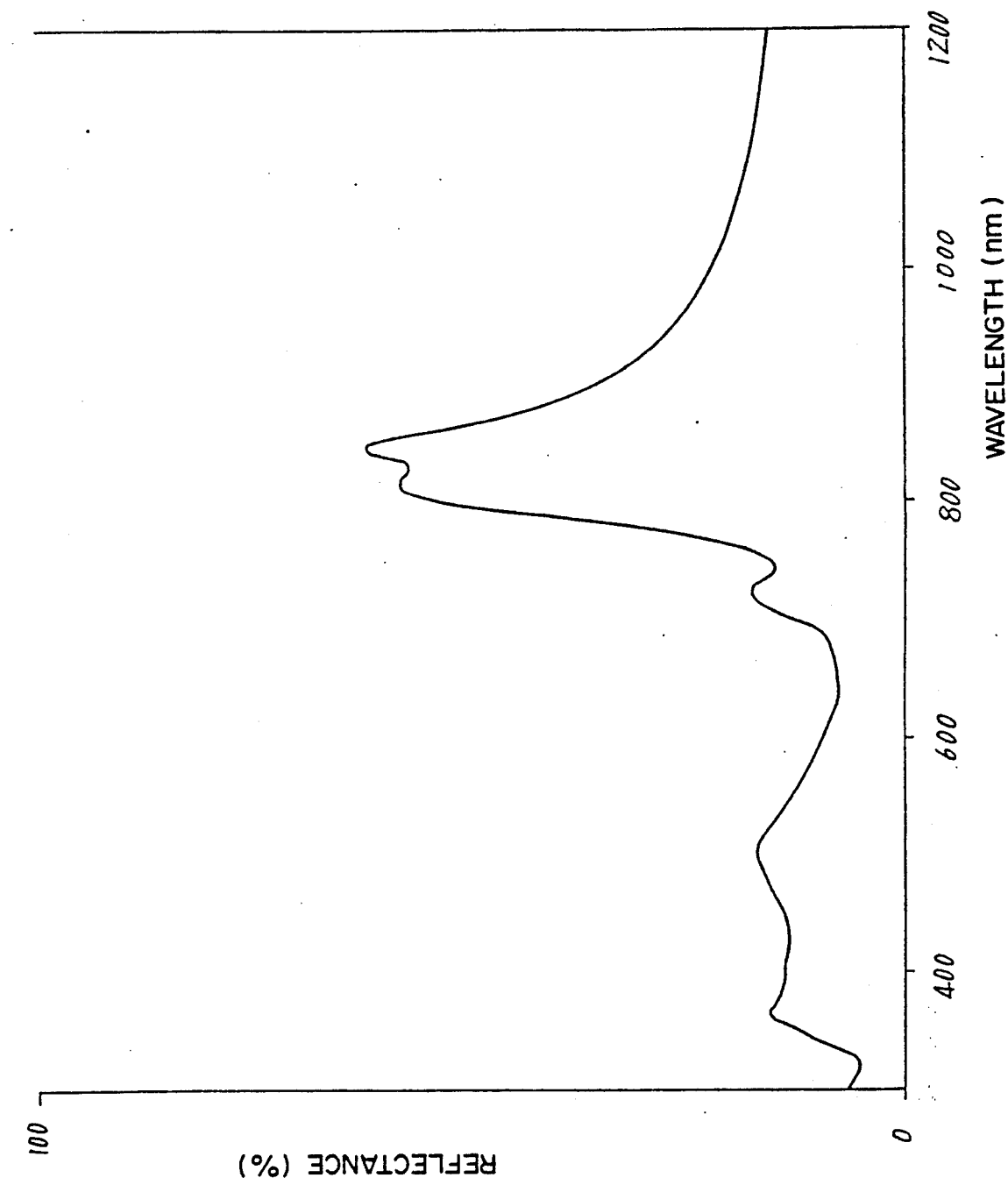
FIG. 39 is 5° specular reflection spectrum of spin-coated film of Compound (8) at a film thickness of 700 angstroms.

On a glass plate, an organic film having a thickness of about 700 angstroms was formed by spin-coating a solution consisting of 1 part by weight of bis(tri-n-butylsiloxy)silicon-tetra(trimethylsilylmethylthio)naphthalocyanine (Compound (8)) and 99 parts by weight of cyclohexane and drying it at about 80° C. for 15 minutes. Absorption spectrum, transmission spectrum and 5° specular reflection spectrum of the organic film of this compound are shown in FIG. 37, 38 and 39, respectively. It is understandable from these spectra that this compound exhibits a high light-absorbing ability and a high reflectance (ca. 60%) in the semiconductor laser region (780–830 nm).

EXAMPLE 6

Figure 40:
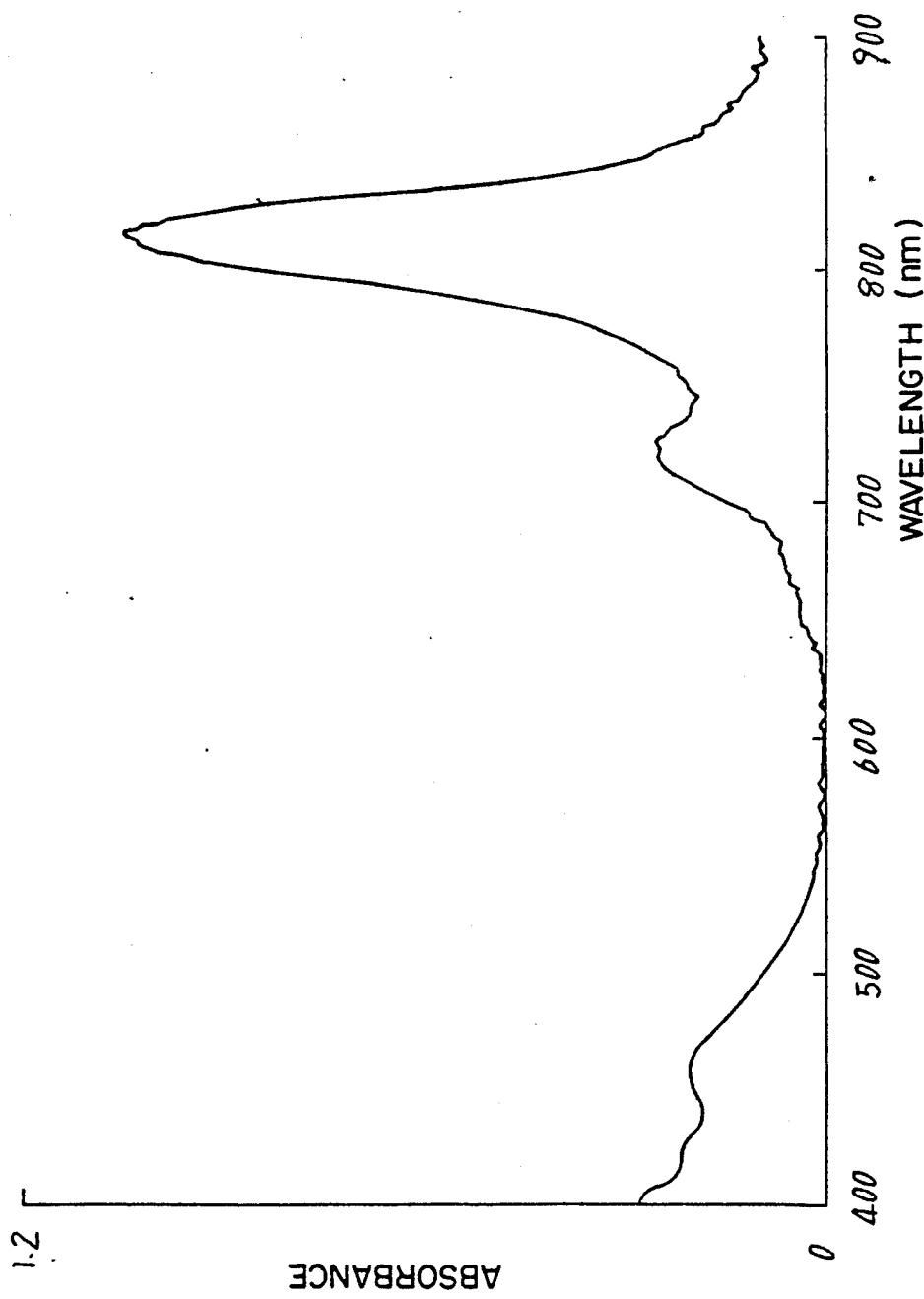
FIG. 40 is absorption spectrum of a film prepared by spin-coating Compound (8) on polycarbonate substrate.
Figure 41:
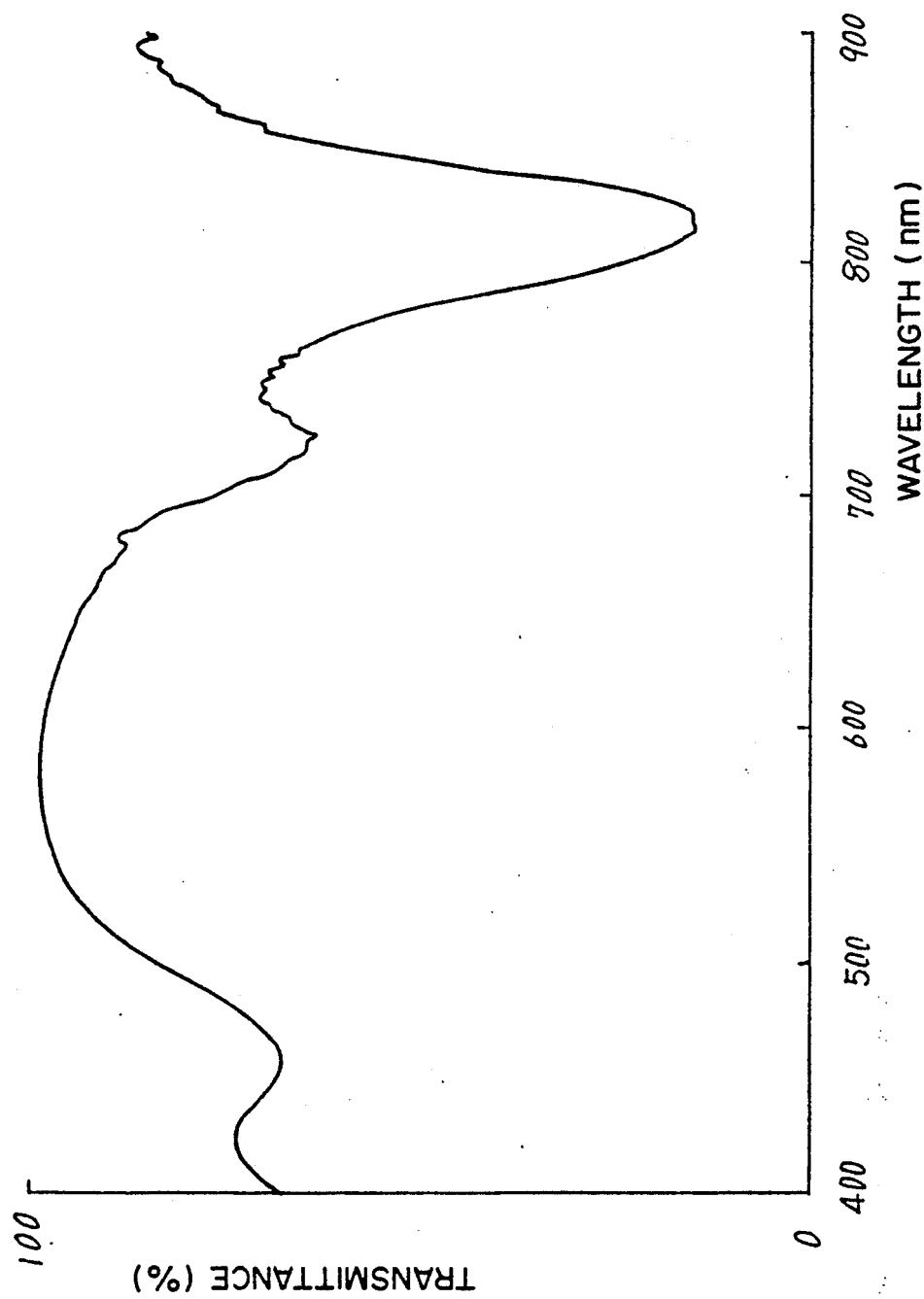
FIG. 41 is transmission spectrum of a film prepared by spin-coating Compound (8) on polycarbonate substrate.
Figure 42:
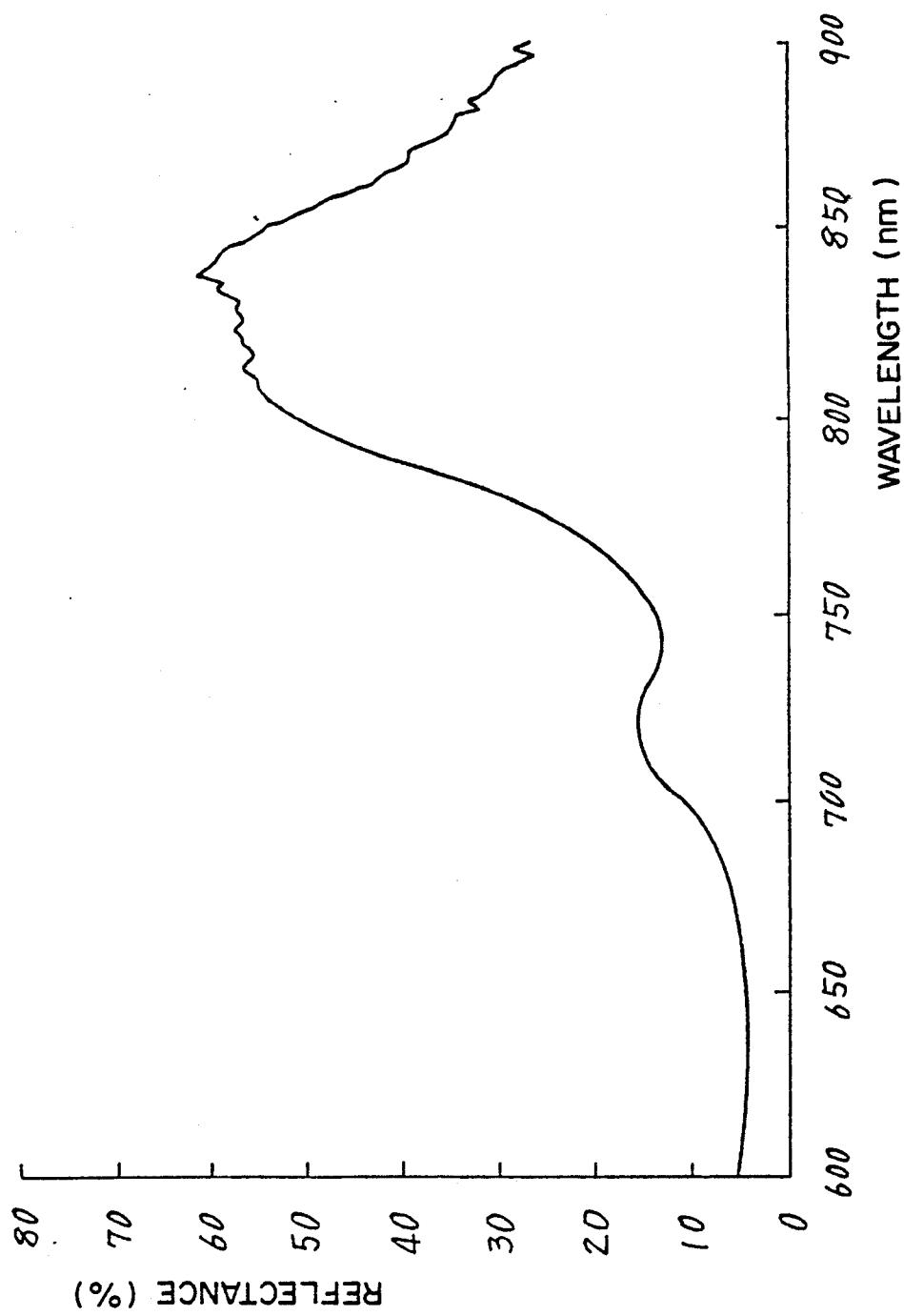
FIG. 42 is 5° specular reflection spectrum of a film prepared by spin-coating Compound (8) on polycarbonate substrate.

On a polycarbonate plate, an organic film having a thickness of about 700 angstroms was formed by spin-coating a solution consisting of 1 part by weight of bis(tri-n-butylsiloxy)silicon-tetra(trimethylsilylmethylthio)naphthalocyanine (Compound (8)) and 99 parts by weight of cyclohexane and drying it at about 80° C. for 15 minutes. Absorption spectrum, transmission spectrum and 5° specular reflection spectrum of the organic film of this compound formed on polycarbonate substrate are shown in FIG. 40, 41 and 42, respectively. It is understandable from these results that, similarly to the case of glass substrate, a high light-absorbing ability and a high reflectance (ca. 60%) are exhibited by this organic film in the semiconductor laser region (780-830 nm), on polycarbonate substrate, too.

EXAMPLE 7

Figure 43:
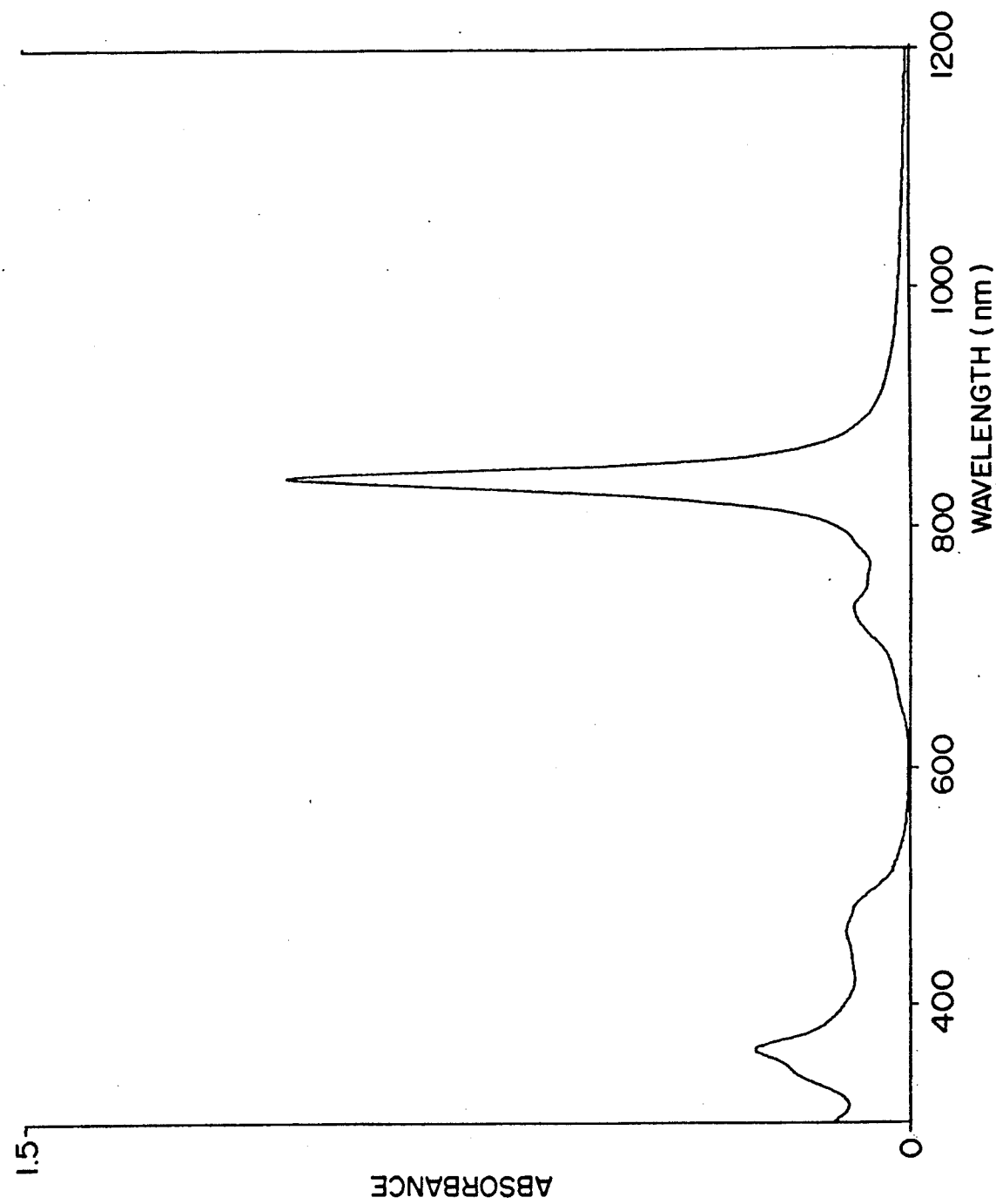
FIG. 43 is absorption spectrum of spin-coated film of Compound (16)
Figure 44:
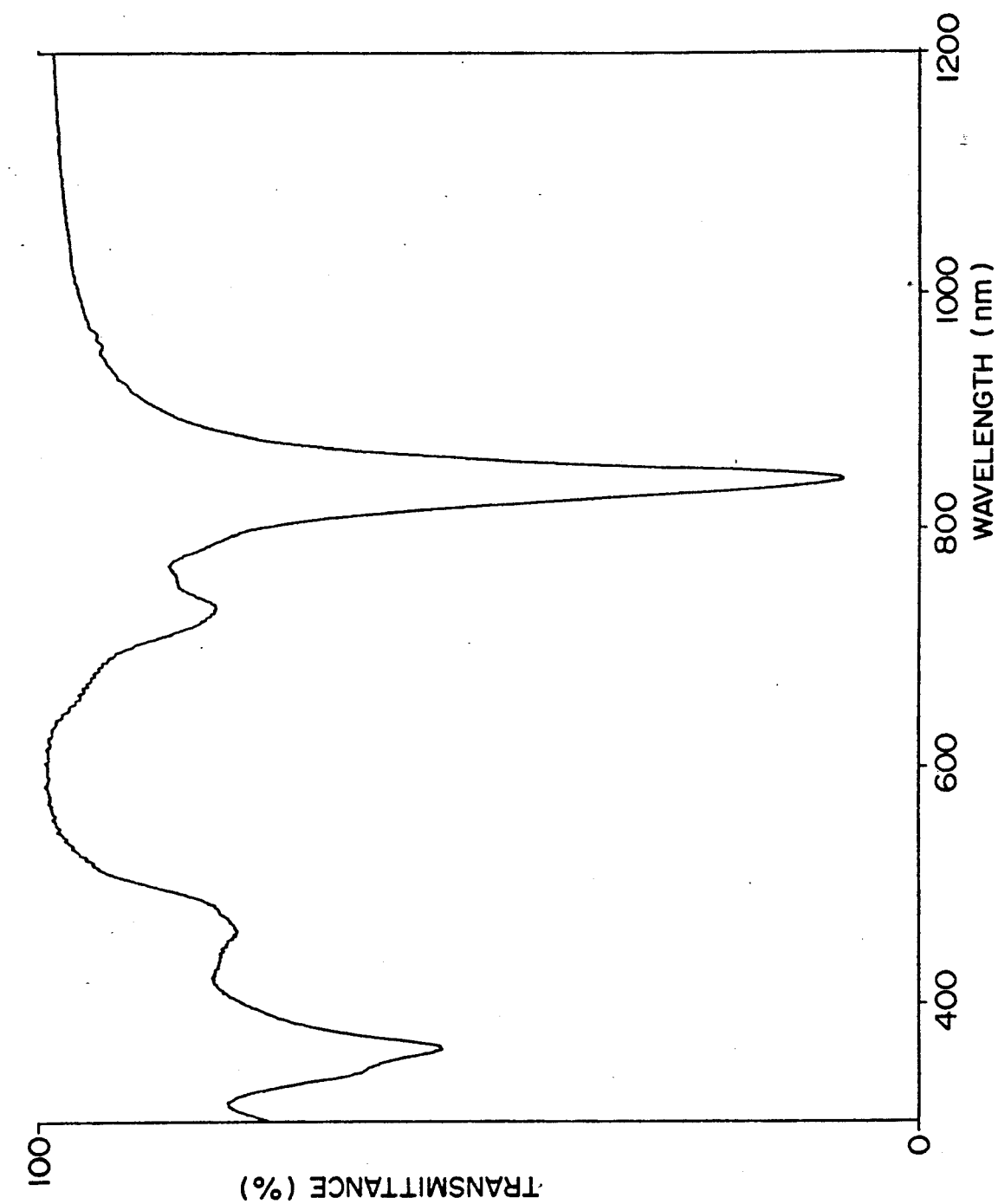
FIG. 44 is transmission spectrum of spin-coated film of Compound (16)
Figure 45:
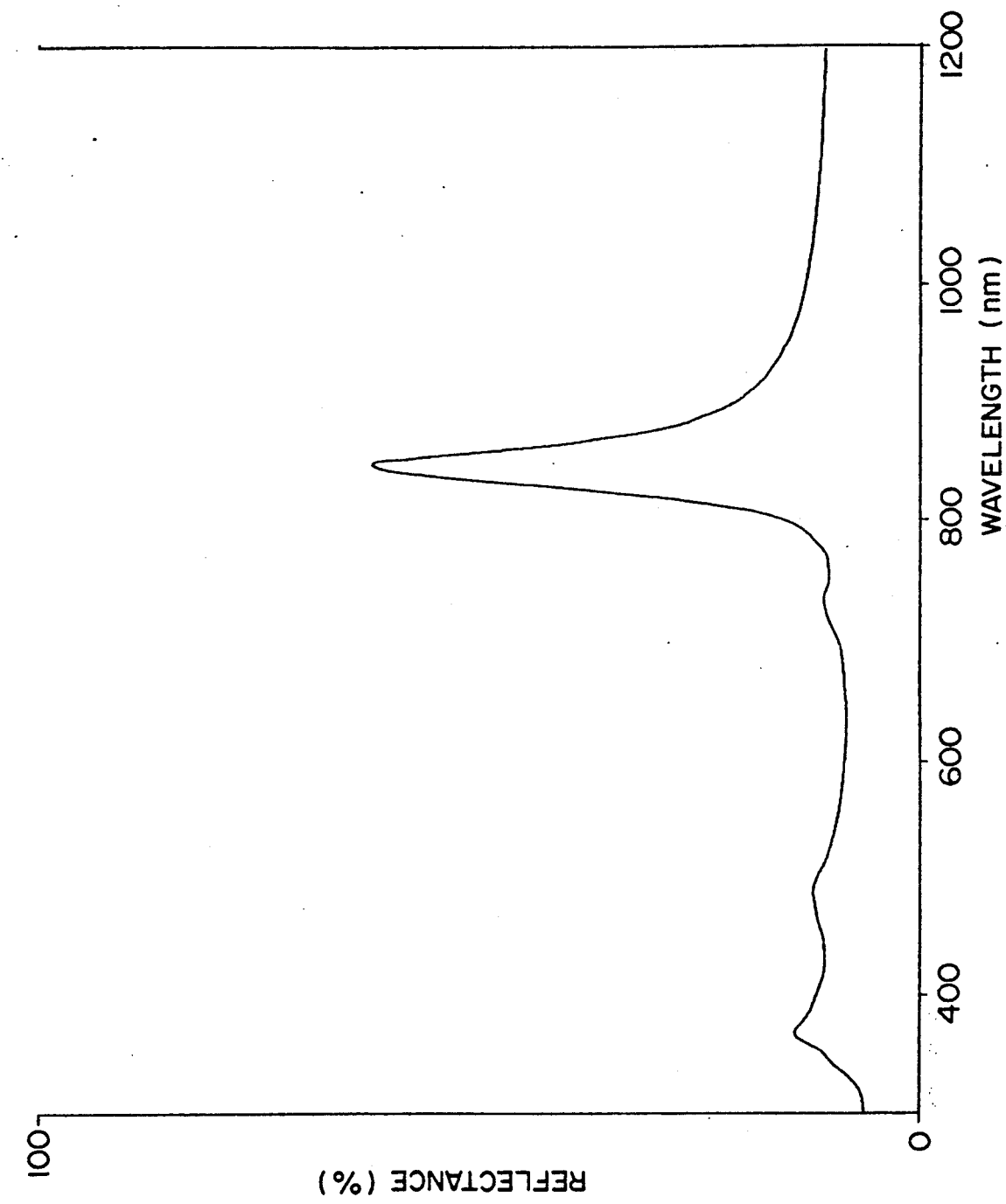
FIG. 45 is 5° specular reflection spectrum of spin-coated film of Compound (16)

On a polycarbonate plate, an organic film having a thickness of about 600 angstroms was formed by spin-coating a solution consisting of 1 part by weight of bis(triethylsiloxy)silicon-tetra(trimethylsilylmethylthio)naphthalocyanine (Compound (16)) and 99 parts by weight of cyclohexane and drying it at about 80° C. for 15 minutes. Absorption, transmission and 5° reflection spectra of the organic film of this compound on polycarbonate substrate are shown in FIG. 43, 44 and 45, respectively. It is understandable that an organic film exhibiting a high absorbing ability and a high reflectance (ca. 45%) in the semiconductor laser region (780-830 nm) can be formed.

EXAMPLE 8

Figure 46:
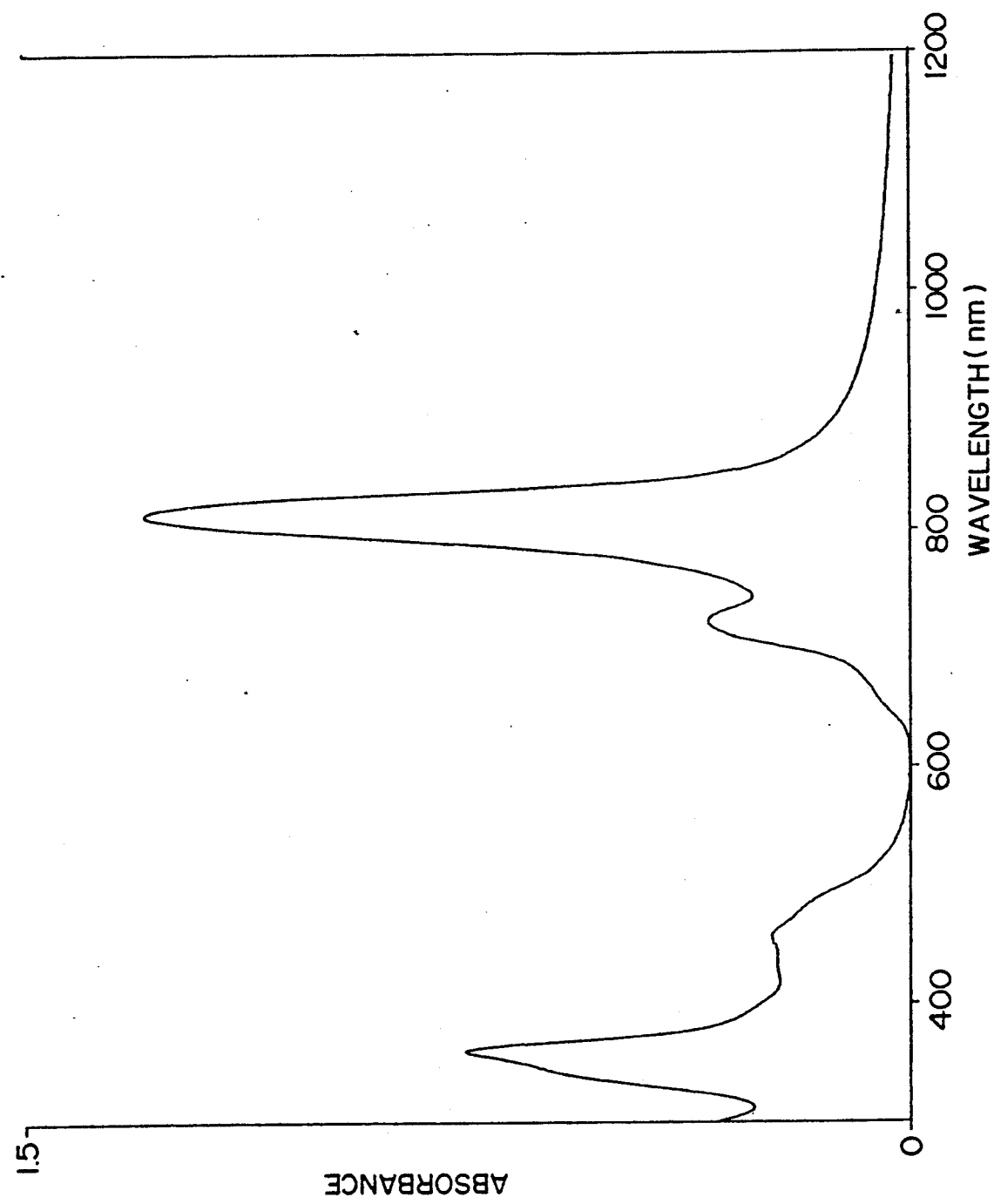
FIG. 46 is absorption spectrum of spin-coated film of Compound (9)
Figure 47:
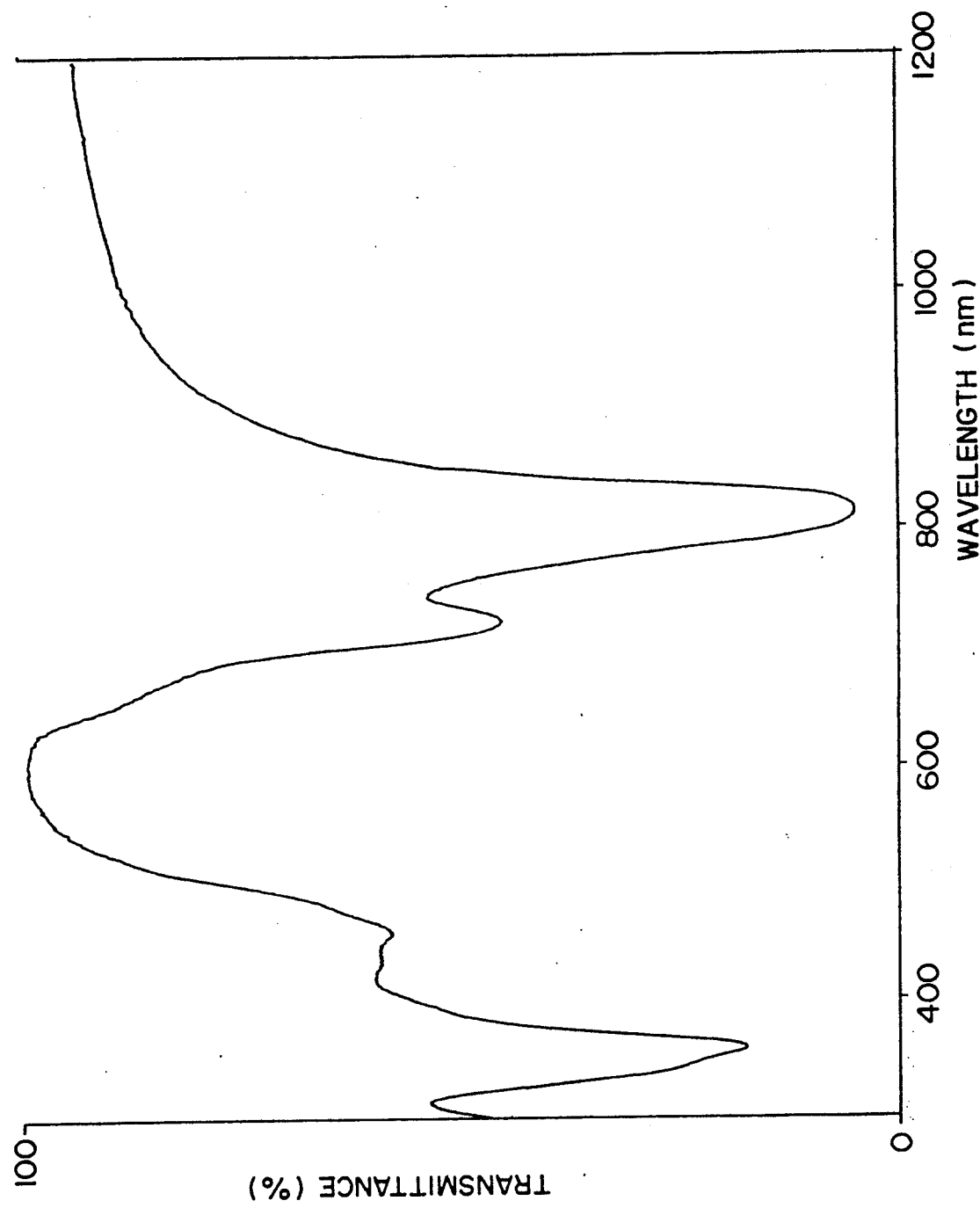
FIG. 47 is transmission spectrum of spin-coated film of Compound (9)
Figure 48:
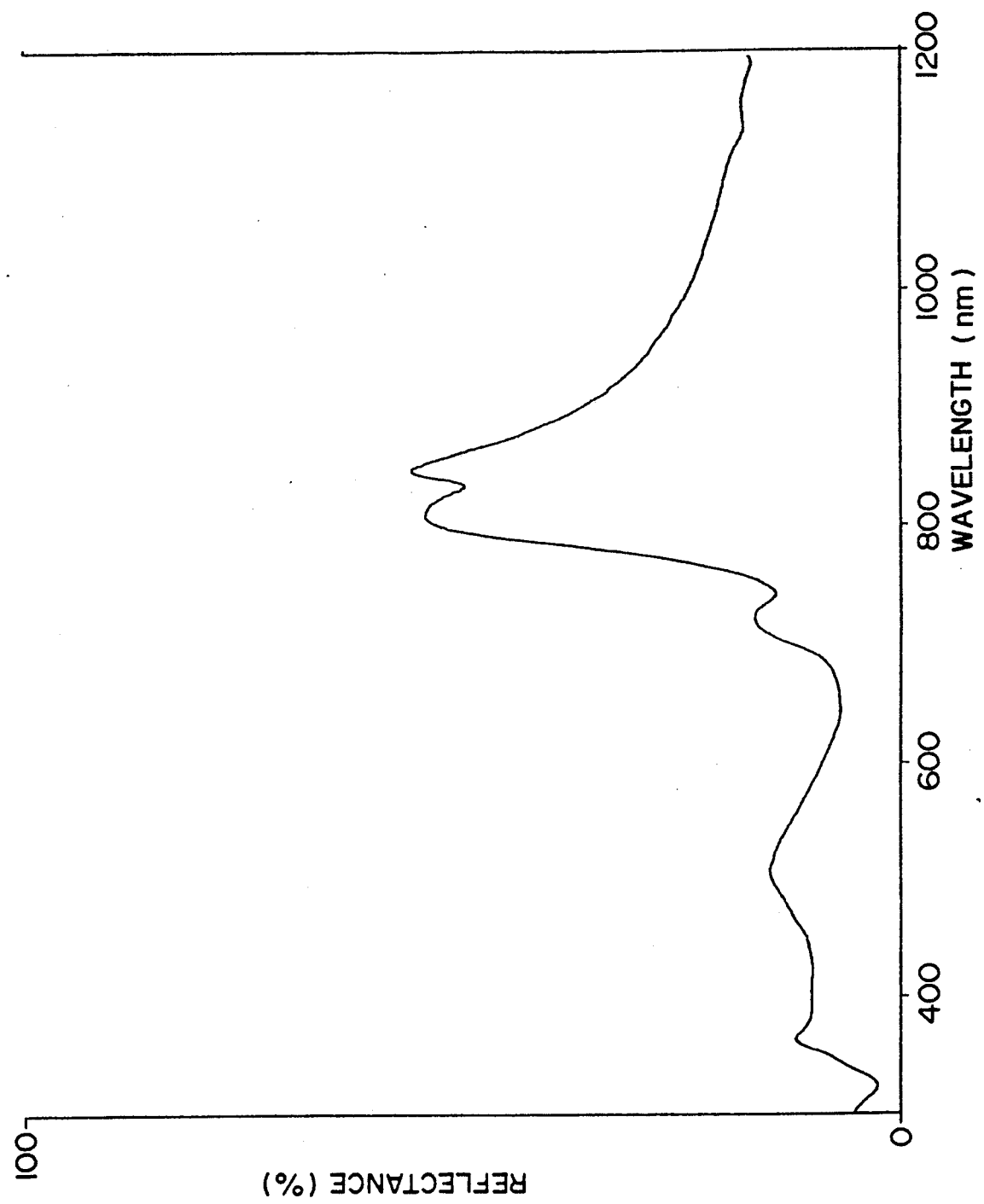
FIG. 48 is 5° specular reflection spectrum of spin-coated film of Compound (9)

On a polycarbonate plate, an organic film having a thickness of about 600 angstroms was formed by spin-coating a solution consisting of 1 part by weight of bis(tripropylsiloxy)silicon-tetra(trimethylsilylmethylthio)naphthalocyanine (Compound (9)) and 99 parts by weight of cyclohexane and drying it at about 80° C. for 15 minutes. Absorption, transmission and 5° reflection spectra of the organic film of this compound on polycarbonate substrate are shown in FIG. 46, 47 and 48. It is understandable that an organic film exhibiting a high light-absorbing ability and a high reflectance (ca. 55%) in the semiconductor laser region (780-830 nm) can be formed.

EXAMPLE 9

Figure 49:
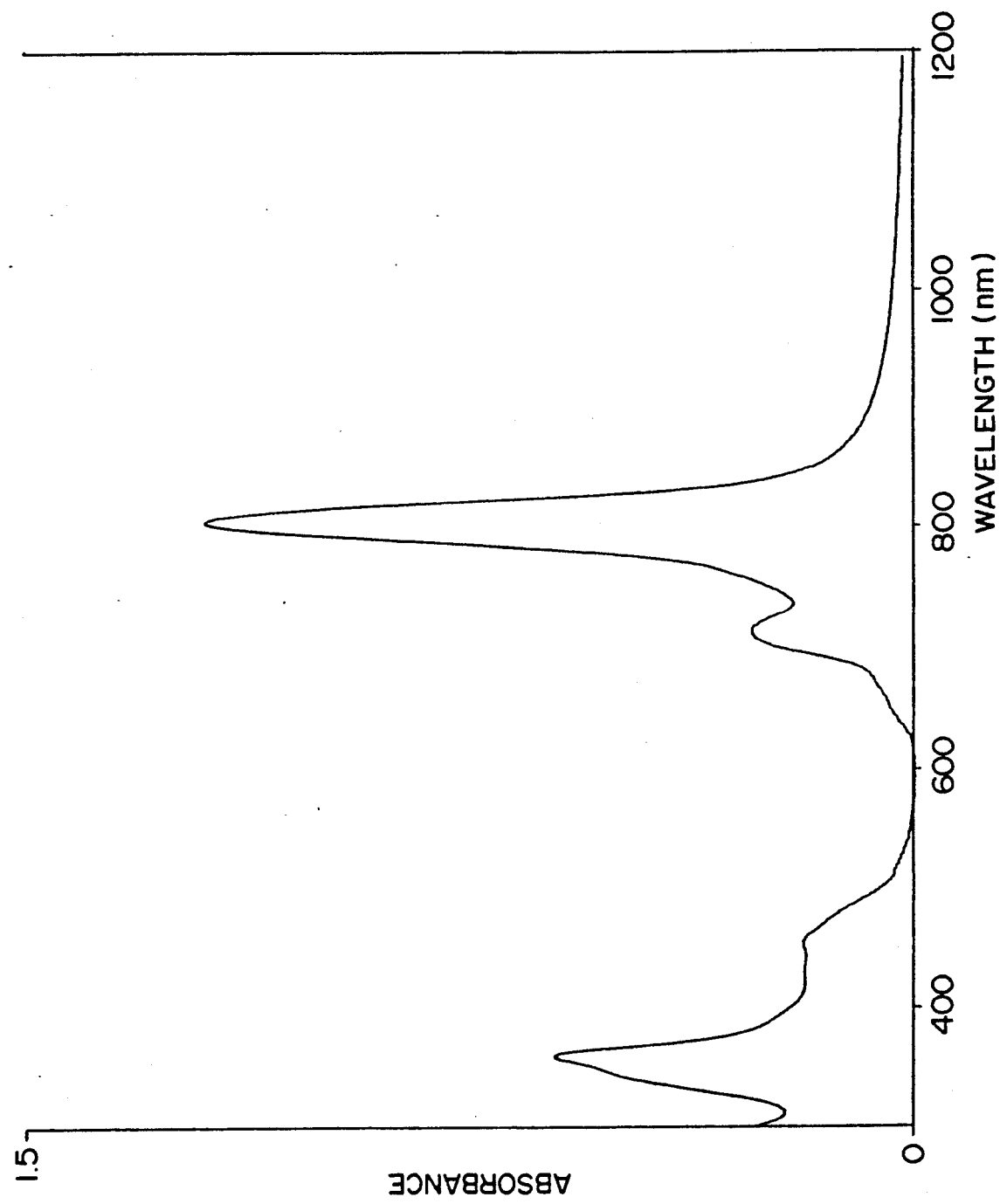
FIG. 49 is absorption spectrum of spin-coated film of Compound (13)
Figure 50:
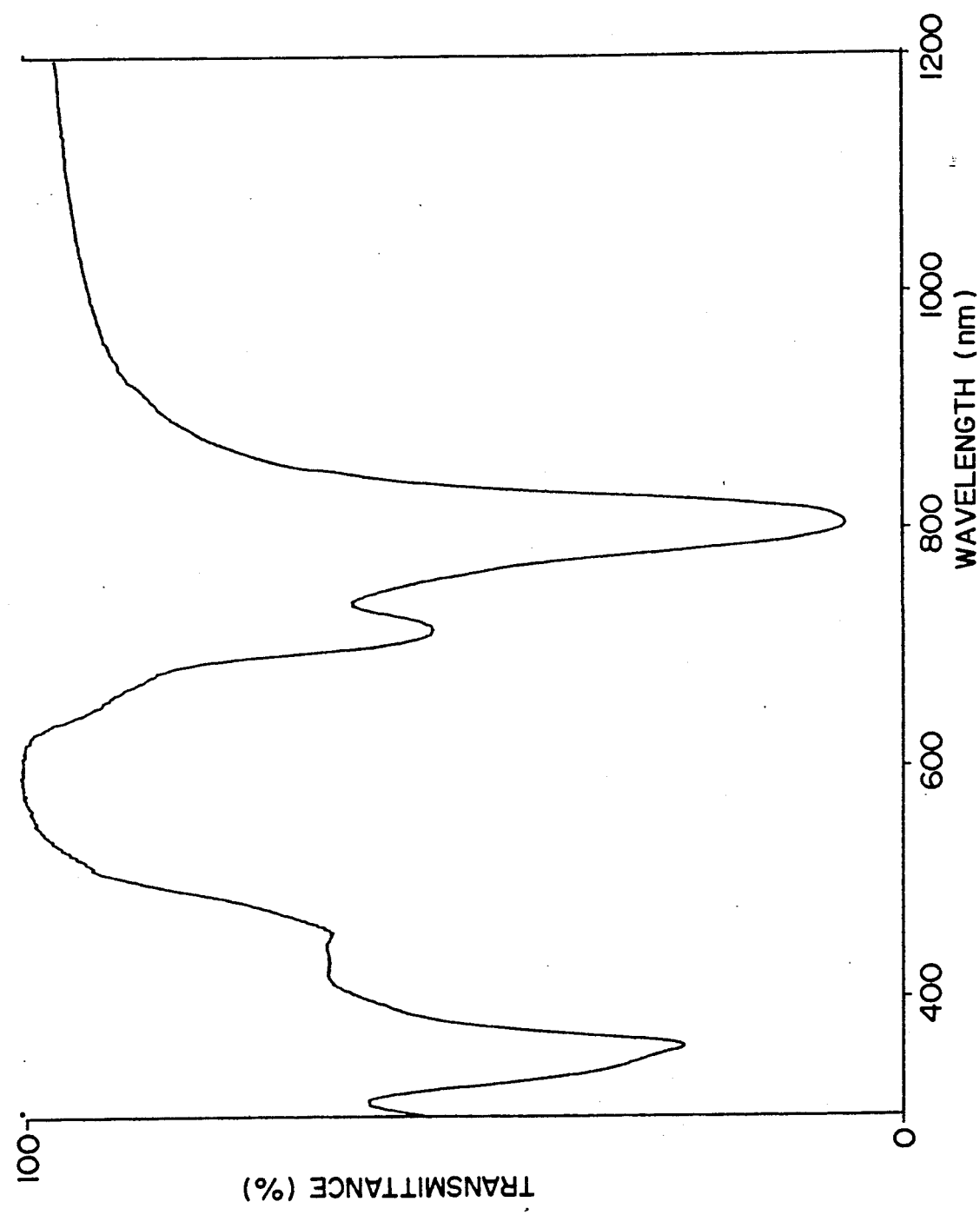
FIG. 50 is transmission spectrum of spin-coated film of Compound (13)
Figure 51:
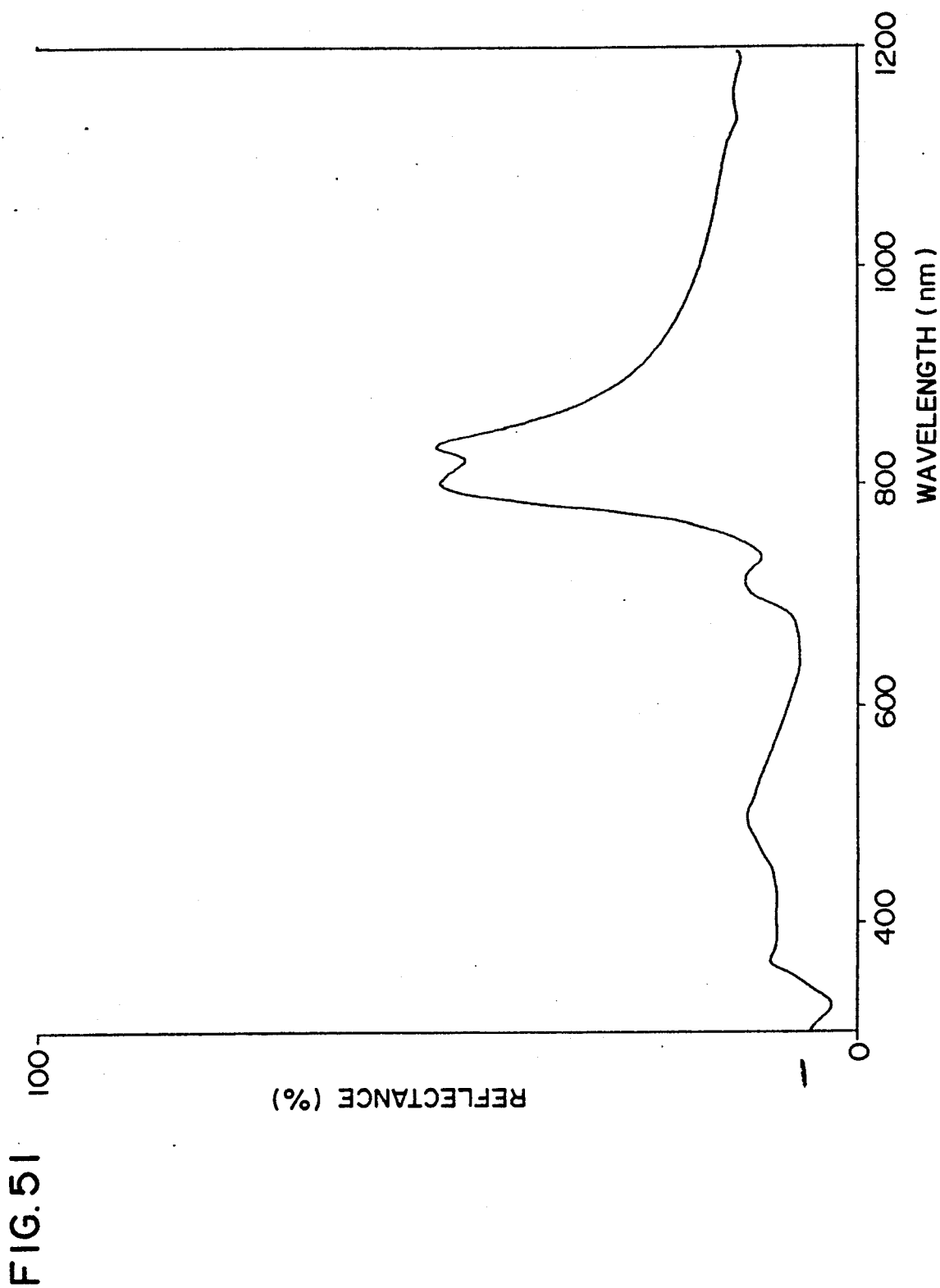
FIG. 51 is 5° specular reflection spectrum of spin-coated film of Compound (13)

On a polycarbonate plate, an organic film was formed by spin coating a solution consisting of 1 part by weight of bis(tri-n-hexylsiloxy)silicon-tetra(trimethylsilylmethylthio)naphthalocyanine (Compound (13)) and 99 parts by weight of cyclohexane, and drying it at about 80° C. for 15 minutes. Absorption, transmission and 5° specular reflection spectra of the organic film of this compound on polycarbonate substrate are shown in FIG. 49, 50 and 51, respectively. It is understandable that an organic film exhibiting a high light-absorbing ability and a high reflectance (ca. 50%) in the semiconductor laser region (780-830 nm) can be formed.

COMPARATIVE EXAMPLE 1

Figure 52A:
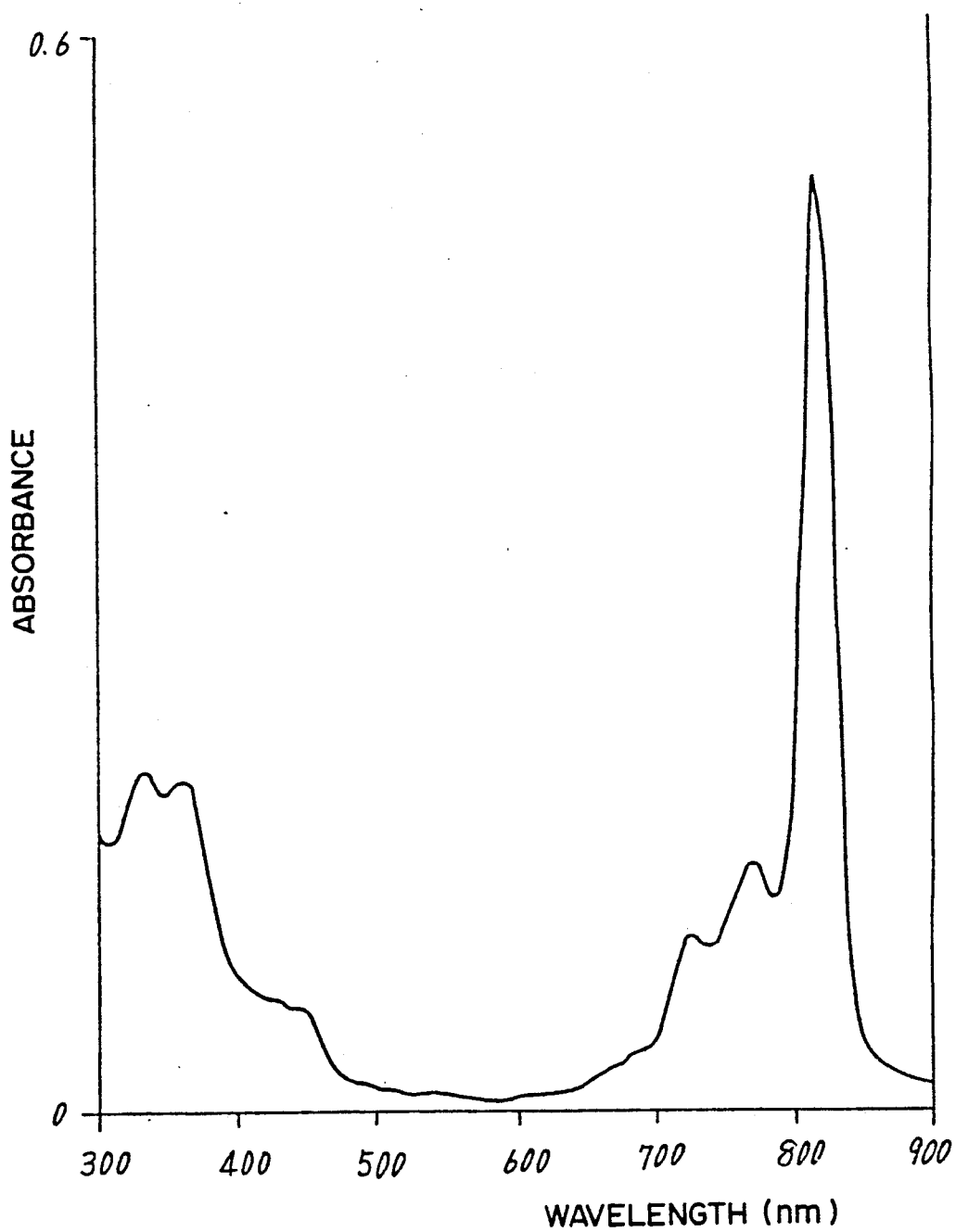
FIG. 52 is electronic spectra of vanadyl-tetra(t-butyl)naphthalocyanine in chloroform solution, wherein (a) is that at a concentration of $2.37 \times 10^6$ M and (b) is that at a concentration of $1.89 \times 10^5$ M.
Figure 52B:
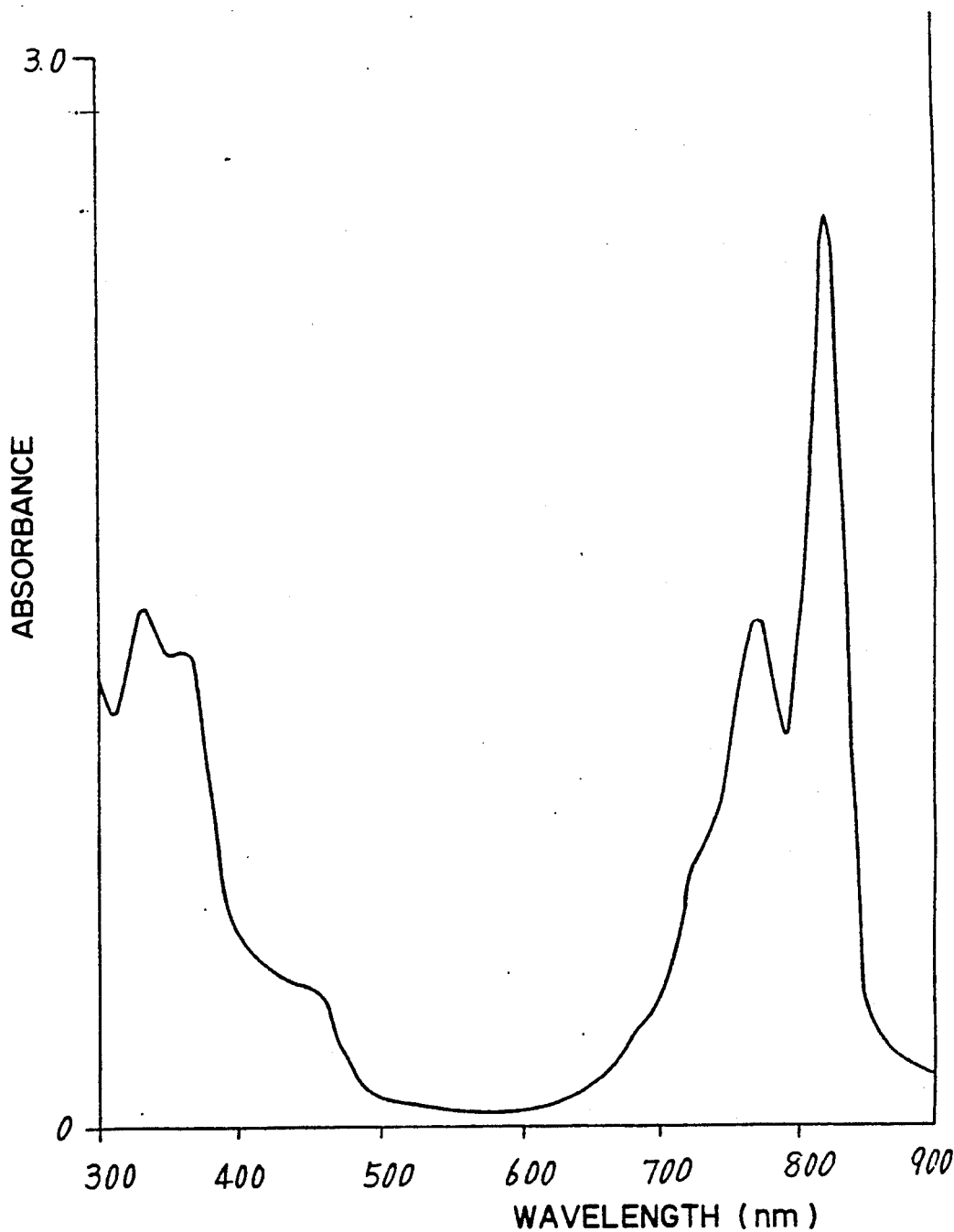
Figure 53:
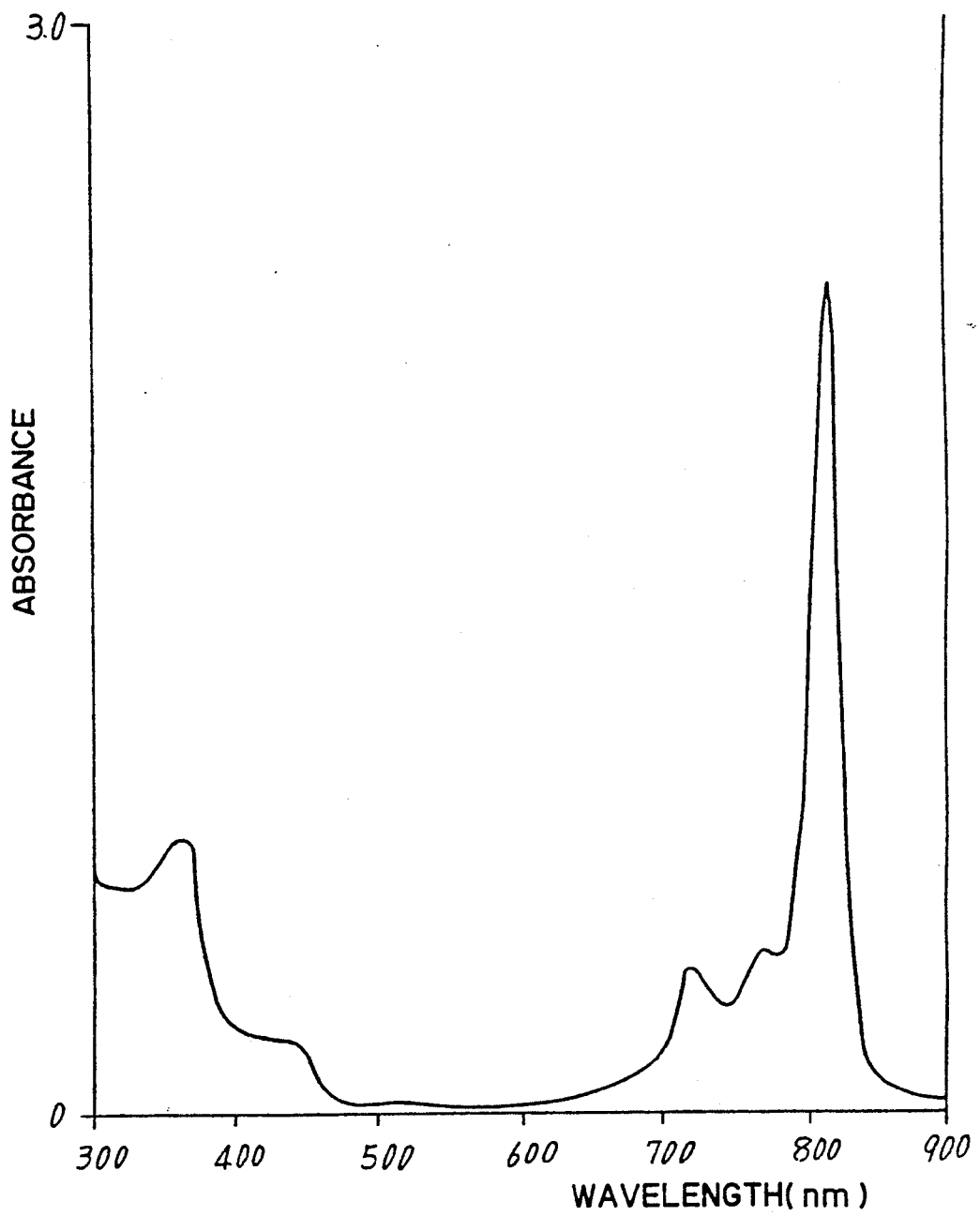
FIG. 53 is electronic spectrum of vanadyl-tetra(t-butyl)-naphthalocyanine in benzene solution at a concentration of $9.5 \times 10^6$ M.

FIG. 52 is an electronic spectrum of vanadyl-tetra(t-butyl)naphthalocyanine synthesized according to the method of Zhurnal Obshchei Khimii, vol. 42, page 696 (1972) in chloroform solution, and FIG. 53 is its electronic spectrum in benzene solution. As seen, in this compound, the wave shape of absorption changes with the kind of solvent and concentration. Thus, the absorption near 800 nm becomes smaller and the absorption near 700 nm becomes greater, as the concentration increases.

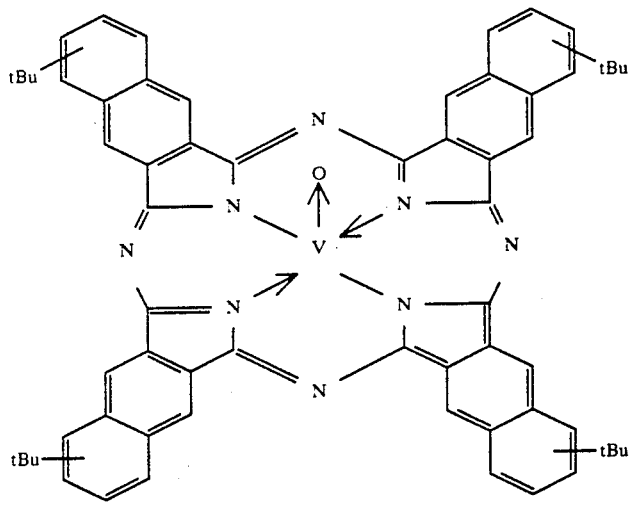

Vanadyl-tetra(t-butyl)naphthalocyanine

COMPARATIVE EXAMPLE 2

Figure 54:
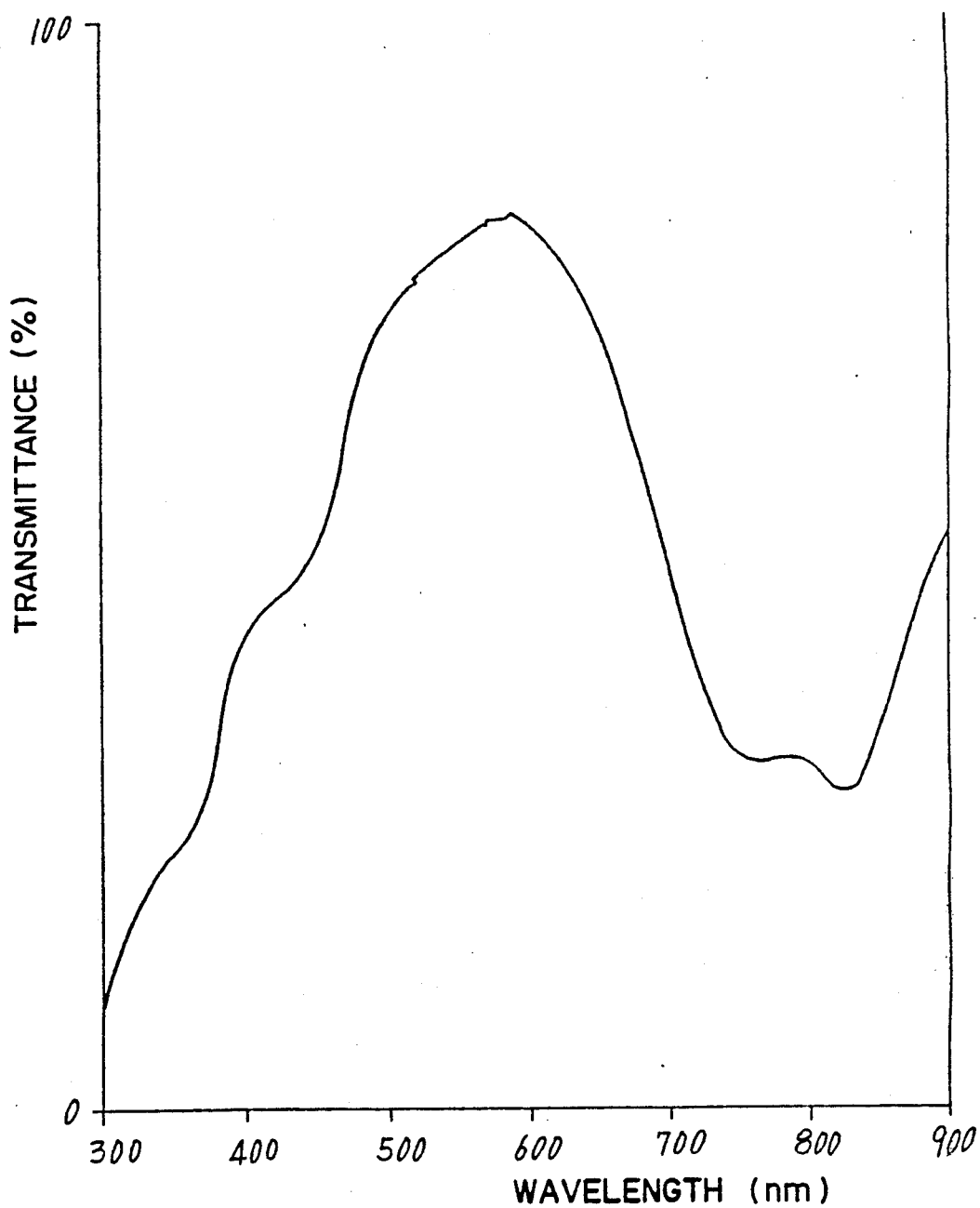
FIG. 54 is transmission spectrum of spin-coated film of vanadyl-tetra(t-butyl)-naphthalocyanine.
Figure 55:
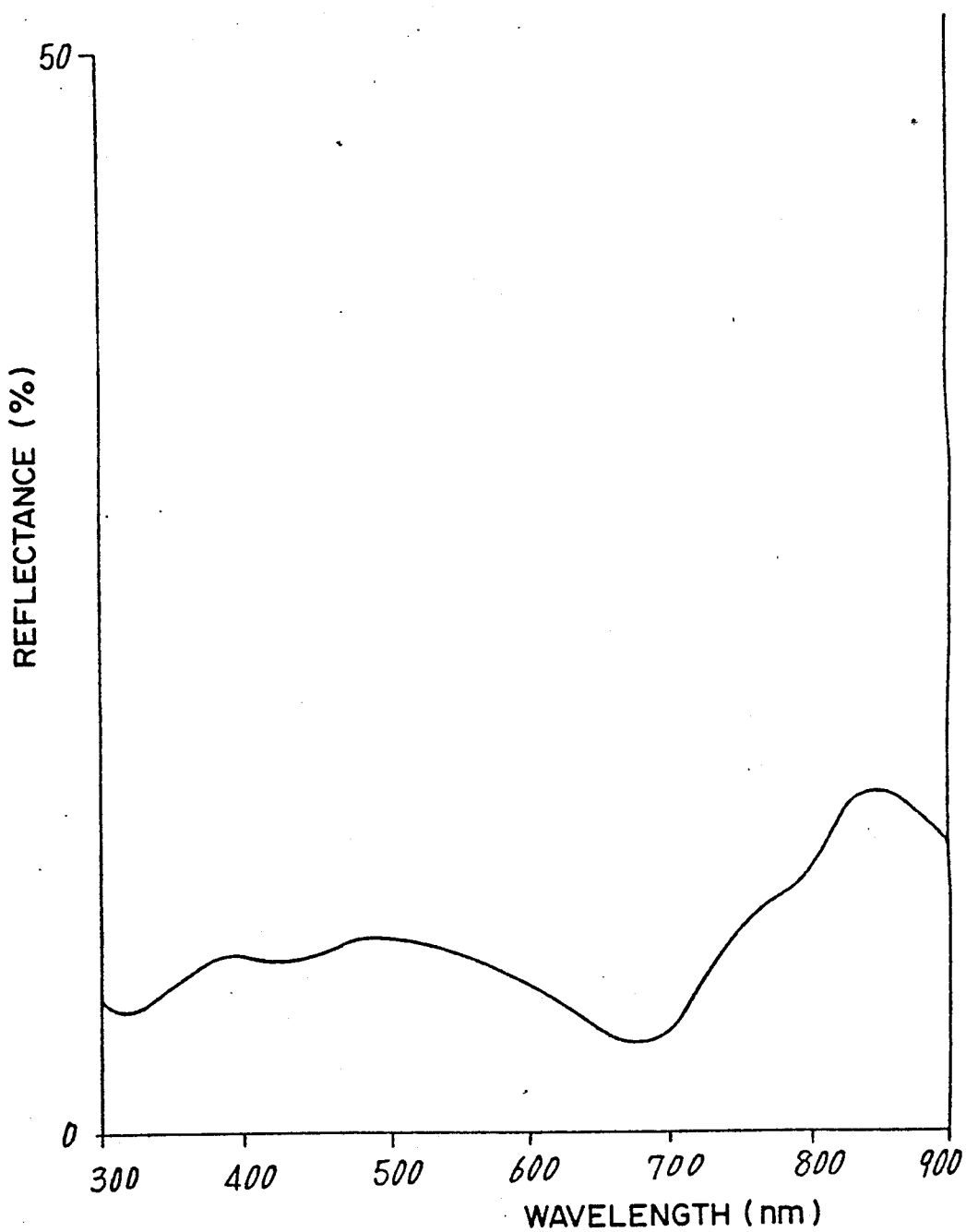
FIG. 55 is 5° specular reflection spectrum of spin-coated film of vanadyl-tetra(t-butyl)-naphthalocyanine.
Figure 56:
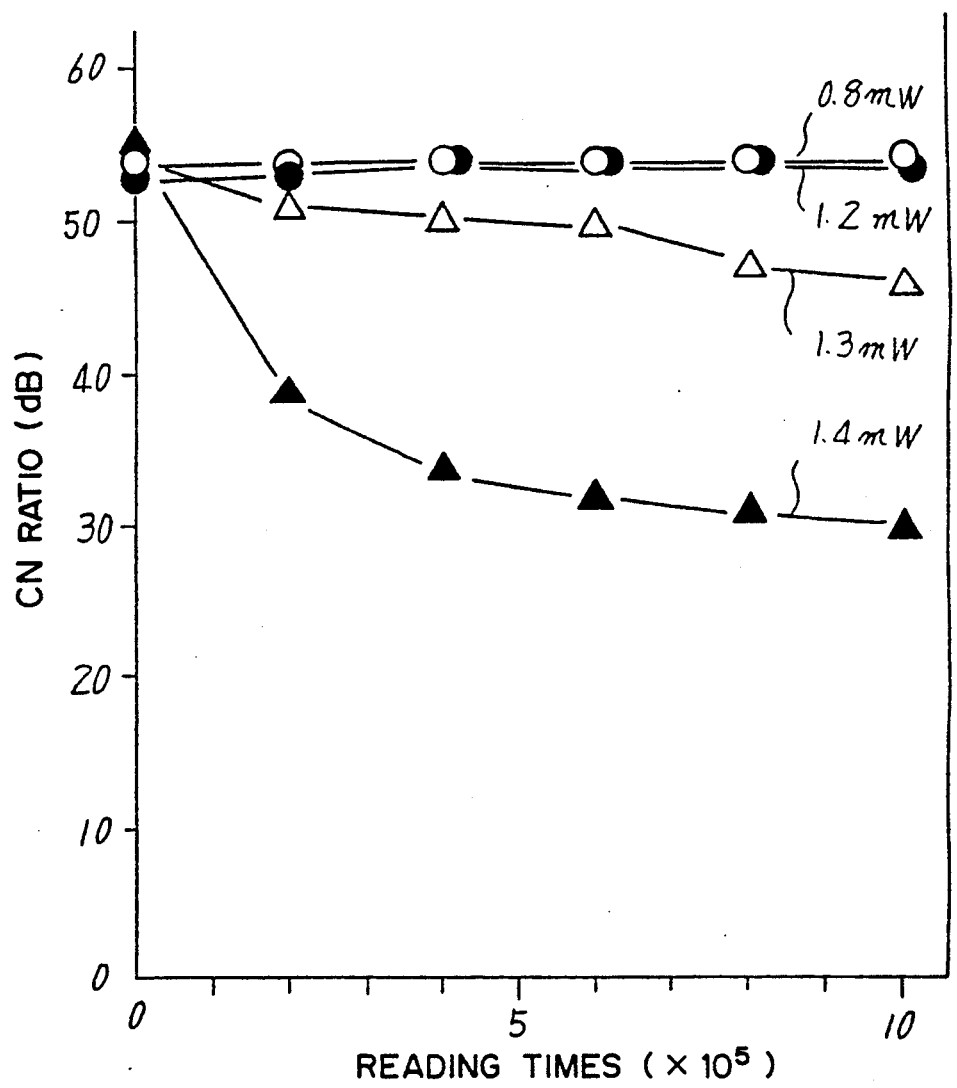
FIG. 56 is a graph illustrating the reproduction deterioration characteristics of Compound (8) in terms of CN ratio.

On a glass plate, an organic film of vanadyl-tetra(t-butyl)naphthalocyanine used in Comparative Example 1 was formed in the same manner as in Example 5 by the use of its solution in 1,1,2-trichloroethane, and transmission spectrum (FIG. 54) and 5° specular reflection spectrum (FIG. 55) of this film were measured. The film did not exhibit high light-absorbing ability nor high reflectance (below 20%) in the semiconductor laser region (780-830 nm).

EXAMPLE 10

A solution consisting of 1 part by weight of the exemplified naphthalocyanine compound of this invention and 99 parts by weight of solvent was spin-coated on various substrates having a thickness of 1.2 mm and a diameter of 130 mm and different in composition, and dried at about 80° C. for 15 minutes to form a recording layer. Thickness of the recording layer was measured by means of Dektak 3030 manufactured by Sloan Co. Each of the recording media thus prepared was placed on a turn table and rotated at a speed of 900 rpm. In this state, a laser beam was projected from the substrate side by the use of an optical head equipped with a semiconductor laser having an oscillating wavelength of 830 nm and an output of 6 mW on the substrate surface, so that the laser beams were concentrated into the recording layer through the substrate, and pulse signals of 2MHz were recorded in the zone of 40 to 60 mm from the center. Then, the recorded signals were reproduced on the same apparatus as above, while adjusting the output of semiconductor laser to 1.0 mW as measured on the substrate surface, and CN ratio (carrier to noise ratio) was evaluated. The results are shown in the following table. The exemplified compounds shown in the table could form a recording layer exhibiting quite excellent recording and reproducing characteristics on various substrates. In the table, PC signifies polycarbonate substrate, PMMA does polymethyl methacrylate substrate, and PMMA2P does polymethyl methacrylate 2P substrate.

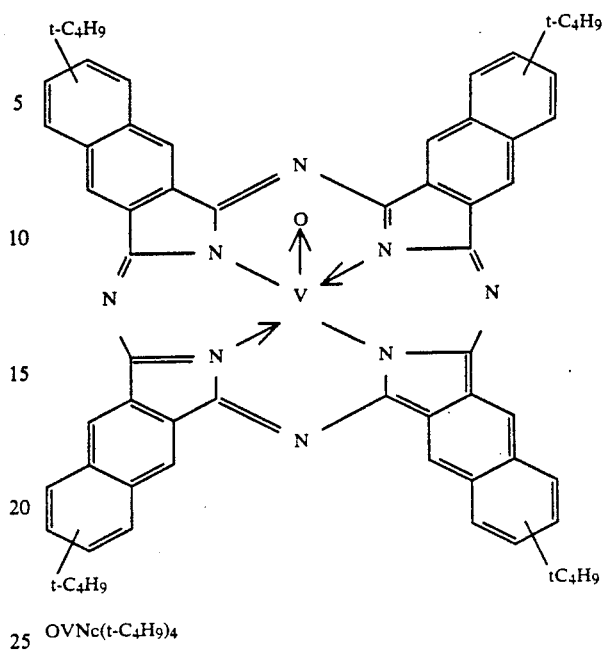

$OVNc(t-C_4H_9)_4$

TABLE 2

| Compound No. | Substrate | Solvent | Film thickness (Å) | CN ratio (dB) |
|---|---|---|---|---|
| 1 | PC | Cyclohexane | 680 | 55 |
| 2 | " | " | 700 | 53 |
| 3 | " | " | 720 | 51 |
| 4 | " | " | 650 | 54 |
| 7 | " | " | 710 | 51 |
| 8 | " | " | 680 | 52 |
| 11 | PMMA | " | 760 | 51 |
| 16 | " | " | 740 | 53 |
| 17 | " | " | 690 | 50 |
| 18 | " | " | 700 | 51 |
| 19 | " | " | 720 | 50 |
| 20 | PMMA2P | " | 700 | 51 |
| 21 | PC | " | 710 | 52 |
| 22 | " | " | 690 | 53 |
| 23 | " | " | 710 | 54 |
| 24 | " | " | 730 | 51 |
| 25 | " | " | 690 | 54 |
| 34 | " | " | 740 | 50 |
| 35 | PMMA | " | 700 | 53 |
| 36 | " | " | 710 | 54 |
| 4 | PMMA2P | Xylene | 700 | 51 |
| 8 | " | Toluene | 710 | 54 |
| 9 | " | " | 650 | 51 |
| 10 | " | Tetrahydrofuran | 700 | 53 |
| 13 | PC | Cyclohexane | 780 | 53 |
| 16 | " | " | 740 | 54 |
| 9 | " | " | 730 | 54 |

COMPARATIVE EXAMPLE 3

On a polymethyl methacrylate 2P substrate having a thickness of 1.2 mm and a diameter of 130 mm, $OVNc(t-C_4H_9)_4$ was spin-coated as a chloroform solution in the same manner as in Example 10 to form a recording layer. Thickness of this recording layer was about 1,000 angstroms. The recording material thus obtained was recorded and reproduced in the same manner as in Example 10. As a result, CN ratio (carrier to noise ratio: CNR) was 39 dB, and writing-in and reading-out of signals could not be performed satisfactorily.

EXAMPLE 11

Naphthalocyanine derivative (8) exemplified above was dissolved into cyclohexane to prepare a 1% solution. Using this solution, a recording film layer having a thickness of 700 angstroms was prepared on a polycarbonate substrate having a thickness of 1.2 mm by spin coating method. The recording medium thus obtained was irradiated with semiconductor laser having a wavelength of 830 nm from the side of substrate, and its recording characteristics were evaluated. As a result, recording was possible at a beam diameter of 1.6 microns, a line speed of 6.0 m/second, 7.0 mW. On the other hand, stability to reproduction deterioration was evaluated by the following method. Thus, reading was carried out by irradiating an intermittent (frequency 3.7 MHz) semiconductor laser (wavelength 830 nm, output 10 mW at the lighting time), and reproduction was carried out by irradiating semiconductor laser (wavelength 830 nm) continuously and repeatedly. As shown in FIG. 53, CN ratio kept constant at 53 dB and no change was observed, even the irradiation was repeated $10^6$ times. Further, no change in CN ratio was observed when a reproducing light of 1.2 mW was used. However, a slight decrease in CN ratio was observed when a reproduction light of 1.3 mW was used.

COMPARATIVE EXAMPLE 4

A recording film layer having a thickness of 500 angstroms was prepared by spin coating cyanine type dye NK-2905 (manufactured by Nippon Kanko Shikiso Kenkyosho) dissolved in dichlorethane onto a glass substrate. This recording medium was irradiated with laser beams in the same manner as in Example 11. As a result, recording could be performed at 4.8 mW. However, when stability to reproduction deterioration was evaluated with a reproducing light of 0.5 mW, reflectance began to decrease from about an irradiation number of about $4 \times 10^4$, and CN ratio decreased to 70% of the initial value after the irradiation number reached $10^6$.

EXAMPLE 12

A recording film layer having a thickness of 700 angstroms was prepared on a polycarbonate substrate by roller-coating naphthalocyanine derivative (9) dissolved in cyclohexane. The recording medium thus obtained was irradiated with semiconductor laser having a wavelength of 830 nm from the substrate side, and its recording characteristics were evaluated. As a result, recording could be performed at a beam diameter of 1.6 microns, at a line speed of 6.5 m/second, at 6.1 mW. On the other hand, stability to reproduction deterioration was evaluated by repeatedly irradiating a reading light of 1.0 mW. As a result, no change in CN ratio was observed even if the irradiation was repeated $10^6$ times.

EXAMPLE 13

On a glass substrate, a recording film layer having a thickness of 720 angstroms was prepared by spin coating naphthalocyanine derivative (10) dissolved in cyclohexane. The recording medium thus obtained was irradiated with laser beams in the same manner as in Example 12. As a result, recording could be performed at 6.3 mW. In the evaluation of stability to reproduction deterioration, no change in CN ratio was observed even if irradiation was repeated $10^6$ times.

EXAMPLE 14

On a glass plate, a recording film layer was formed by spin coating a 2:1 mixture of naphthalocyanine derivative (8) and polystyrene dissolved in toluene. Thickness of the recording film layer was 1,300 angstroms. When the recording medium thus obtained was irradiated with laser beams in the same manner as in Example 29, recording could be performed at 7.6 mW. In the evaluation of stability to reproduction deterioration, no change in CN ratio was observed even if the irradiation was repeated $10^6$ times.

EXAMPLE 15

On a polycarbonate substrate having a thickness of 1.2 mm, a recording film layer having a thickness of 700 angstroms was formed by spin coating naphthalocyanine derivative (11) dissolved in cyclohexane. The recording medium thus obtained was irradiated with semiconductor laser having a wavelength of 830 nm from the substrate side, and the recording characteristics were evaluated. As a result, recording could be performed at a beam diameter of 1.6 microns, at a line speed of 7.5 m/second, at 7.2 mW. On the other hand, in the evaluation of stability to reproduction deterioration, a reading light of 0.9 mW was repeatedly irradiated. As a result, no change in CN ratio was observed even if the irradiation was repeated $10^6$ times.

EXAMPLE 16

On a polycarbonate substrate, a recording film layer having a thickness of 700 angstroms was formed by spin coating naphthalocyanine derivative (13) dissolved in cyclohexane. The recording medium thus obtained was irradiated with laser beams in the same manner as in Example 12. As a result, recording could be performed at 6 mW. In the evaluation of stability to reproduction deterioration, no change in CN ratio was observed even if the irradiation was repeated $10^6$ times.

COMPARATIVE EXAMPLE 5

On a glass substrate, a recording film layer having a thickness of 500 angstroms was formed by spin coating cyanine dye NK-2837 (manufactured by Nippon Kanko Shikiso Kenkyusho) dissolved in dichlorethane. The recording medium thus obtained was irradiated with laser beams in the same manner as in Example 12. As a result, recording could be performed at 5.2 mW. However, in the evaluation of stability to reproduction deterioration, CN ratio began to decrease when irradiation number reached about $5 \times 10^4$, CN ratio decreased 70% of the initial value after the irradiation number had reached $10^6$.

EXAMPLE 17

On a polymethyl methacrylate substrate, a recording film layer having a thickness of 600 angstroms was formed by spin coating naphthalocyanine derivative (15) dissolved in cyclohexane. The recording medium thus obtained was irradiated with laser beams in the same manner as in Example 12. As the recording could be performed at 4 mW. In the evaluation of stability to reproduction deterioration, no change in CN ratio was observed even if the irradiation was repeated $10^6$ times.

EXAMPLE 18

On a polymethyl methacrylate substrate, a recording film layer having a thickness of 670 angstroms was formed by spin coating naphthalocyanine derivative (16) dissolved in cyclohexane. The recording medium thus obtained was irradiated with laser beams in the same manner as in Example 12. As a result, recording could be performed at 4.9 mW. In the evaluation of stability to reproduction deterioration, no change in CN ratio was observed even if the irradiation was repeated $10^6$ times.

EXAMPLE 19

On a glass substrate, a recording film layer having a thickness of 710 angstroms was formed by spin coating naphthalocyanine derivative (17) dissolved in toluene. The recording medium thus obtained was irradiated with laser beams in the same manner as in Example 12. As a result, recording could be performed at 4.2 mW. In the evaluation of stability to reproduction deterioration, no change in CN ratio was observed even if the irradiation was repeated $10^6$ times.

EXAMPLE 20

On a polycarbonate substrate having a thickness of 1.2 mm, a recording film layer having a thickness of 10 angstroms was formed by spin coating naphthalocyanine derivative (19) dissolved in cyclohexane. The recording medium thus prepared was evaluated at a line speed of m/second in the same manner as in Example 12. As a result, recording could be performed at 6.8 mW. In the evaluation of reproduction deterioration, no change in CN ratio was observed even if the irradiation was repeated $10^6$ times.

EXAMPLE 21

On a glass substrate, a recording film layer having a thickness of 900 angstroms was formed by coating a 2:1 mixture of naphthalocyanine derivative (20) and polystyrene dissolved in methyl ethyl ketone. It was evaluated in the same manner as in Example 12. As a result, the recording sensitivity was 4.8 mW and the reproduction deterioration was $10^6$ or above.

EXAMPLE 22

Naphthalocyanine derivative (21) was dissolved into butanol to prepare a 0.9% by weight solution. Then, a recording layer having a thickness of 600 angstroms was formed on a glass substrate having a thickness of 1.2 mm by spin coating process. The recording medium thus obtained was irradiated with semiconductor laser having a wavelength of 830 nm from the glass substrate side, and its recording characteristics were evaluated. As a result, recording could be performed at a $1/e^2$ beam diameter of 1.6 microns, at a line speed of 7.6 m/second, at 6.9 mW. On the other hand, in the evaluation of reproduction deterioration, a reading light of 1.0 mW was repeatedly projected. No change in CN ratio was observed even if the irradiation was repeated $10^6$ times.

EXAMPLE 23

Naphthalocyanine derivative (24) was dissolved into butanol to prepare a 1.0% (by weight) solution. A recording layer having a thickness of 650 angstroms was formed on a glass substrate having a thickness of 1.2 mm by spin coating process. The recording medium thus obtained was irradiated with semiconductor laser beams having a wavelength of 830 nm from the substrate side, and its recording characteristics were evaluated. As a result, recording could be performed at a $1/e^2$ beam diameter of 1.6 microns, at a line speed of 7.6 m/second, at 8.6 mW. On the other hand, in the evaluation of stability to reproduction deterioration, a reading light of 1.0 mW was repeatedly irradiated. As a result, no change in CN ratio was observed even if the irradiation was repeated $10^6$ times.

EXAMPLE 24

On a glass substrate having a thickness of 1.2 mm, a recording layer having a thickness of 800 angstroms was formed by spin coating a 2:1 mixture of naphthalocyanine derivative (25) and polystyrene dissolved in 1,1,2-trichloroethane. The recording medium thus prepared was irradiated with semiconductor laser having a wavelength of 830 nm from the side of substrate, and its recording characteristics were evaluated. As a result, recording could be performed at a line speed of 8 m/second, at 6 mW. On the other hand, when a reading light of 0.9 mW was repeatedly irradiated, no change in CN ratio was observed even if the irradiation was repeated $10^6$ times.

EXAMPLE 25

Figure 57:
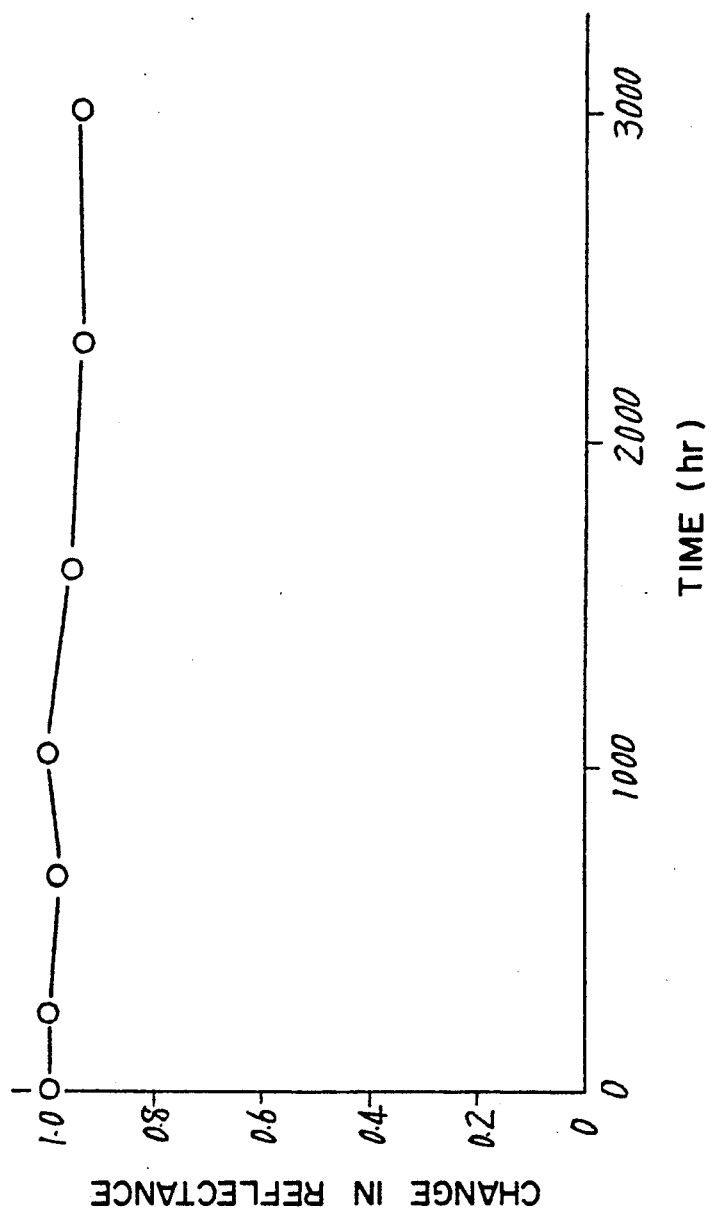
FIG. 57 is a graph illustrating the change in the reflectance, at 830 nm, of Compound (8) with the lapse of time under a high temperature-high humidity (80° C., 90% RH) condition.

On a polycarbonate substrate having a thickness of 1.2 mm and a diameter of 130 mm, a recording layer having a thickness of about 700 angstroms was formed by spin-coating a solution consisting of 1 part by weight of naphthalocyanine derivative (8) and 99 parts by weight of cyclohexane. The optical recording medium thus prepared was allowed to stand under a high temperature-high humidity condition (80° C., 90% RH) and its reflectance was measured. As shown in FIG. 57, it retained 95% of the initial reflectance. The change in reflectance in the lapse of time was expressed by percentage to initial reflectance, taking the initial reflectance as unity.

COMPARATIVE EXAMPLE 6

Figure 58:
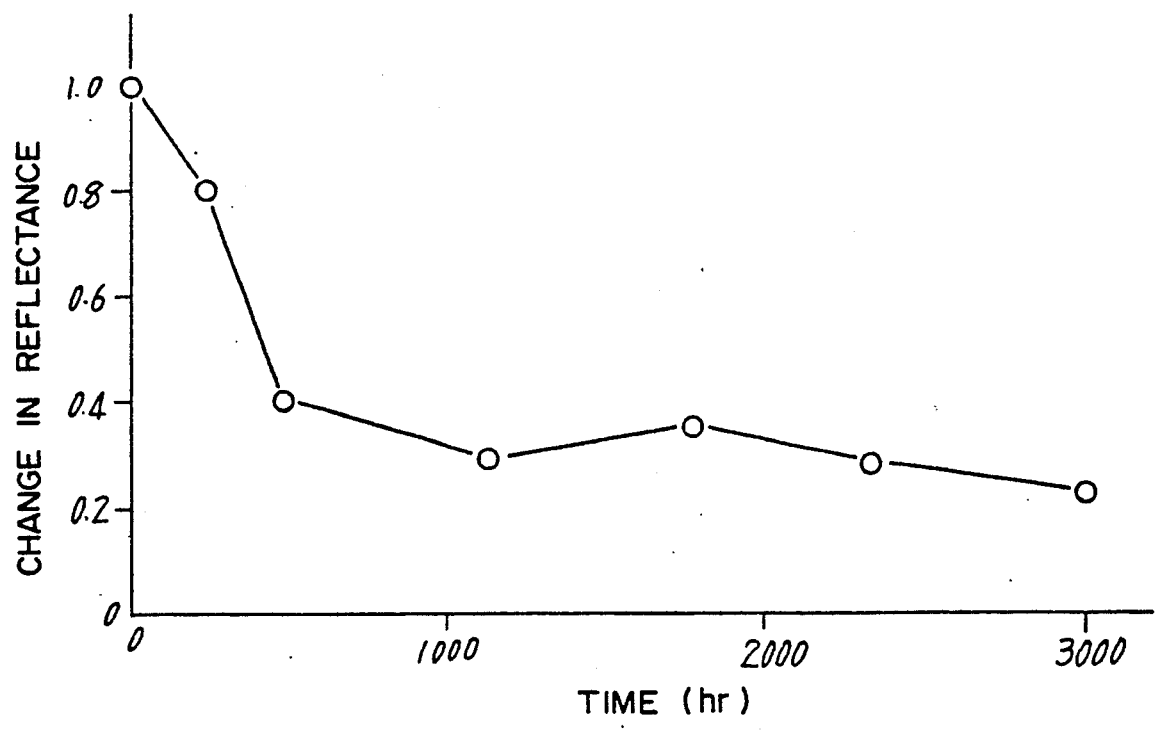
FIG. 58 is a graph illustrating the change in the reflectance, at 830 nm, of cyanine dye NK-2905 with the lapse of time under a high temperature-high humidity (80° C., 90% RH) condition.

On a polymethyl methacrylate 2P substrate having a thickness of 1.2 mm and a diameter of 130 mm, a recording layer was formed by spin-coating cyanine dye NK-2905 (manufactured by Nippon Kanko Shikiso Kenkyusho) dissolved in dichloroethane. The optical recording medium thus prepared was allowed to stand under a high temperature-high humidity condition (80° C., 90% RH) for 3,000 hours, and its reflectance was measured. As shown in FIG. 58, the reflectance began a rapid decrease when about 500 hours had passed, demonstrating durability of the recording medium was not good. Further, CNR retention was evaluated in the same manner as in Example 26, under accelerated environmental conditions. As a result, CNR decreased to 70% of the initial value.

EXAMPLE 26

An optical recording medium prepared in the same manner as in Example 25 was allowed to stand under a high temperature-high humidity condition (80° C., 90% RH), and CNR was measured after 3,000 hours had passed. As shown in Table 3, a good retention of CNR was observed.

TABLE 3

| Compound No. | Initial CNR (dB) | CNR after 3,000 hrs. (dB) |
| --- | --- | --- |
| 1 | 55 | 53 |
| 2 | 53 | 53 |
| 3 | 51 | 52 |
| 4 | 54 | 54 |
| 7 | 51 | 53 |
| 8 | 52 | 50 |
| 9 | 54 | 52 |
| 13 | 53 | 55 |
| 16 | 54 | 51 |
| 21 | 52 | 52 |
| 22 | 53 | 51 |
| 23 | 54 | 51 |
| 24 | 51 | 50 |
| 25 | 54 | 53 |
| 34 | 50 | 51 |

The naphthalocyanine derivative of this invention has an excellent solubility in saturated hydrocarbon type solvents. Accordingly, the naphthalocyanine derivative of this invention makes it possible to form a recording layer on the surface of optical disc substrate made of polymethyl methacrylate or polycarbonate easily, without providing any protecting layer on the surface. Further, since the naphthalocyanine derivative of this invention has at least 5, more preferably at least 7 silicon atoms, the amorphous film formed therefrom is excellent in the resistance to reproduction deterioration and amorphous film-retaining performance under the conditions of accelerating environmental test. Further, owing to the use of the naphthalocyanine derivative of this invention exhibiting excellent absorbing and reflecting performances in the semiconductor laser region, the optical recording medium of this invention can use laser beams as an effective electromagnetic energy for recording and reproduction.

what is claimed is:

1. A naphthalocyanine derivative represented by the formula (I):

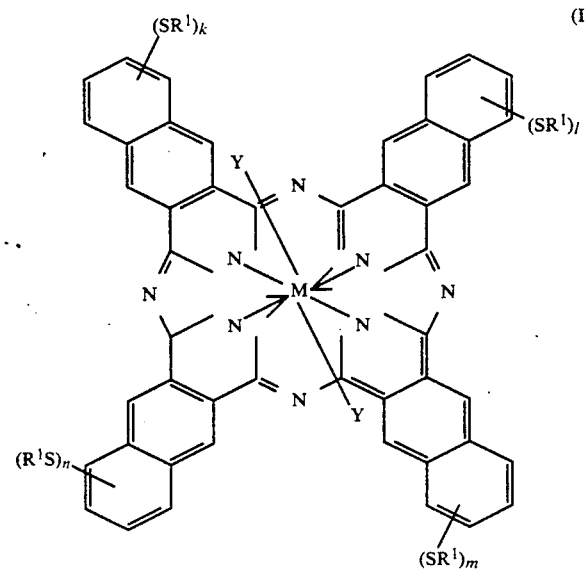

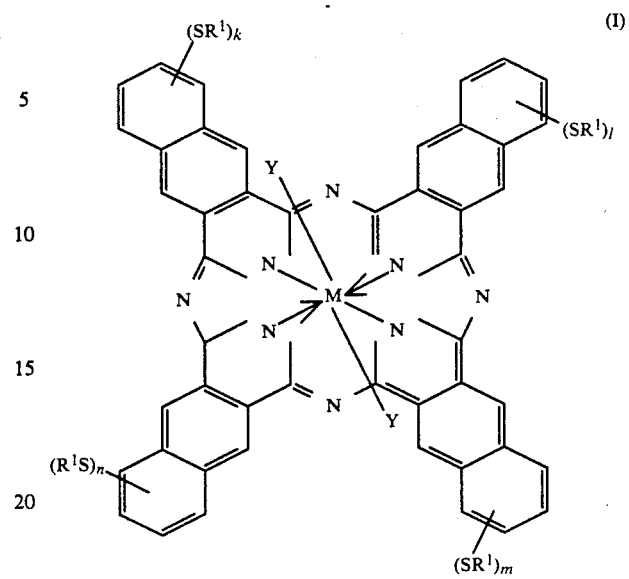

wherein $R^1$, in number of (k+l+m+n), represent identical or different substituent represented by $-(CR^2R^3)_xSiR^4R^5R^6$, provided that $R^2$, $R^3$, $R^4$, $R^5$ and $R^6$, identical or different one another, represent a hydrogen atom, a halogen atom, an alkyl group, an alkoxyl group, an aryl group or an aryloxyl group; k, l, m and n, identical or different one another, represent an integer of 0-4, provided that (k+l+m+n) is 1 or greater; x represents an integer of 1-30, provided that the groups $CR^2R^3$ in number of x may be identical or different one another; M represents Si, Ge or Sn; and Y represents an aryloxyl group, an alkoxy group, a trialkylsiloxyl group, a triarylsiloxyl group, a trialkoxysiloxyl group, a triaryloxysiloxyl group, a trityloxyl group or an acyloxyl group, provided that the two Y's may be identical or different each other.

2. A naphthalocyanine derivative according to claim 1, wherein M in the formula (I) is Si or Ge.

3. A naphthalocyanine derivative according to claim 1, wherein k, l, m and n in the formula (I) all represent a number of 1.

4. A naphthalocyanine derivative according to claim 1, wherein the two symbols Y in the formula (I) both represent a trialkylsiloxyl group.

5. A naphthalocyanine derivative according to claim 1, wherein $R^2$ and $R^3$ in the formula (I) both represent a hydrogen atom.

6. A naphthalocyanine derivative according to claim 1, wherein x in the definition of $R^1$ in the formula (I) is a number of 1 to 5.

7. A naphthalocyanine derivative according to claim 1, wherein $R^4$, $R^5$ and $R^6$ in formula (I) all represent a straight chain alkyl group.

8. An optical recording medium comprising a recording film layer, composed mainly of a naphthalocyanine derivative represented by the formula:

wherein $R^1$, in number of (K+l+m+n), represent identical or different substituent represented by $-(CR^2R^3)_xSiR^4R^5R^6$, provided that $R^2$, $R^3$, $R^4$, $R^5$ and $R^6$, identical or different from one another, represent a hydrogen atom, a halogen atom, an alkyl group, an alkoxyl group, an aryl group or an aryloxyl group; k, l, m and n, identical or different from one another, represent an integer of 0-4, provided that (k+l+m+n) is 1 or greater; x represents an integer of 1-30, provided that the groups $CR^2R^3$ in number of x may be identical or different from one another; M represents Si, Ge or Sn; and Y represents an arlyloxyl group, an alkoxy group, a trialkylsiloxyl group, a triarylsiloxyl group, a trialkoxysiloxyl group, a triaryloxysiloxyl group, a trityloxyl group or an acyloxyl group, provided that the two Y's may be identical or different from each other, formed on a substrate.

9. An optical recording medium according to claim 8, wherein said recording film layer contains as its main component a naphthalocyanine derivative of the formula (I) wherein M is Si or Ge.

10. An optical recording medium according to claim 8, wherein said recording film layer contains as its main component a naphthalocyanine derivative of the formula (I) wherein k, l, m and n all represent a number of 1.

11. An optical recording medium according to claim 8, wherein said recording film layer contains as its main component a naphthalocyanine derivative of the formula (I) wherein the two symbols Y both represent a trialkylsiloxyl group.

12. An optical recording medium according to claim 8 wherein said recording film layer contains as its main component a naphthalocyanine derivative of the formula (I) wherein $R^2$ and $R^3$ both represent a hydrogen atom.

13. An optical recording medium according to claim 8, wherein said recording film layer contains as its main component a naphthalocyanine derivative of the formula (I) wherein x in the definition of $R^1$ is 1 to 5.

14. An optical recording medium according to claim 8, wherein said recording film layer contains as its main component a naphthalocyanine derivative of the formula (I) wherein $R^4$, $R^5$ and $R^6$ all represent a straight chain alkyl group.

15. A process for producing an optical recording medium, which comprises forming a recording film layer on a substrate surface by the use of a solution prepared by dissolving a naphthalocyanine derivative of the formula:

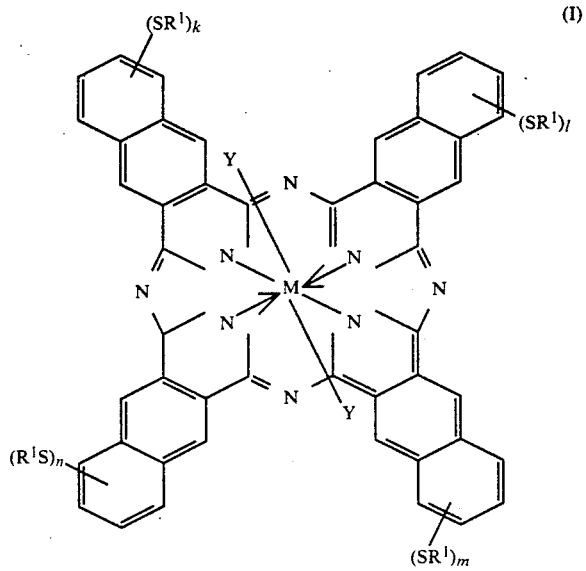

wherein $R^1$, in number of (k+l+m+n), represent identical or different substituent represented by $-(CR^2R^3)_x-SiR^4R^5R^6$, provided that $R^2$, $R^3$, $R^4$, $R^5$ and $R^6$, identical or different from one another, represent a hydrogen atom, a halogen atom, an alkyl group, an alkoxyl group, an aryl group or an aryloxyl group; k, l, m and n, identical or different from one another, represent an integer of 0–4, provided that (k+l+m+n) is 1 or greater; x represents an integer of 1–30, provided that the groups $CR^2R^3$ in number of x may be identical or different from one another; M represents Si, Ge or Sn; and Y represents an arlyloxyl group, an alkoxy group, a trialkylsiloxyl group, a triarylsiloxyl group, a trialkoxylsiloxyl group, a triaryloxysiloxyl group, a trityloxyl group or an acyloxyl group, provided that the two Y's may be identical or different from each other, as a main component in an organic solvent.

16. A process according to claim 15, wherein there is used a naphthalocyanine derivative of the formula (I) wherein M is Si or Ge.

17. A process according to claim 15, wherein there is used a naphthalocyanine derivative of the formula I) wherein k, l, m and n are all 1.

18. A process according to claim 15, wherein there is used a naphthalocyanine derivative of the formula (I) wherein the two symbols Y both represent a trialkylsiloxy group.

19. A process according to claim 15, wherein there is used a naphthalocyanine derivative of the formula (I) wherein $R^2$ and $R^3$ both represent a hydrogen atom.

20. A process according to claim 15, wherein there is used a naphthalocyanine derivative of the formula (I) wherein x in the definition of $R^1$ is 1 to 5.

21. A process according to claim 15, wherein there is used a naphthalocyanine derivative of the formula (I) wherein $R^4$, $R^5$ and $R^6$ all represent a straight chain alkyl group.

22. A naphthalocyanine derivative according to claim 1, which is bis(tri-n-butylsiloxy)silicon-tetra(-trimethylsilylmethylthio)naphthalocyanine.

23. A naphthalocyanine derivative according to claim 1, which is bis(triethylsiloxy)silicon-tetra(trimethylsilylmethylthio)naphthalocyanine.

24. A naphthalocyanine derivative according to claim 1, which is bis(tripropylsiloxy)silicon-tetra(trimethylsilylmethylthio)naphthalocyanine.

25. A naphthalocyanine derivative according to claim 1, which is bis(tri-n-hexylsiloxy)silicon-tetra(-trimethylsilylmethylthio)naphthalocyanine.

26. An optical recording medium according to claim 8, wherein said naphthalocyanine derivative is bis(tri-n-butylsiloxy)silicon-tetra(trimethylsilylmethylthio)-naphthalocyanine.

27. An optical recording medium according to claim 15, wherein said naphthalocyanine derivative is bis(triethylsiloxy)silicon-tetra(trimethylsilylmethylthio)naphthalocyanine.

28. An optical recording medium according to claim 15, wherein said naphthalocyanine derivative is bis(tripropylsiloxy)silicon-tetra(trimethylsilylmethylthio)-naphthalocyanine.

29. An optical recording medium according to claim 15, wherein said naphthalocyanine derivative is bis(tri-n-hexylsiloxy)silicon-tetra(trimethylsilylmethylthio)-naphthalocyanine.

30. A process according to claim 15, wherein there is used as a naphthalocyanine derivative, bis(tri-n-butylsiloxy)-silicon-tetra(trimethylsilylmethylthio)naphthalocyanine.

31. A process according to claim 15, wherein there is used as a naphthalocyanine derivative, bis(triethylsiloxy)-silicon-tetra(trimethylsilylmethylthio)naphthalocyanine.

32. A process according to claim 15, wherein there is used as a naphthalocyanine derivative, bis(tripropylsiloxy)-silicon-tetra(trimethylsilylmethylthio)naphthalocyanine.

33. A process according to claim 15, wherein there is used as a naphthalocyanine derivative, bis(tri-n-hexylsiloxy)-silicon-tetra(trimethylsilylmethylthio)naphthalocyanine.

34. A naphthalocyanine derivative of the formula:

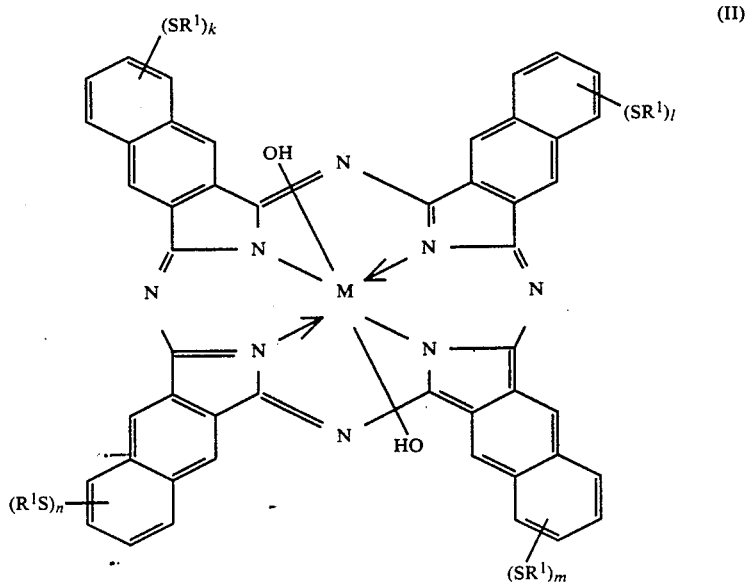

(II)

wherein $R^1$, in number of $(k+l+m+n)$, represent identical or different substituent represented by $-(CR^2R^3)_x-SiR^4R^5R^6$, provided that $R^2$, $R^3$, $R^4$, $R^5$ and $R^6$, identical or different from one another, represent a hydrogen atom, a halogen atom, an alkyl group, an alkoxyl group, an aryl group or an aryloxyl group; k, l, m and n, identical or different from one another, represent an integer of 0-4, provided that $(k+l+m+n)$ is 1 or greater; x represents an integer of 1-30, provided that the groups $CR^2R^3$ in number of x may be identical or different from one another; M represents Si, Ge or Sn.

35. A naphthalocyanine derivative according to claim 34, which is dihydroxysilicon-tetra(trimethylsilylmethylthio)-naphthalocyanine.

* * * * *